(12) United States Patent
Onuoha et al.

(10) Patent No.: US 12,496,314 B2
(45) Date of Patent: Dec. 16, 2025

(54) ANTIGEN-BINDING DOMAIN

(71) Applicant: AUTOLUS LIMITED, London (GB)

(72) Inventors: Shimobi Onuoha, London (GB); Mathieu Ferrari, London (GB); Marco Della Peruta, London (GB); Alexander Kinna, London (GB); Shaun Cordoba, London (GB)

(73) Assignee: AUTOLUS LIMITED, London (GB)

( * ) Notice: Subject to any disclaimer, the term of this patent is extended or adjusted under 35 U.S.C. 154(b) by 320 days.

(21) Appl. No.: 17/784,392

(22) PCT Filed: Dec. 18, 2020

(86) PCT No.: PCT/GB2020/053289
§ 371 (c)(1),
(2) Date: Jun. 10, 2022

(87) PCT Pub. No.: WO2021/123810
PCT Pub. Date: Jun. 24, 2021

(65) Prior Publication Data
US 2024/0252534 A1   Aug. 1, 2024

(30) Foreign Application Priority Data
Dec. 20, 2019   (GB) .................................... 1919019

(51) Int. Cl.
| | |
|---|---|
| *A61K 35/17* | (2025.01) |
| *A61K 40/11* | (2025.01) |
| *A61K 40/31* | (2025.01) |
| *A61K 40/42* | (2025.01) |
| *C07K 16/30* | (2006.01) |

(52) U.S. Cl.
CPC .............. *A61K 35/17* (2013.01); *A61K 40/11* (2025.01); *A61K 40/31* (2025.01); *A61K 40/4276* (2025.01); *C07K 16/3069* (2013.01); *A61K 2239/13* (2023.05); *A61K 2239/58* (2023.05); *C07K 2317/22* (2013.01); *C07K 2317/565* (2013.01); *C07K 2317/569* (2013.01); *C07K 2317/73* (2013.01); *C07K 2317/92* (2013.01);
(Continued)

(58) Field of Classification Search
None
See application file for complete search history.

(56) References Cited

U.S. PATENT DOCUMENTS

2019/0144561 A1   5/2019   McGuinness et al.

FOREIGN PATENT DOCUMENTS

| | | |
|---|---|---|
| CN | 108640999 A | 10/2018 |
| CN | 110526976 A | 12/2019 |

(Continued)

OTHER PUBLICATIONS

Kloss C.C., et al., "Dominant-Negative TGF-Receptor Enhances PSMA-Targeted Human CAR T Cell Proliferation And Augments Prostate Cancer Eradication," Supplemental Information, Molecular Therapy, Jul. 2018, vol. 26, No. 7, 34 Pages.

(Continued)

*Primary Examiner* — Aurora M Fontainhas
*Assistant Examiner* — Selam Berhane
(74) *Attorney, Agent, or Firm* — MARSHALL, GERSTEIN & BORUN LLP

(57) ABSTRACT

The present disclosure relates to antigen-binding domains which bind the antigen prostate-specific membrane antigen (PSMA) and to chimeric antigen receptors (CARs) which comprise such antigen binding domains.

10 Claims, 16 Drawing Sheets

Specification includes a Sequence Listing.

(52) U.S. Cl.
CPC ...... *C07K 2317/94* (2013.01); *C07K 2319/03* (2013.01)

(56) References Cited

FOREIGN PATENT DOCUMENTS

| | | |
|---|---|---|
| CN | 110526984 A | 12/2019 |
| JP | 2019523651 A | 8/2019 |
| WO | WO-03/080672 A1 | 10/2003 |
| WO | WO-2013/153391 A1 | 10/2013 |
| WO | WO-2015/150771 A1 | 10/2015 |
| WO | WO-2016/030691 A1 | 3/2016 |
| WO | WO-2016/111344 A1 | 7/2016 |
| WO | WO-2016/124930 A1 | 8/2016 |
| WO | WO-2016/135470 A1 | 9/2016 |
| WO | WO-2019/173324 A1 | 9/2019 |
| WO | WO-2019/173636 A1 | 9/2019 |

OTHER PUBLICATIONS

Bui et al., "Automated generation and evaluation of specific MHC binding predictive tools: ARB matrix applications," Immunogenetics 57:304-314 (2005).
Calis et al., "Properties of MHC Class I Presented Peptides that Enhance Immunogenicity," PLoS Comput. Biol. 9:e1003266 (2013).
Donnelly et al., "Analysis of the aphthovirus 2A/2B polyprotein cleavage mechanism indicates not a proteolytic reaction, but a novel translational effect: a putative ribosomal skip," J. Gen. Virol. 82:1027-1041 (2001).
Gao et al., "Monoclonal antibody humanness score and its applications," BMC Biotechnol. 13:55, 12 pages (2013).
Hassani et al., "Construction of a chimeric antigen receptor bearing a nanobody against prostate a specific membrane antigen in prostate cancer," J Cell Biochem. 120(6):10787-10795 (2019).
International Search Report and Written Opinion from International Application No. PCT/GB2020/053289 dated Mar. 22, 2021.
Karosiene et al., "NetMHCcons: a consensus method for the major histocompatibility complex class I predictions," Immunogenetics 64:177-186 (2012).
Kloss et al., "Dominant-Negative TGF-β Receptor Enhances PSMA-Targeted Human CAR T Cell Proliferation And Augments Prostate Cancer Eradication", Molecular Therapy, 26(7):1855-1866 (2018).
Nielsen et al., "Reliable prediction of T-cell epitopes using neural networks with novel sequence representations," Protein Sci. 12:1007-1017 (2003).
Paul et al., "HLA Class I Alleles Are Associated with Peptide-Binding Repertoires of Different Size, Affinity, and Immunogenicity," J. Immunol. 191:5831-5839 (2013).
Peters et al., "Generating quantitative models describing the sequence specificity of biological processes with the stabilized matrix method," BMC Bioinformatics 6:132, 9 pages (2005).
Santoro et al., "A chimeric antigen receptor against prostate-specific membrane antigen, a tumor vasculature target", Journal for ImmunoTherapy of Cancer, 1 (Suppl 1)::p. 33 (2013).
Santoro et al., "T Cells Bearing a Chimeric Antigen Receptor against Prostate-Specific Membrane Antigen Mediate Vascular Disruption and Result in Tumor Regression", Cancer Immunol Res 3(1):68-84 (2015).
Sette et al., "The relationship between class I binding affinity and immunogenicity of potential cytotoxic T cell epitopes," J. Immunol. Baltim. 153:5586-5592 (1994).
Zhang et al., "The PickPocket method for predicting binding specificities for receptors based on receptor pocket similarities: application to MHC-peptide binding," Bioinformatics 25:1293-1299 (2009).
Zuccolotto et al., "PSMA-Specific CAR-Engineered T Cells Eradicate Disseminated Prostate Cancer in Preclinical Models", PLOS ONE, 9(10):e109427, 12 pages (2014).
Rudikoff et al., "Single Amino Acid Substitution Altering Antigen-Binding Specificity", Immunology, Proceedings of the National Academy of Sciences, 79:1979-1983 (1982).
Tamura et al., "Structural Correlates of an Anticarcinoma Antibody: Identification of Specificity-Determining Residues (SDRs) and Development of a Minimally Immunogenic Antibody Variant by Retention of SDRs Only", The Journal of Immunology, 164(3):1432-1441 (2000).

ANTIGEN-BINDING DOMAIN

CROSS-REFERENCE TO RELATED APPLICATIONS

This is a U.S. National Phase of International Application No. PCT/GB2020/053289, filed Dec. 18, 2020, which claims priority to Great Britain Application No. 1919019.8, filed Dec. 20, 2019.

INCORPORATION BY REFERENCE OF MATERIAL SUBMITTED ELECTRONICALLY

The Sequence Listing, which is a part of the present disclosure, is submitted concurrently with the specification as a text file. The name of the text file containing the Sequence Listing is "56142_SubSeqlisting.txt", which was created on Nov. 30, 2022 and is 66,836 bytes in size. The subject matter of the Sequence Listing is incorporated herein in its entirety by reference.

FIELD OF THE INVENTION

The present invention relates to antigen-binding domains which bind the antigen prostate-specific membrane antigen (PSMA). The invention also relates to chimeric antigen receptors (CARs) which comprise such antigen binding domains. Cells expressing CARs which bind PSMA are useful in the treatment of cancerous diseases such as solid tumours including prostate, kidney, breast, and colon cancers.

BACKGROUND TO THE INVENTION

Prostate Cancer

Prostate cancer is the most frequently diagnosed cancer type in men and is estimated to be the second leading cause of cancer related deaths. Radical prostatectomy remains one of the most common treatment options, which may combined with radiotherapy or chemotherapy.

Chimeric Antigen Receptors (CARs)

Chimeric antigen receptors are proteins which graft the specificity of an antibody on to the effector function of a T-cell. Their usual form is that of a type I transmembrane domain protein with an antigen recognizing amino terminus, a spacer, a transmembrane domain all connected to a compound endodomain which transmits T-cell survival and activation signals (see FIG. 1a).

The most common form of these molecules are fusions of single-chain variable fragments (scFv) derived from monoclonal antibodies which recognise a target antigen, fused via a spacer and a transmembrane domain to a signaling endodomain. Such molecules result in activation of the T-cell in response to recognition by the scFv of its target. When T cells express such a CAR, they recognize and kill target cells that express the target antigen. Several CARs have been developed against tumour associated antigens, and adoptive transfer approaches using such CAR-expressing T cells are currently in clinical trial for the treatment of various cancers.

Prostate-Specific Membrane Antigen (PSMA)

One target for immunotherapeutic approaches to treat prostate cancer is Prostate-specific membrane antigen (PSMA), also known as glutamate carboxypeptidase II (GCPII), N-acetyl-L-aspartyl-L-glutamate peptidase I (NAALADase I), or NAAG peptidase. PSMA is an 84 kDa class Ia transmembrane zinc metalloenzyme that catalyzes the hydrolysis of N-acetylaspartylglutamate (NAAG) to glutamate and N-acetylaspartate. The protein is predominantly extracellular, with only a small intracellular region.

PSMA is highly expressed in the prostate and is over-expressed on >90% of all primary prostate cancers. PSMA expression on healthy tissues is minimal. PSMA has therefore shown utility as a target for diagnosis and treatment of prostate cancer. Furthermore, PSMA has potential utility as a target in kidney, breast, and colon cancers.

Anti-PSMA CARs comprising antigen-binding domains based on the J591 monoclonal antibody have previously been described (Kloss CC. et al. Mol Ther. 2018 Jul. 5; 26(7): 1855-1866.).

The present inventors sought to make an alternative PSMA-targeting CAR with improved properties.

(a) generalized architecture of a CAR: A binding domain recognizes antigen; the spacer elevates the binding domain from the cell surface; the trans-membrane domain anchors the protein to the membrane and the endodomain transmits signals. (b) to (d): Different generations and permutations of CAR endodomains: (b) initial designs transmitted ITAM signals alone through FcεR1-γ or CD3ζ endodomain, while later designs transmitted additional (c) one or (d) two co-stimulatory signals in cis.

Figure 2:
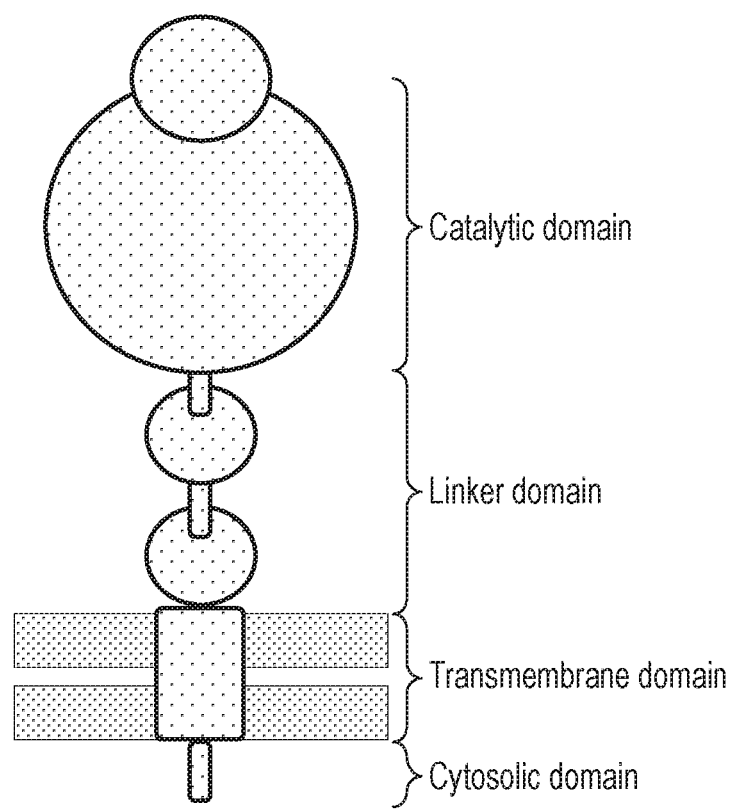

FIG. 2—Structure of prostate-specific membrane antigen.

Prostate-specific membrane antigen is a 750 amino acid class II membrane glycoprotein. The cytoplasmic (cytosolic) domain is residues 1-19; the signal-anchor for type II membrane proteins is residues 20-43; and the extracellular domain is residues 44-750. The extracellular domain is comprised of protease, apical and C-terminal domains.

Figure 3:
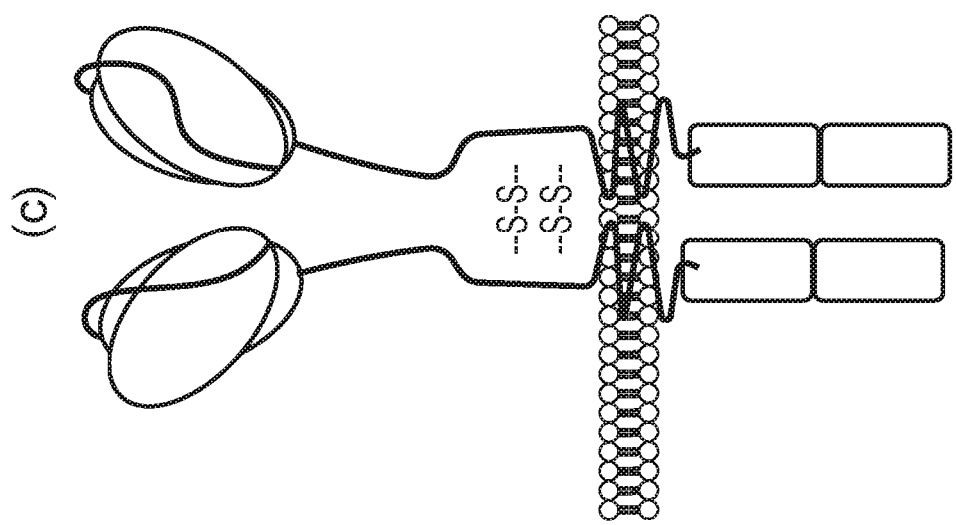
Figure 3:
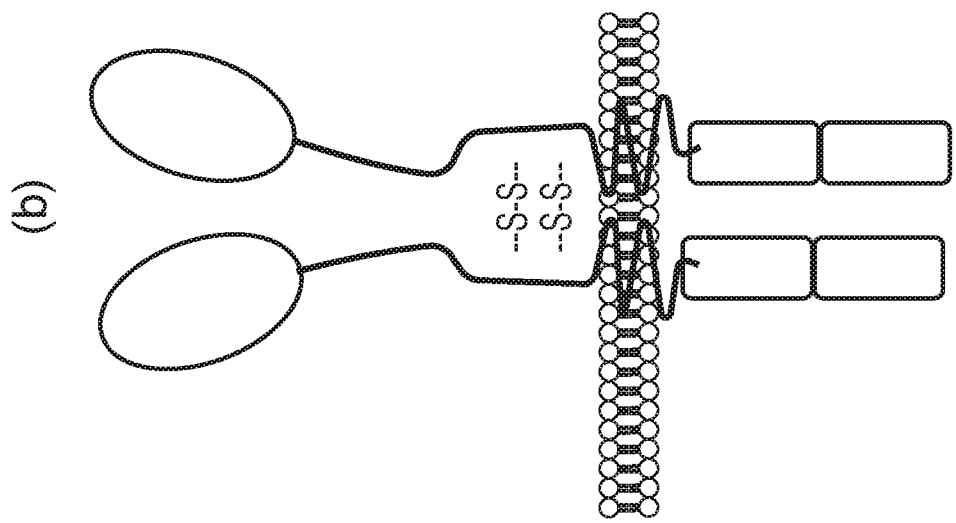
Figure 3:
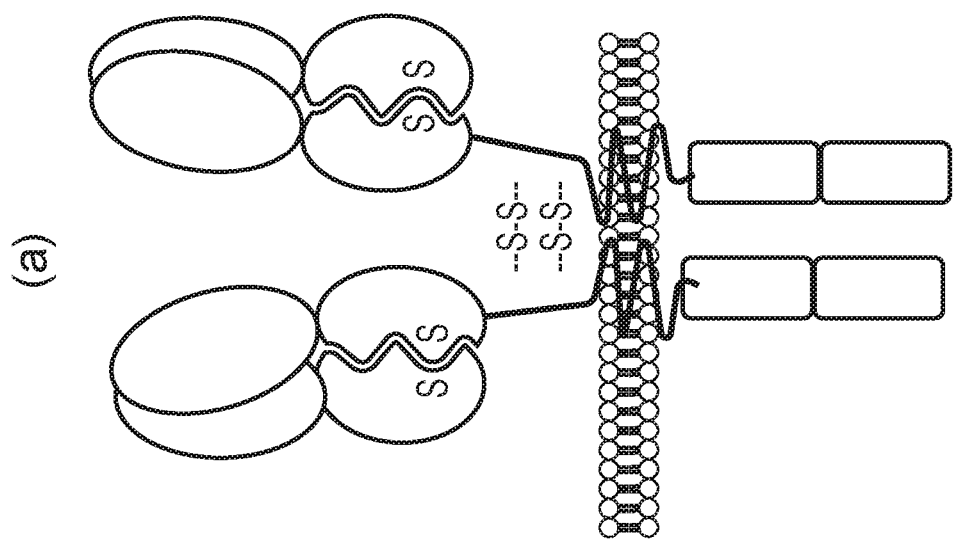

FIG. 3—Different binding domain formats of chimeric antigen receptors (a) Fab CAR format; (b) dAb CAR format; (c) scFv CAR format FIG. 4—ELISA assay of clonal phage and scFv cultures ELISA assay of clonal phage and scFv cultures in replicate after initial screening (n=3) on recombinant protein ELISA assay.

Figure 5:
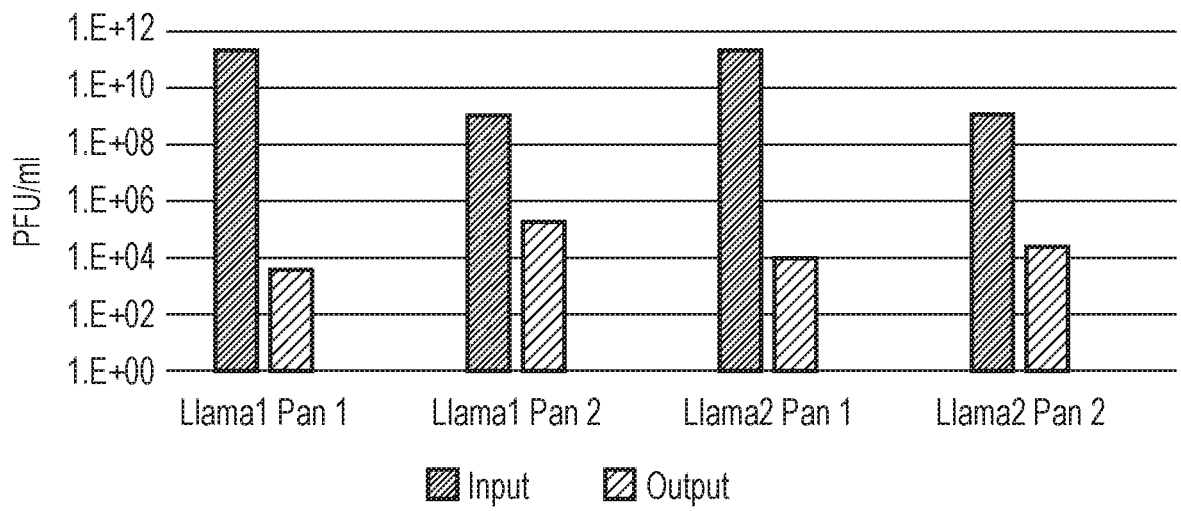
Figure 5:
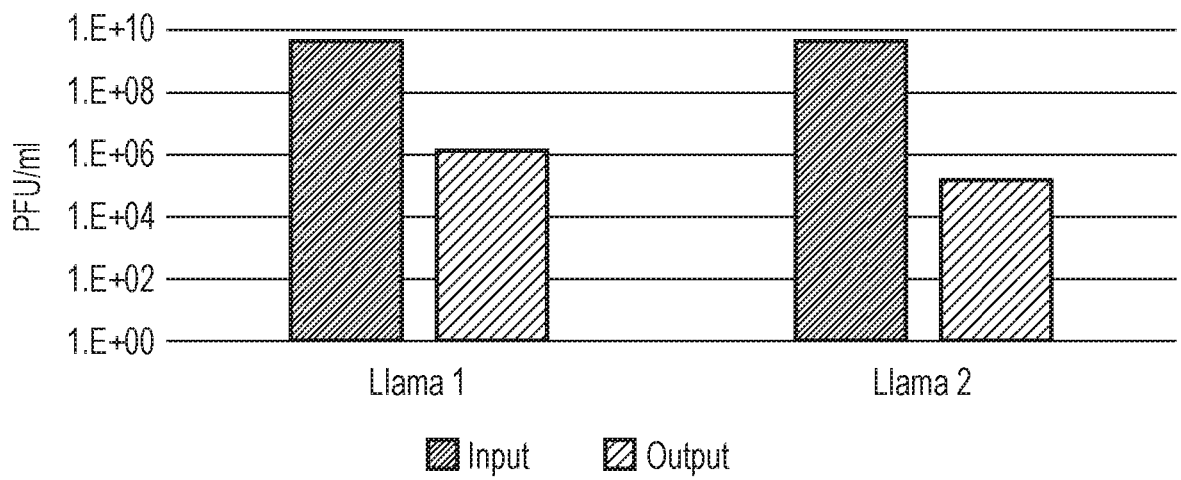

FIG. 5—Titration and enrichment of specific phage populations (a) Titration and enrichment of specific phage populations after panning rounds 1 and 2 from recombinant human PSMA protein (Acro Biosystems) panning only; (b) titration and enrichment of phage after 1 round of recombinant protein panning and 1 round of cell panning against SupT1 cells expressing PSMA.

Figure 6:
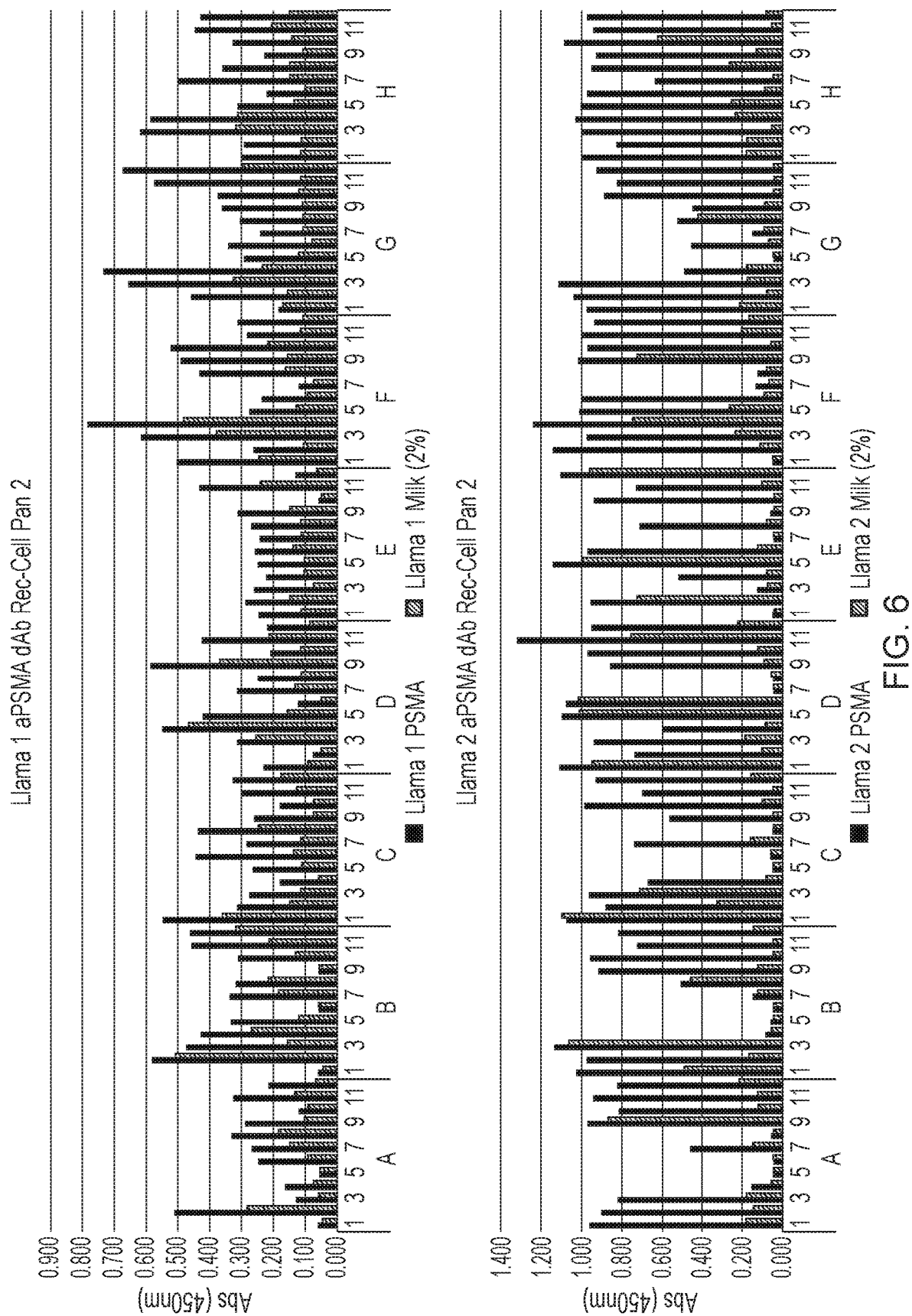

FIG. 6—ELISA screening of monoclonal C Myc tagged dAbs

ELISA screening of monoclonal C Myc tagged dAbs expressed by TG1 colonies from titration plates after cell panning. Expression was carried out by IPTG induction and screening was performed against recombinant human PSMA. Detection was performed using anti-C Myc tag HRP conjugate.

Figure 7:
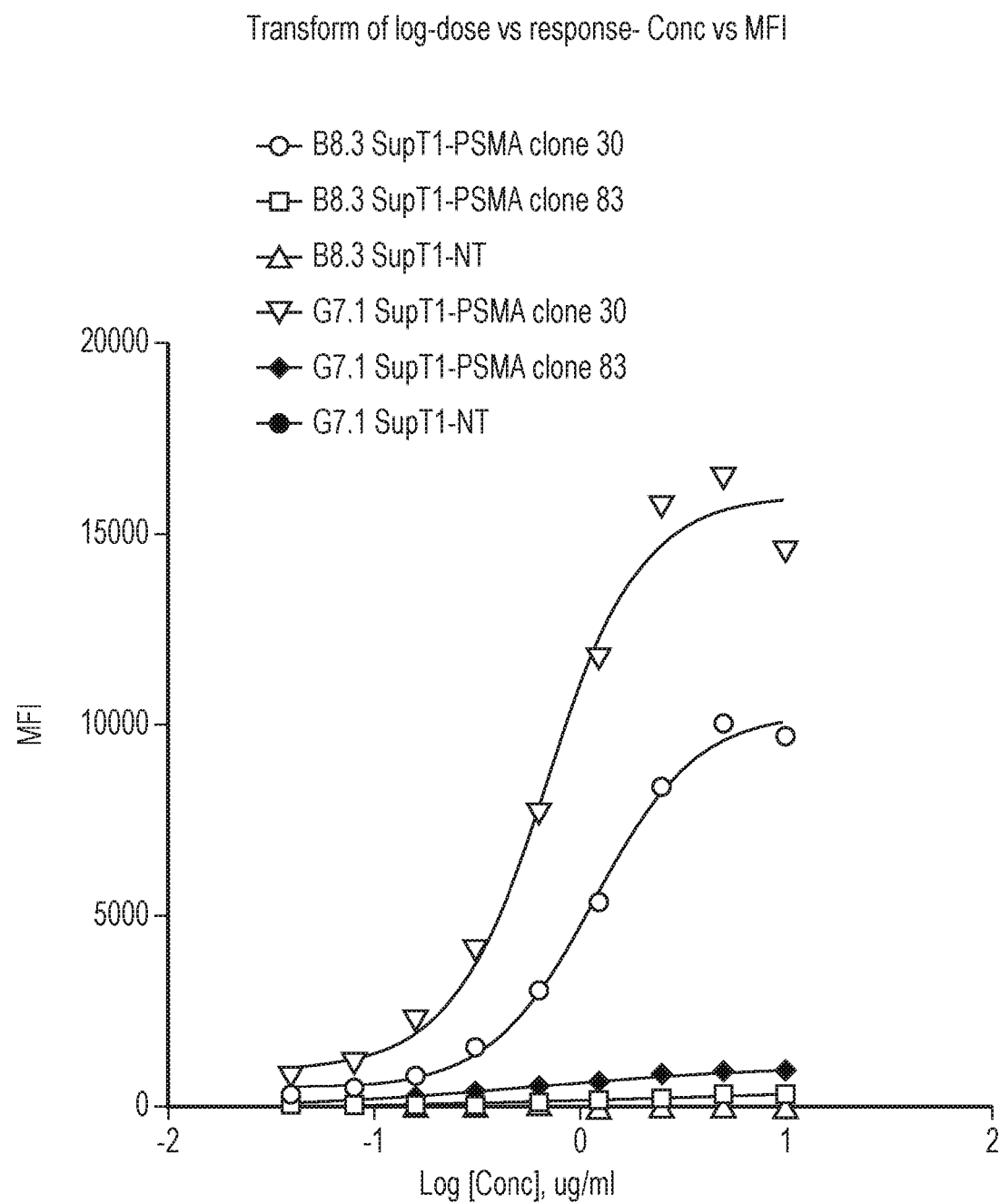

FIG. 7—ELISA screening of monoclonal C Myc tagged dAbs

Flow cytometry analysis of anti PSMA dAbs binding to SupT1 cells non-transduced or transduced with High (clone 30) or low (clone 83) PSMA expression. dAb clones B8 and G7 show high levels of specific binding.

FIG. 8

Flow cytometry analysis of Fc tagged dAbs as represented in FIG. 7.

FIG. 9

Flow cytometry analysis of NGS identified dAb sequence binding to PSMA expressing cell lines. dAbs 2 and 25 showed high binding to the appropriate cell lines.

FIG. 10

IHC staining of PSMA expressing cell lines using cell panning and NGS derived dAbs. Data suggests that clones 2 and 25 from NGS show comparable staining to positive controls (J591 and 7A12 antibodies).

Figure 11:
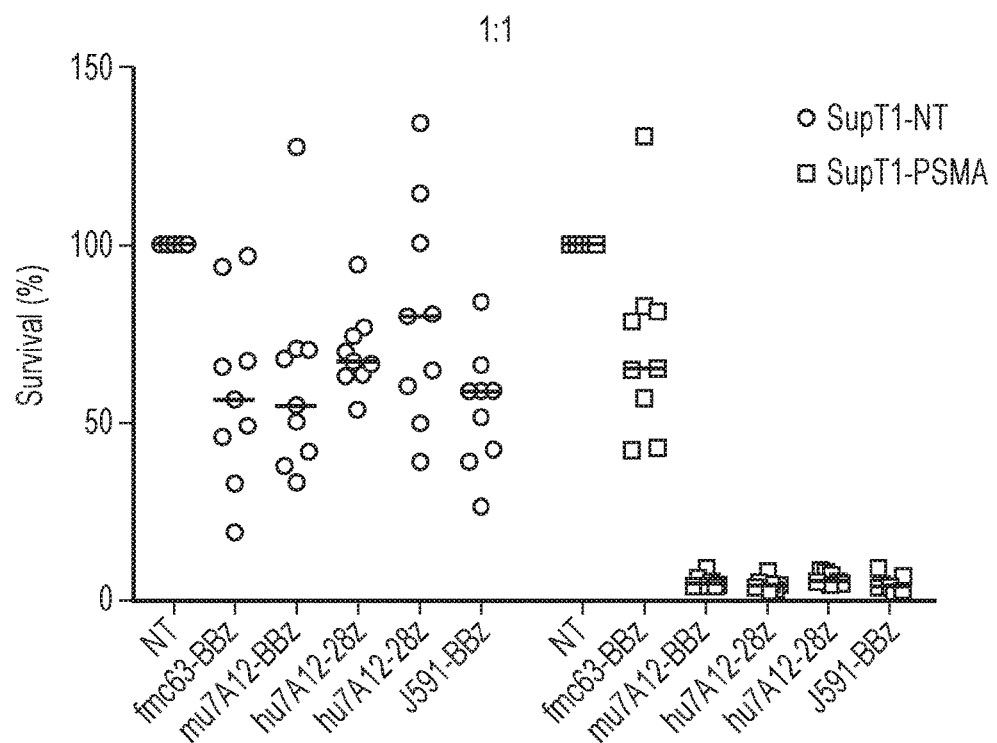
Figure 11:
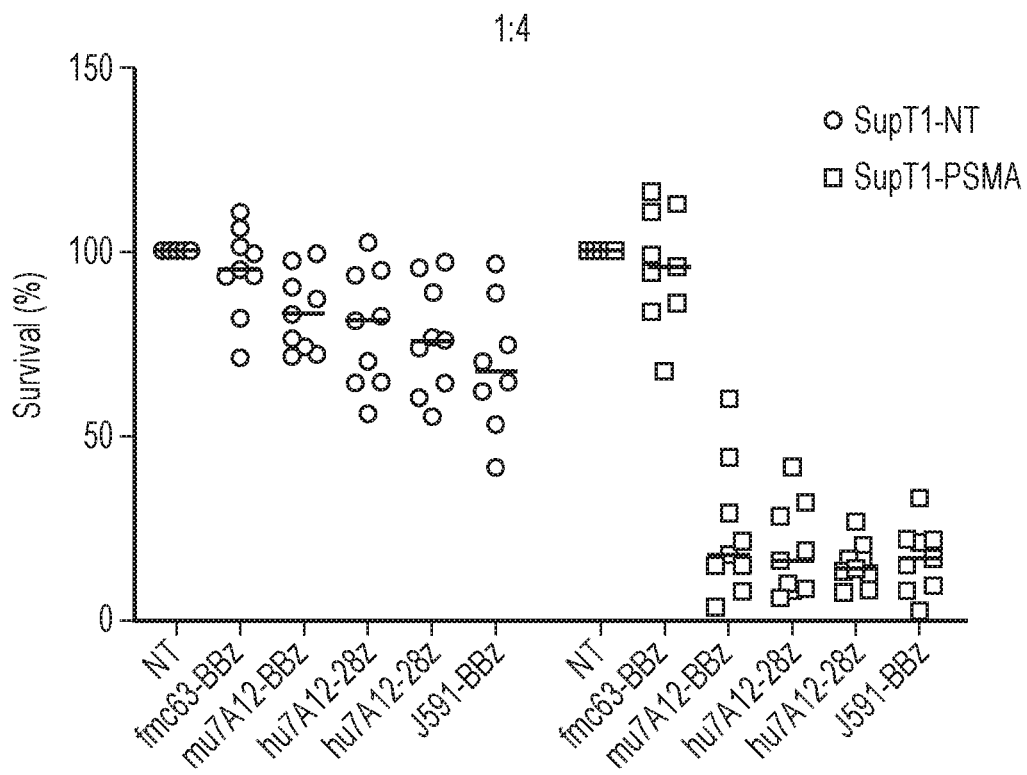
Figure 11:
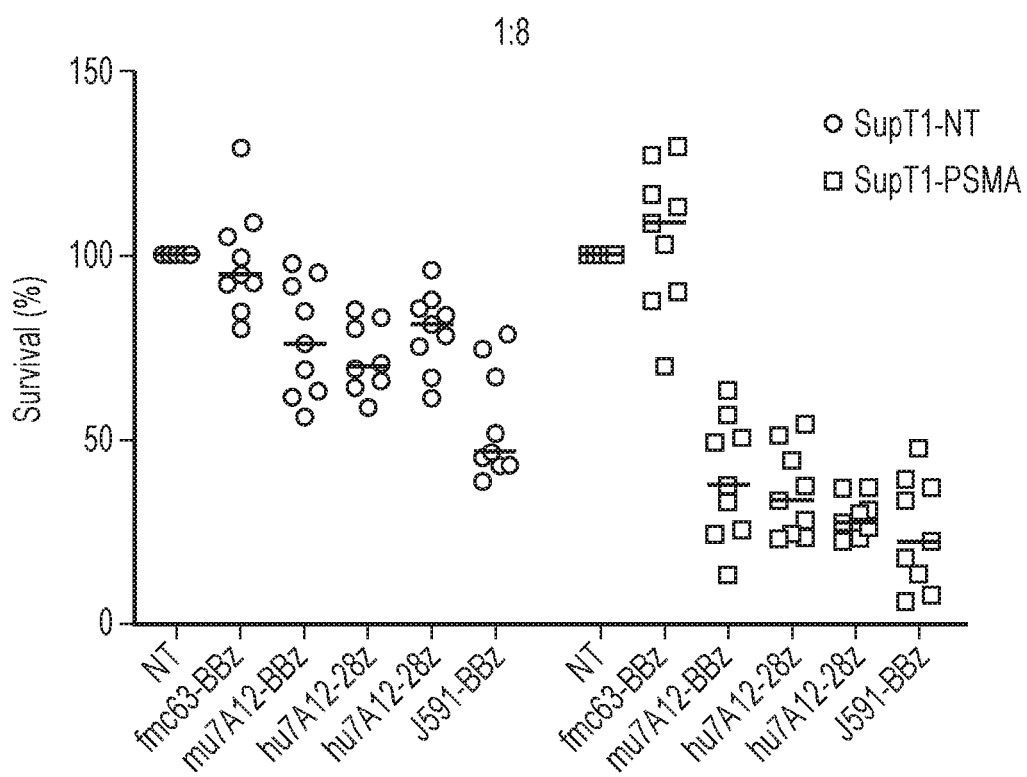

FIG. 11—FACS-based killing assay

Figure 12:
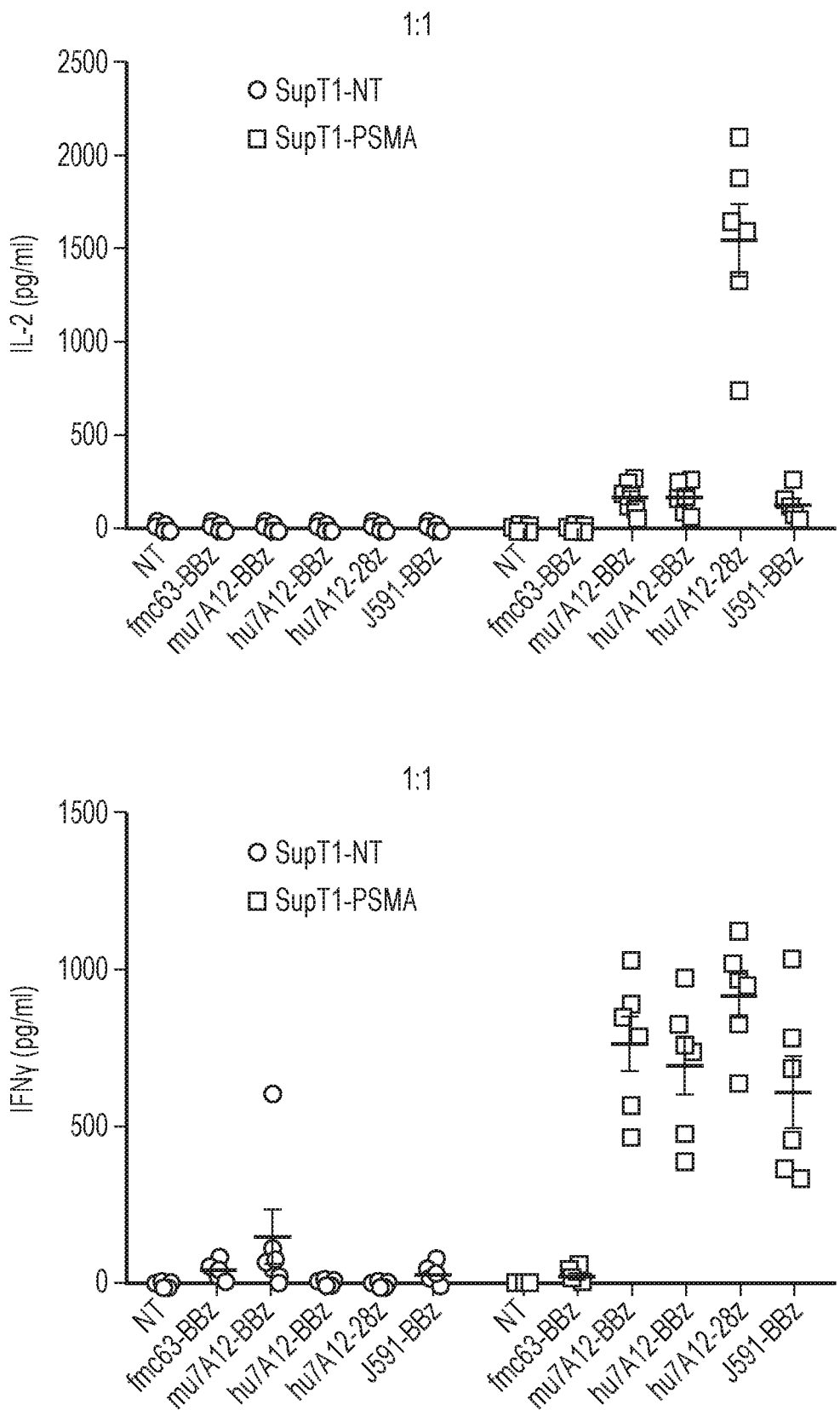
Figure 12:
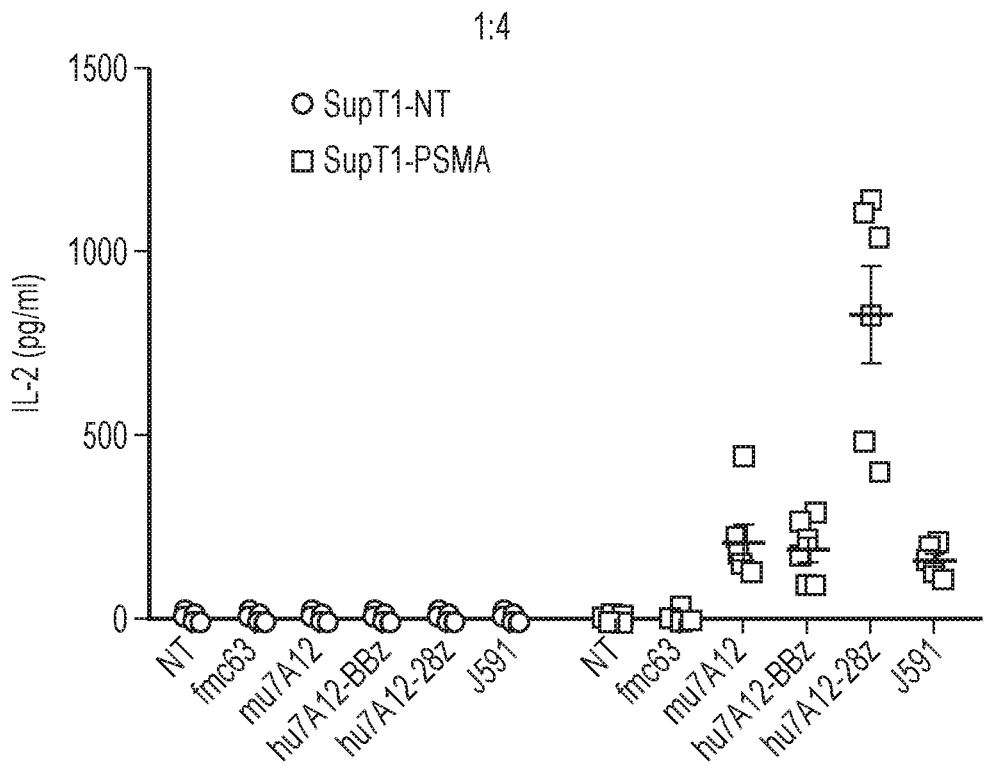
Figure 12:
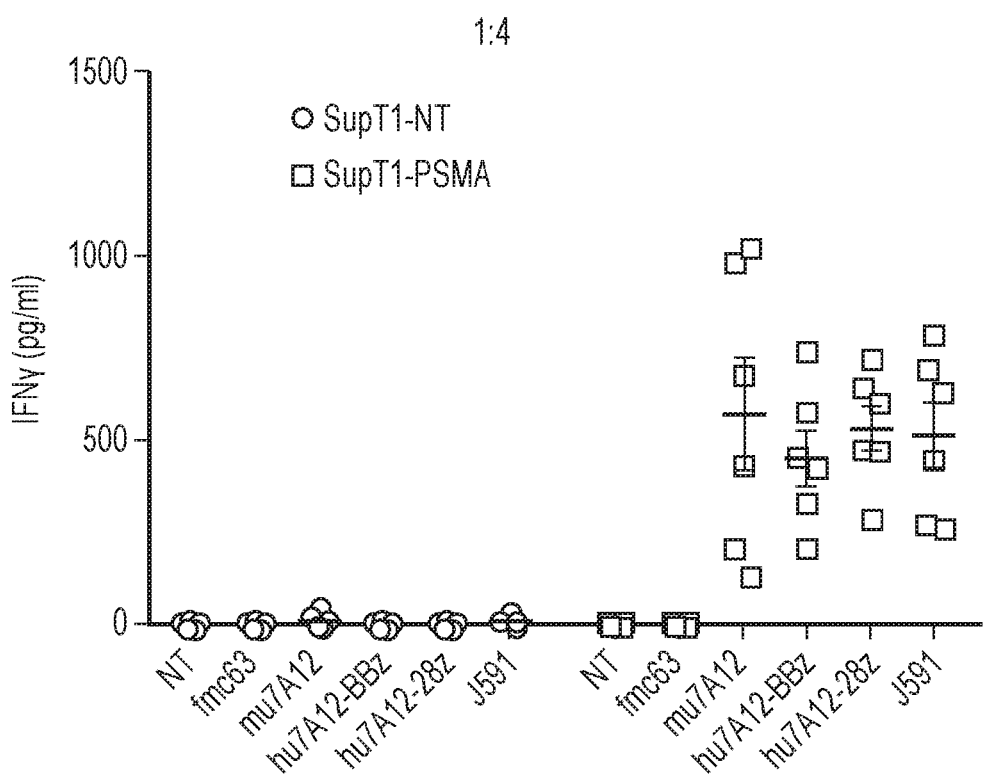
Figure 12:
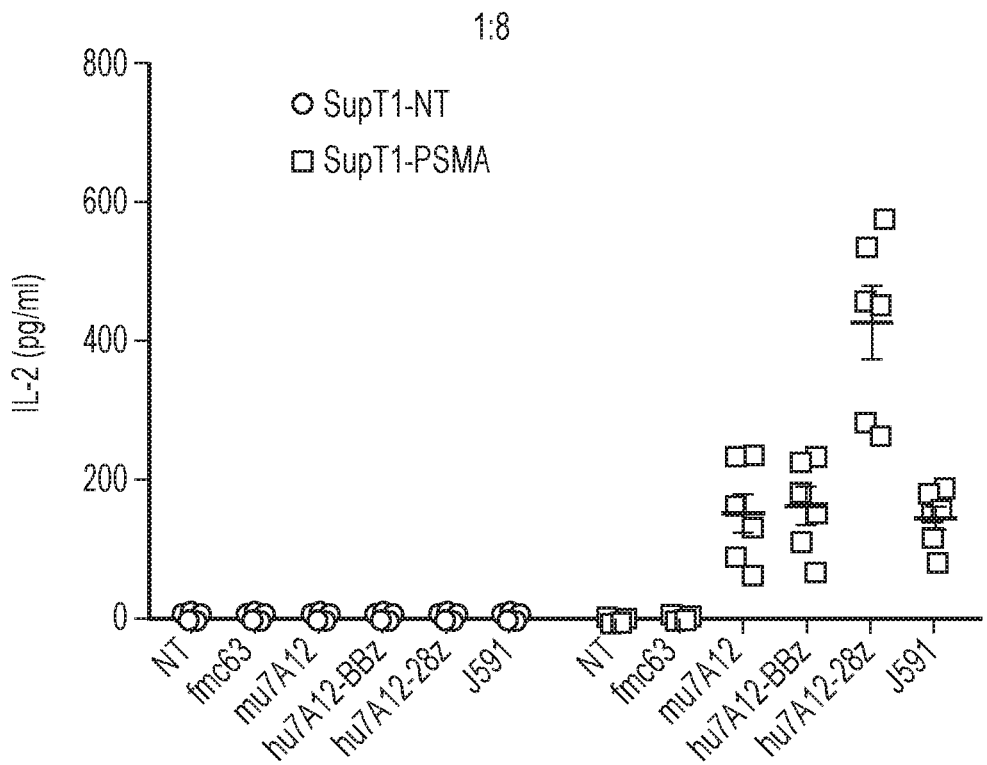
Figure 12:
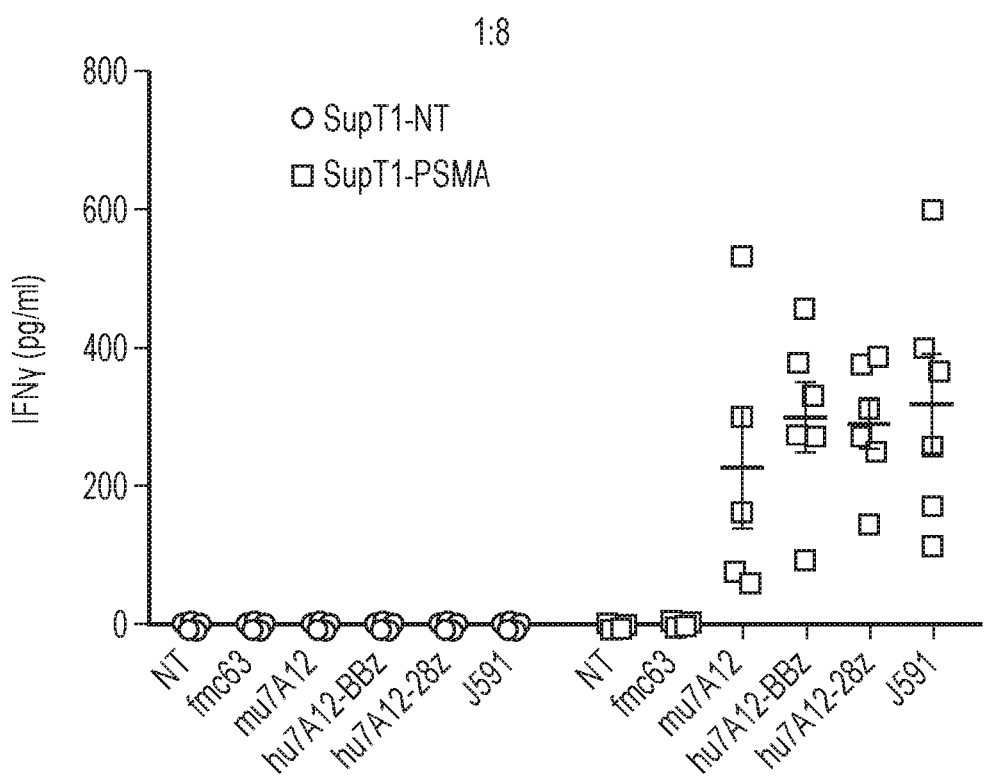

SupT1 cells engineered to express human PSMA antigen (SupT1-PSMA) were used as target cells. Non-engineered SupT1 cells (SupT1-NT) were used as a negative control. T-cells were co-cultured with target cells at 1:1, 1:4, and 1:8 effector to target ratios. FBK was assayed after 24 h of incubation and analysed by cytofluorimetry analysis FIG. 12—Cytokine release assay Secretion of IL-2 (top) and IFNγ (bottom) by CAR T-cells was measured by collecting supernatant at 24 hr from the co-cultures of CAR-T cells and SupT1 cells engineered to express human PSMA antigen (SupT1-PSMA) with non-engineered SupT1 cells (SupT1-NT) as a negative control. T-cells were co-cultured with target cells at 1:1, 1:4, and 1:8 effector to target ratios. Production of IL-2 and IFNγ was detected by ELISA.

SUMMARY OF ASPECTS OF THE INVENTION

The present inventors have identified and characterised new PSMA binding domains with improved properties.

Thus, in a first aspect, the present invention provides an antigen-binding domain which binds prostate-specific membrane antigen and comprises either:
  (a) a heavy chain variable region (VH) having complementarity determining regions (CDRs): HCDR1, HCDR2 and HCDR3; and a light chain variable region (VL) having CDRs: LCDR1, LCDR2 and LCDR3 selected from the following:
    (i) HCDR1—SEQ ID No. 1; HCDR2—SEQ ID No. 2; HCDR3—SEQ ID No. 3; LCDR1—SEQ ID No. 4; LCDR2—SEQ ID No. 5; LCDR3—SEQ ID No. 6;
    (ii) HCDR1—SEQ ID No. 9; HCDR2—SEQ ID No. 10; HCDR3—SEQ ID No. 11; LCDR1—SEQ ID No. 12; LCDR2—SEQ ID No. 13; LCDR3—SEQ ID No. 14;
    (iii) HCDR1—SEQ ID No. 17; HCDR2—SEQ ID No. 18; HCDR3—SEQ ID No. 19; LCDR1—SEQ ID No. 20; LCDR2—SEQ ID No. 21; LCDR3—SEQ ID No. 22;
    (iv) HCDR1—SEQ ID No. 25; HCDR2—SEQ ID No. 26; HCDR3—SEQ ID No. 27; LCDR1—SEQ ID No. 28; LCDR2—SEQ ID No. 29; LCDR3—SEQ ID No. 30; or
  (b) a domain antibody variable region having complementarity determining regions (CDRs): VHHCDR1, VHHCDR2 and VHHCDR3 selected from the following:
    (i) VHHCDR1—SEQ ID No. 33; VHHCDR2—SEQ ID No. 34; VHHCDR3—SEQ ID No. 35;
    (ii) VHHCDR1—SEQ ID No. 37; VHHCDR2—SEQ ID No. 38; VHHCDR3—SEQ ID No. 39;
    (iii) VHHCDR1—SEQ ID No. 41; VHHCDR2—SEQ ID No. 42; VHHCDR3—SEQ ID No. 43;
    (iv) VHHCDR1—SEQ ID No. 45; VHHCDR2—SEQ ID No. 46; VHHCDR3—SEQ ID No. 47; and
    (v) VHHCDR1—SEQ ID No. 49; VHHCDR2—SEQ ID No. 50; VHHCDR3—SEQ ID No. 51.

The antigen-binding domain may, for example, comprise either:
  (a) a heavy chain variable region (VH); and a light chain variable region (VL) selected from the following:
    (i) VH—SEQ ID No. 7, VL—SEQ ID No. 8;
    (ii) VH—SEQ ID No. 15, VL—SEQ ID No. 16;
    (iii) VH—SEQ ID No. 23, VL—SEQ ID No. 24; and
    (iv) VH—SEQ ID No. 31, VL—SEQ ID No. 32; or
  (b) a domain antibody variable region selected from the following:
    (i) SEQ ID No. 36;
    (ii) SEQ ID No. 40;
    (iii) SEQ ID No. 44;
    (iv) SEQ ID No. 48; and
    (v) SEQ ID No. 52.

In a second aspect, the present invention provides a chimeric antigen receptor (CAR) comprising an antigen-binding domain according to the first aspect of the invention.

In a third aspect, the present invention provides nucleic acid sequence which encodes an antigen-binding domain according to the first aspect of the invention or a CAR according to the second aspect of the invention.

In a fourth aspect, the present invention provides nucleic acid construct which comprises a nucleic acid sequence according to the third aspect of the invention and a nucleic acid sequence which encodes a suicide gene.

In a fifth aspect, the present invention provides vector which comprises a nucleic acid sequence according to the third aspect of the invention or a nucleic acid construct according to the fourth aspect of the invention.

In a sixth aspect, the present invention provides cell which expresses a CAR according to the second aspect of the invention.

In a seventh aspect, the present invention provides a method for making a cell according to the sixth aspect of the invention, which comprises the step of introducing a nucleic acid sequence which encodes a CAR according to the second aspect of the invention into a cell ex vivo.

In an eighth aspect, the present invention provides a pharmaceutical composition which comprises a plurality of cells according to the sixth aspect of the invention, together with a pharmaceutically acceptable carrier, diluent or excipient.

In a ninth aspect, the present invention provides method for treating cancer which comprises the step of administering a cell according to the sixth aspect of the invention to a subject.

In a tenth aspect, the present invention provides cell according to the sixth aspect of the invention for use in treating a cancer.

In an eleventh aspect, the present invention provides use of a cell according to the sixth aspect of the invention in the manufacture of a medicament for treating cancer.

DETAILED DESCRIPTION

Antigen-Binding Domain

The antigen-binding domain of the present invention is an antibody-based binding domain which specifically binds the target antigen PSMA.

The antigen-binding domain of an antibody, such as an IgG molecule, is made up of two variable domains, one derived from the heavy chain (VH) and one derived from the light chain (VL). Some of the antigen-binding domains of the present invention comprise both VH and VL domains.

Antigen binding domains of the present invention comprising a VH and a VL domain may, for example, be in a single-chain variable fragment (scFv) or Fab format. A CAR of the present invention may comprise such as scFv or Fab based antigen binding domain, as illustrated in FIGS. 3a (Fab) and 3c (scFv).

The antigen-binding domain may comprise a VH domain having complementarity determining regions (CDRs): HCDR1, HCDR2 and HCDR3; and a VL domain having CDRs: LCDR1, LCDR2 and LCDR3 selected from the following:
(i) HCDR1—SEQ ID No. 1; HCDR2—SEQ ID No. 2; HCDR3—SEQ ID No. 3; LCDR1—SEQ ID No. 4; LCDR2—SEQ ID No. 5; LCDR3—SEQ ID No. 6;
(ii) HCDR1—SEQ ID No. 9; HCDR2—SEQ ID No. 10; HCDR3—SEQ ID No. 11; LCDR1—SEQ ID No. 12; LCDR2—SEQ ID No. 13; LCDR3—SEQ ID No. 14;
(iii) HCDR1—SEQ ID No. 17; HCDR2—SEQ ID No. 18; HCDR3—SEQ ID No. 19; LCDR1—SEQ ID No. 20; LCDR2—SEQ ID No. 21; LCDR3—SEQ ID No. 22; and
(iv) HCDR1—SEQ ID No. 25; HCDR2—SEQ ID No. 26; HCDR3—SEQ ID No. 27; LCDR1—SEQ ID No. 28; LCDR2—SEQ ID No. 29; LCDR3—SEQ ID No. 30; or The positions of CDRs in a sequence may be determined by different numbering schemes, for example Kabat and IMGT. In the present application the Kabat numbering system is used unless otherwise indicated.

The antigen-binding domain may comprise one of the following pairs of VH/VL domains:

(i)
VH-, SEQ ID No. 7

VL-; SEQ ID No. 8

(ii)
VH-, SEQ ID No. 15

VL-; SEQ ID No. 16

(iii)
VH-, SEQ ID No. 23

VL-; SEQ ID No. 24
and (iv)
VH-, SEQ ID No. 31

VL-;. SEQ ID No. 32

(7A12 HCDR1)
SEQ ID No. 1
SSWMN (7A12 HCDR2)
SEQ ID No. 2
RIYPGDGDTTYNGNFKD (7A12 HCDR3)
SEQ ID No. 3
GTGYLWYFDV (7A12 LCDR1)
SEQ ID No. 4
KASQDINENVA (7A12 LCDR2)
SEQ ID No. 5
YTSALQS (7A12 LCDR3)
SEQ ID No. 6
QQYDNLPFT (7A12 VH)
SEQ ID No. 7
QFQLQQSGPELVKPGASVKISCKASGYAFSSSWMNWVRQRPGKGLEWIGR
IYPGDGDTTYNGNFKDKATLTAAKSSSTAYIQINSLTSEDSAVYFCARGT
GYLWYFDVWGAGTTVTVSS (7A12 VL)
SEQ ID No. 8
DIQMTQSPSSLSTSLGGKVTITCKASQDINENVAWYQHKPGKGPRLLIWY
TSALQSGIPSRFSGSGSGRDYSFSISNLEPEDIATYYCQQYDNLPFTFGS
GTKLEIKR (hu7A12 HCDR1)
SEQ ID No. 9
SSWMN (hu7A12 HCDR2)
SEQ ID No. 10
RIYPGDGDTNYAQKFQG (hu7A12 HCDR3)
SEQ ID No. 11
GTGYLWYFDV (hu7A12 LCDR1)
SEQ ID No. 12
RASQDINENLA (hu7A12 LCDR2)
SEQ ID No. 13
YTSNRAT (hu7A12 LCDR3)
SEQ ID No. 14
QQYDNLPFT (hu7A12 VH)
SEQ ID No. 15
QVQLVQSGAEVKKPGASVKVSCKASGYTFTSSWMNWVRQAPGQGLEWMGR
IYPGDGDTNYAQKFQGRVTMTRDTSISTAYMELSRLRSDDTAVYYCARGT
GYLWYFDVWGQGTMVTVSS (hu7A12 VL)
SEQ ID No. 16
EIVLTQSPATLSLSPGERATLSCRASQDINENLAWYQQKPGQAPRLLIYY
TSNRATGIPARFSGSGSGRDFTLTISSLEPEDFAVYYCQQYDNLPFTFGQ
GTKVEIKR (14G2 murine HCDR1)
SEQ ID No. 17
AYEMH (14G2 murine HCDR2)
SEQ ID No. 18
YISSGSDTISYAATVKG (14G2 murine HCDR3)
SEQ ID No. 19
PLGYGLDY (14G2 murine LCDR1)
SEQ ID No. 20
KASQDINNFIA (14G2 murine LCDR2)
SEQ ID No. 21
YTSSLQP (14G2 murine LCDR3)
SEQ ID No. 22
LQYDILFT (14G2 murine VH)
SEQ ID No. 23
EVQLVESGGGLVKPGGSLKLSCAASGFTFNAYEMHWVRQAPEKGLEWVAY
ISSGSDTISYAATVKGRFTISRDNAKNTLFLQMTSLRSEDTAMYYCTPPL
GYGLDYWGQGTSVIVSS (14G2 murine VL)
SEQ ID No. 24
DIQMTQSPSSLSASLGGKVTITCKASQDINNFIAWYQHKPGKGPRLLIHY
TSSLQPGFPSRFSGSGSGREYSFSISNVEPEDIATYYCLQYDILFTFGGG
TKLEIKR (10C11 murine HCDR1)
SEQ ID No. 25
NSWMN (10C11 murine HCDR2)
SEQ ID No. 26
RIYPGDGDATYNGNFKD (10C11 murine HCDR3)
SEQ ID No. 27
GTGYLWYFDV (10C11 murine LCDR1)
SEQ ID No. 28
KASQDINENIA (10C11 murine LCDR2)
SEQ ID No. 29
YTSALQS (10C11 murine LCDR3)
SEQ ID No. 30
HQYDNLPFT (10C11 murine VH)
SEQ ID No. 31
QVHLQQSGPELVKPGASVKISCKASGYAFSNSWMNWVRQRPGKGLEWIGR
IYPGDGDATYNGNFKDKATLTADKSSSTAYIQLNSLTSEDSAVYFCARGT
GYLWYFDVWGAGTTVTAS (10C11 murine VL)
SEQ ID No. 32
DIQMTQSPSSLSTFLGGKVTITCKASQDINENIAWYQHKPGKGPRLLIWY
TSALQSGIPSRFSGSGSGRDYSFSISNLEPEDIATYYCHQYDNLPFTFGS
GTKLEIKR The following alternative humanised light chains for 7A12 are also provided (CDRs determined according to Kabat numbering system):

(7A12 VL Alt1 LCDR1)
SEQ ID No. 53
KASQDINENVA (7A12 VL Alt1 LCDR2)
SEQ ID No. 54
YTSALQS (7A12 VL Alt1 LCDR3)
SEQ ID No. 55
QQYDNLPFT (7A12 VL Alt1)
SEQ ID No. 56
EIVLTQSPATLSLSPGERATLSCKASQDINENVAWYQQKPGQAPRLLIYY
TSALQSGIPARFSGSGSGTDFTLTISSLEPEDFAVYYCQQYDNLPFTFGQ
GTKVEIK (7A12 VL Alt2 LCDR1)
SEQ ID No. 57
KASQDINENVA (7A12 VL Alt2 LCDR2)
SEQ ID No. 58
YTSALQS (7A12 VL Alt2 LCDR3)
SEQ ID No. 59
QQYDNLPFT (7A12 VL Alt2)
SEQ ID No. 60
DIQMTQSPATLSLSPGERATLSCKASQDINENVAWYQHKPGQAPRLLIWY
TSALQSGIPARFSGSGSGRDYTLTISSLEPEDFAVYYCQQYDNLPFTFGQ
GTKVEIK (7A12 VL Alt3 LCDR1)
SEQ ID No. 61
RASQSVSSYLA (7A12 VL Alt3 LCDR2)
SEQ ID No. 62
DASNRAT (7A12 VL Alt3 LCDR3)
SEQ ID No. 63
QQYDNLPFT (7A12 VL Alt3)
SEQ ID No. 64
EIVLTQSPATLSLSPGERATLSCRASQSVSSYLAWYQHKPGQAPRLLIYD
ASNRATGIPARFSGSGSGTDFTLTISSLEPEDFAVYYCQQYDNLPFTFGQ
GTKVEIK (7A12 VL Alt4 LCDR1)
SEQ ID No. 65
KASQDINENVA (7A12 VL Alt4 LCDR2)
SEQ ID No. 66
YTSALQS (7A12 VL Alt4 LCDR3)
SEQ ID No. 67
QQYDNLPFT (7A12 VL Alt4)
SEQ ID No. 68
DIQMTQSPSSLSASVGDRVTITCKASQDINENVAWYQQKPGKAPKLLIYY
TSALQSGVPSRFSGSGSGTDFTFTISSLQPEDIATYYCQQYDNLPFTFGQ
GTKVEIK (7A12 VL Alt5 LCDR1)
SEQ ID No. 69
KASQDINENVA (7A12 VL Alt5 LCDR2)
SEQ ID No. 70
YTSALQS

-continued (7A12 VL Alt5 LCDR3)
SEQ ID No. 71
QQYDNLPFT (7A12 VL Alt5)
SEQ ID No. 72
DIQMTQSPSSLSASVGDRVTITCKASQDINENVAWYQHKPGKAPKLLIWY

TSALQSGVPSRFSGSGSGRDYTFTISSLQPEDIATYYCQQYDNLPFTFGQ

GTKVEIK (7A12 VL Alt6 LCDR1)
SEQ ID No. 73
QASQDISNYLN (7A12 VL Alt6 LCDR2)
SEQ ID No. 74
DASNLET (7A12 VL Alt6 LCDR3)
SEQ ID No. 75
QQYDNLPFT (7A12 VL Alt6)
SEQ ID No. 76
DIQMTQSPSSLSASVGDRVTITCQASQDISNYLNWYQQKPGKAPKLLIYD

ASNLETGVPSRFSGSGSGTDFTFTISSLQPEDIATYYCQQYDNLPFTFGQ

GTKVEIK (7A12 VL Alt7 LCDR1)
SEQ ID No. 77
KASQDINENVA (7A12 VL Alt7 LCDR2)
SEQ ID No. 78
DASNRAT (7A12 VL Alt7 LCDR3)
SEQ ID No. 79
QQYDNLPFT (7A12 VL Alt7)
SEQ ID No. 80
DIQMTQSPATLSLSPGERATLSCKASQDINENVAWYQHKPGQAPRLLIWD

ASNRATGIPARFSGSGSGRDYTLTISSLEPEDFAVYYCQQYDNLPFTFGQ

GTKVEIK (7A12 VL Alt8 LCDR1)
SEQ ID No. 81
RASQSVSSYLA (7A12 VL Alt8 LCDR2)
SEQ ID No. 82
YTSALQS (7A12 VL Alt8 LCDR3)
SEQ ID No. 83
QQYDNLPFT (7A12 VL Alt8)
SEQ ID No. 84
DIQMTQSPATLSLSPGERATLSCRASQSVSSYLAWYQHKPGQAPRLLIWY

TSALQSGIPARFSGSGSGRDYTLTISSLEPEDFAVYYCQQYDNLPFTFGQ

GTKVEIK (7A12 VL Alt9 LCDR1)
SEQ ID No. 85
KASQDINENVA (7A12 VL Alt9 LCDR2)
SEQ ID No. 86
YTSNRAT (7A12 VL Alt9 LCDR3)
SEQ ID No. 87
QQYDNLPFT (7A12 VL Alt9)
SEQ ID No. 88
DIQMTQSPATLSLSPGERATLSCKASQDINENVAWYQHKPGQAPRLLIWY

TSNRATGIPARFSGSGSGRDYTLTISSLEPEDFAVYYCQQYDNLPFTFGQ

GTKVEIK (7A12 VL Alt10 LCDR1)
SEQ ID No. 89
RASQSVSSYLA (7A12 VL Alt10 LCDR2)
SEQ ID No. 90
YTSNRAT (7A12 VL Alt10 LCDR3)
SEQ ID No. 91
QQYDNLPFT (7A12 VL Alt10)
SEQ ID No. 92
DIQMTQSPATLSLSPGERATLSCRASQSVSSYLAWYQHKPGQAPRLLIWY

TSNRATGIPARFSGSGSGRDYTLTISSLEPEDFAVYYCQQYDNLPFTFGQ

GTKVEIK (7A12 VL Alt11 LCDR1)
SEQ ID No. 93
KASQDINENVA (7A12 VL Alt11 LCDR2)
SEQ ID No. 94
YTSALQS (7A12 VL Alt11 LCDR3)
SEQ ID No. 95
QQYDNLPFT (7A12 VL Alt11)
SEQ ID No. 96
EIVLTQSPATLSLSPGERATLSCKASQDINENVAWYQQKPGQAPRLLIYY

TSALQSGIPARFSGSGSGSGRDYTLTISSLEPEDFAVYYCQQYDNLPFTF

GQGTKVEIK (7A12 VL Alt12 LCDR1)
SEQ ID No. 97
KASQDINENVA (7A12 VL Alt12 LCDR2)
SEQ ID No. 98
YTSALQS (7A12 VL Alt12 LCDR3)
SEQ ID No. 99
QQYDNLPFT (7A12 VL Alt12)
SEQ ID No. 100
DIVMTQSPATLSLSPGERATLSCKASQDINENVAWYQHKPGQAPRLLIWY

TSALQSGIPARFSGSGSGTDFTLTISSLEPEDFAVYYCQQYDNLPFTFGQ

GTKVEIK (7A12 VL Alt13 LCDR1)
SEQ ID No. 101
KASQDINENVA (7A12 VL Alt13 LCDR2)
SEQ ID No. 102
YTSALQS

-continued (7A12 VL Alt13 LCDR3)
SEQ ID No. 103
QQYDNLPFT (7A12 VL Alt13)
SEQ ID No. 104
DIVMTQSPATLSLSPGERATLSCKASQDINENVAWYQHKPGQAPRLLIWY
TSALQSGIPARFSGSGSGSGRDYTLTISSLEPEDFAVYYCQQYDNLPFTF
GQGTKVEIK (7A12 VL Alt14 LCDR1)
SEQ ID No. 105
KASQDINENVA (7A12 VL Alt14 LCDR2)
SEQ ID No. 106
YTSALQS (7A12 VL Alt14 LCDR3)
SEQ ID No. 107
QQYDNLPFT (7A12 VL Alt14)
SEQ ID No. 108
EIQLTQSPATLSLSPGERATLSCKASQDINENVAWYQQKPGQAPRLLIYY
TSALQSGIPARFSGSGSGTDFTLTISSLEPEDFAVYYCQQYDNLPFTFGQ
GTKVEIK (7A12 VL Alt15 LCDR1)
SEQ ID No. 109
KASQDINENVA (7A12 VL Alt15 LCDR2)
SEQ ID No. 110
YTSALQS (7A12 VL Alt15 LCDR3)
SEQ ID No. 111
QQYDNLPFT (7A12 VL Alt15)
SEQ ID No. 112
EIQLTQSPATLSLSPGERATLSCKASQDINENVAWYQQKPGQAPRLLIYY
TSALQSGIPARFSGSGSGSGRDYTLTISSLEPEDFAVYYCQQYDNLPFTF
GQGTKVEIK (7A12 VL Alt16 LCDR1)
SEQ ID No. 113
KASQDINENVA (7A12 VL Alt16 LCDR2)
SEQ ID No. 114
YTSALQS (7A12 VL Alt16 LCDR3)
SEQ ID No. 115
QQYDNLPFT (7A12 VL Alt16)
SEQ ID No. 116
DIQMTQSPATLSLSPGERATLSCKASQDINENVAWYQHKPGQAPRLLIWY
TSALQSGIPARFSGSGSGTDFTLTISSLEPEDFAVYYCQQYDNLPFTFGQ
GTKVEIK In addition, humanised heavy chains for 7A12 are also provided (CDRs determined according to Kabat numbering system):

(7A12 VH Alt1 LCDR1)
SEQ ID No. 117
SSWMN (7A12 VH Alt1 LCDR2)
SEQ ID No. 118
RIYPGDGDTTYNGNFKD (7A12 VH Alt1 LCDR3)
SEQ ID No. 119
GTGYLWYFDV (7A12 VH Alt1)
SEQ ID No. 120
QVQLVQSGAEVKKPGASVKVSCKASGYTFTSSWMNWVRQAPGQGLEWMGR
IYPGDGDTTYNGNFKDRVTMTRDTSISTAYMELSRLRSDDTAVYYCARGT
GYLWYFDVWGQGTMVTVSS (7A12 VH Alt2 LCDR1)
SEQ ID No. 121
SSWMN (7A12 VH Alt2 LCDR2)
SEQ ID No. 122
RIYPGDGDTTYNGNFKD (7A12 VH Alt2 LCDR3)
SEQ ID No. 123
GTGYLWYFDV (7A12 VH Alt2)
SEQ ID No. 124
QFQLVQSGAEVKKPGASVKVSCKASGYAFSSSWMNWVRQAPGQGLEWMGR
IYPGDGDTTYNGNFKDRATLTADKSISTAYMELSRLRSDDTAVYFCARGT
GYLWYFDVWGQGTMVTVSS (7A12 VH Alt3 LCDR1)
SEQ ID No. 125
SSWMN (7A12 VH Alt3 LCDR2)
SEQ ID No. 126
RIYPGDGDTTYNGNFKD (7A12 VH Alt3 LCDR3)
SEQ ID No. 127
GTGYLWYFDV (7A12 VH Alt3)
SEQ ID No. 128
EVQLVESGGGLVQPGGSLRLSCAASGFTFSSSWMNWVRQAPGKGLVWVSR
IYPGDGDTTYNGNFKDRFTISRDNAKNTLYLQMNSLRAEDTAVYYCARGT
GYLWYFDVWGQGTMVTVSS (7A12 VH Alt4 LCDR1)
SEQ ID No. 129
SSWMN (7A12 VH Alt4 LCDR2)
SEQ ID No. 130
RIYPGDGDTTYNGNFKD (7A12 VH Alt4 LCDR3)
SEQ ID No. 131
GTGYLWYFDV (7A12 VH Alt4)
SEQ ID No. 132
EFQLVESGGGLVQPGGSLRLSCAASGYAFSSSWMNWVRQAPGKGLVWVGR
IYPGDGDTTYNGNFKDRATISADKAKNTAYLQMNSLRAEDTAVYFCARGT
GYLWYFDVWGQGTMVTVSS (7A12 VH Alt5 LCDR1)
SEQ ID No. 133
SSWMN

-continued (7A12 VH Alt5 LCDR2)
SEQ ID No. 134
RINPNSGGTNYAQKFQG (7A12 VH Alt5 LCDR3)
SEQ ID No. 135
GTGYLWYFDV (7A12 VH Alt5)
SEQ ID No. 136
QVQLVQSGAEVKKPGASVKVSCKASGYTFTSSWMNWVRQAPGQGLEWMGR
INPNSGGTNYAQKFQGRVTMTRDTSISTAYMELSRLRSDDTAVYYCARGT
GYLWYFDVWGQGTMVTVSS (7A12 VH Alt6 LCDR1)
SEQ ID No. 137
SSWMN (7A12 VH Alt6 LCDR2)
SEQ ID No. 138
RIYPGDGDTTYNGNFKD (7A12 VH Alt6 LCDR3)
SEQ ID No. 139
GTGYLWYFDV (7A12 VH Alt6)
SEQ ID No. 140
QFQLQESGPGLVKPSETLSLTCTVSGYAFSSSWMNWIRQPPGKGLEWIGR
IYPGDGDTTYNGNFKDRATISADKSKNQASLKLSSVTAADTAVYFCARGT
GYLWYFDVWGKGTTVTVSS (7A12 VH Alt7 LCDR1)
SEQ ID No. 141
GYYMH (7A12 VH Alt7 LCDR2)
SEQ ID No. 142
RIYPGDGDTTYNGNFKD (7A12 VH Alt7 LCDR3)
SEQ ID No. 143
GTGYLWYFDV (7A12 VH Alt7)
SEQ ID No. 144
QVQLVQSGAEVKKPGASVKVSCKASGYTFTGYYMHWVRQAPGQGLEWMGR
IYPGDGDTTYNGNFKDRVTMTRDTSISTAYMELSRLRSDDTAVYYCARGT
GYLWYFDVWGQGTMVTVSS (7A12 VH Alt8 LCDR1)
SEQ ID No. 145
GYYMH (7A12 VH Alt8 LCDR2)
SEQ ID No. 146
RIYPGDGDTNYAQKFQG (7A12 VH Alt8 LCDR3)
SEQ ID No. 147
GTGYLWYFDV (7A12 VH Alt8)
SEQ ID No. 148
QVQLVQSGAEVKKPGASVKVSCKASGYTFTGYYMHWVRQAPGQGLEWMGR
IYPGDGDTNYAQKFQGRVTMTRDTSISTAYMELSRLRSDDTAVYYCARGT
GYLWYFDVWGQGTMVTVSS From these sequences, the following consensus sequences for the CDRs can be determined, in which 'X' may be any natural amino acid:

| CDR | IMGT Consensus (SEQ ID No.) | Kabat Consensus (SEQ ID No.) |
|---|---|---|
| LCDR1 | QXXXXX (149) | XASQXXXXXXX (152) |
| LCDR2 | XXS (150) | XXSXXXX (153) |
| LCDR3 | QQYDNLPFT (151) | QQYDNLPFT (154) |
| HCDR1 | GXXFXXXX (155) | XXXMX (158) |
| HCDR2 | IXPXXXXX (156) | RIXPXXGXTXYXXXFXX (159) |
| HCDR3 | ARGTGYLWYFDV (157) | GTGYLWYFDV (160) |

Alternatively, the antigen-binding domain of the present invention may comprise a single variable domain.

A single-domain antibody (sdAb), also known as a nanobody, is an antibody fragment consisting of a single monomeric variable antibody domain.

The first single-domain antibodies were engineered from heavy-chain antibodies found in camelids; these are called VHH fragments. Cartilaginous fishes also have heavy-chain antibodies (IgNAR, 'immunoglobulin new antigen receptor'), from which single-domain antibodies called VNAR fragments can be obtained. Although most research into single-domain antibodies is currently based on heavy chain variable domains, nanobodies derived from light chains have also been shown to bind specifically to target epitopes.

An antigen-binding domain of the present invention may comprise a domain antibody variable region having complementarity determining regions (CDRs): VHHCDR1, VHHCDR2 and VHHCDR3 selected from the following:
VHHCDR1—SEQ ID No. 33; VHHCDR2—SEQ ID No. 34; VHHCDR3—SEQ ID No. 35;
(ii) VHHCDR1—SEQ ID No. 37; VHHCDR2—SEQ ID No. 38; VHHCDR3—SEQ ID No. 39;
(iii) VHHCDR1—SEQ ID No. 41; VHHCDR2—SEQ ID No. 42; VHHCDR3—SEQ ID No. 43;
(iv) VHHCDR1—SEQ ID No. 45; VHHCDR2—SEQ ID No. 46; VHHCDR3—SEQ ID No. 47; and
(v) VHHCDR1—SEQ ID No. 49; VHHCDR2—SEQ ID No. 50; VHHCDR3—SEQ ID No. 51.

The antigen binding domain may, for example, comprise a domain antibody variable region selected from the following:

(i)
SEQ ID No. 36
;

(ii)
SEQ ID No. 40
;

(iii)
SEQ ID No. 44
;

(iv)
SEQ ID No. 48
;
and
(v)
SEQ ID No. 52
.

(A02 VHHCDR1)
SEQ ID No. 33
TYGTG

```
(A02 VHHCDR2)
                                         SEQ ID No. 34
GISGRGGYTSYIDSVKG (A02 VHHCDR3)
                                         SEQ ID No. 35
DRRMVWGTVRSPDEYDS (A02)
                                         SEQ ID No. 36
QVQLQESGGGLVQPGGSLRLSCAASERTFSTYGTGWFRQAPGKEREFVAG
ISGRGGYTSYIDSVKGRFTISRDNAKNTVYLQMNSLKPEDTAVYYCAADR
RMVWGTVRSPDEYDSWGQGTQVTVSS (B08 VHHCDR1)
                                         SEQ ID No. 37
RYVMG (B08 VHHCDR2)
                                         SEQ ID No. 38
AISWSGSNTNYADSVKG (B08 VHHCDR3)
                                         SEQ ID No. 39
SGQWIIPTTARGYDD (B08)
                                         SEQ ID No. 40
QVQLQQSGGGLVQAGGSLRLSCAASGRTYGRYVMGWFRQIPGKEREFVAA
ISWSGSNTNYADSVKGRFTISRDNAKNTLYLQMNSLKPEDTAVYYCAASG
QWIIPTTARGYDDWGQGTQVTVSS (G07 VHHCDR1)
                                         SEQ ID No. 41
TYGTG (G07 VHHCDR2)
                                         SEQ ID No. 42
GISGRGGYTSYIDSVKG (G07 VHHCDR3)
                                         SEQ ID No. 43
DRRMVWGTVRSPDEYDS (G07)
                                         SEQ ID No. 44
QVQLQESGGGSVQAGGSLRLSCAASERTFSTYGTGWFRQAPGKEREFVAG
ISGRGGYTSYIDSVKGRFTTSRDNAKNTVYLQMNSLKPEDTAVYYCAADR
RMVWGTVRSPDEYDSWGQGTQVTVSS (NGS2 VHHCDR1)
                                         SEQ ID NO. 45
TYTMG (NGS2 VHHCDR2)
                                         SEQ ID No. 46
GITWSTWSSDKTQYLDSVNS (NGS2 VHHCDR3)
                                         SEQ ID No. 47
TPRYYGVAVPTTRGPYDY (NGS2)
                                         SEQ ID No. 48
QVQLQESGGGWVQAGGSLRLSCAASGRTSRTYTMGWFRQAPGKDGVFVAG
ITWSTWSSDKTQYLDSVNSRFTISRDNARNTVYLQMNNLKPEDTAVYYCA
ATPRYYGVAVPTTRGPYDYWGQGTQVTVSS (NGS25 VHHCDR1)
                                         SEQ ID No. 49
INTMH (NGS25 VHHCDR2)
                                         SEQ ID No. 50
TITSGGSTNYADSVKG (NGS25 VHHCDR3)
                                         SEQ ID No. 51
YYYRAY (NGS25)
                                         SEQ ID No. 52
QVQLQQSGGGLVQPGGSLRLSCADSGSIFRINTMHWYRQAPGKQRELVAT
ITSGGSTNYADSVKGRFTISRDNTKNTMYLQMNSLKAEDTAVYYCYTYYY
RAYWGQGTQVTVSS
```

The present inventors have found that the antigen-binding domains of the present invention have improved stability at acidic pH (see example 7). Since the tumor micro-environment is acidic, it is proposed that these antigen-binding domains have beneficial properties in the treatment of solid cancers.

Chimeric Antigen Receptors (CARS)

A classical chimeric antigen receptor (CAR) is a chimeric type I trans-membrane protein which connects an extracellular antigen-recognizing domain (binder) to an intracellular signalling domain (endodomain). The binder is typically a single-chain variable fragment (scFv) derived from a monoclonal antibody (mAb), but it can be based on other formats which comprise an antibody-like antigen binding site. A spacer domain is usually necessary to isolate the binder from the membrane and to allow it a suitable orientation. A common spacer domain used is the Fc of IgG1. More compact spacers can suffice e.g. the stalk from CD8a and even just the IgG1 hinge alone, depending on the antigen. A trans-membrane domain anchors the protein in the cell membrane and connects the spacer to the endodomain.

Figure 1:
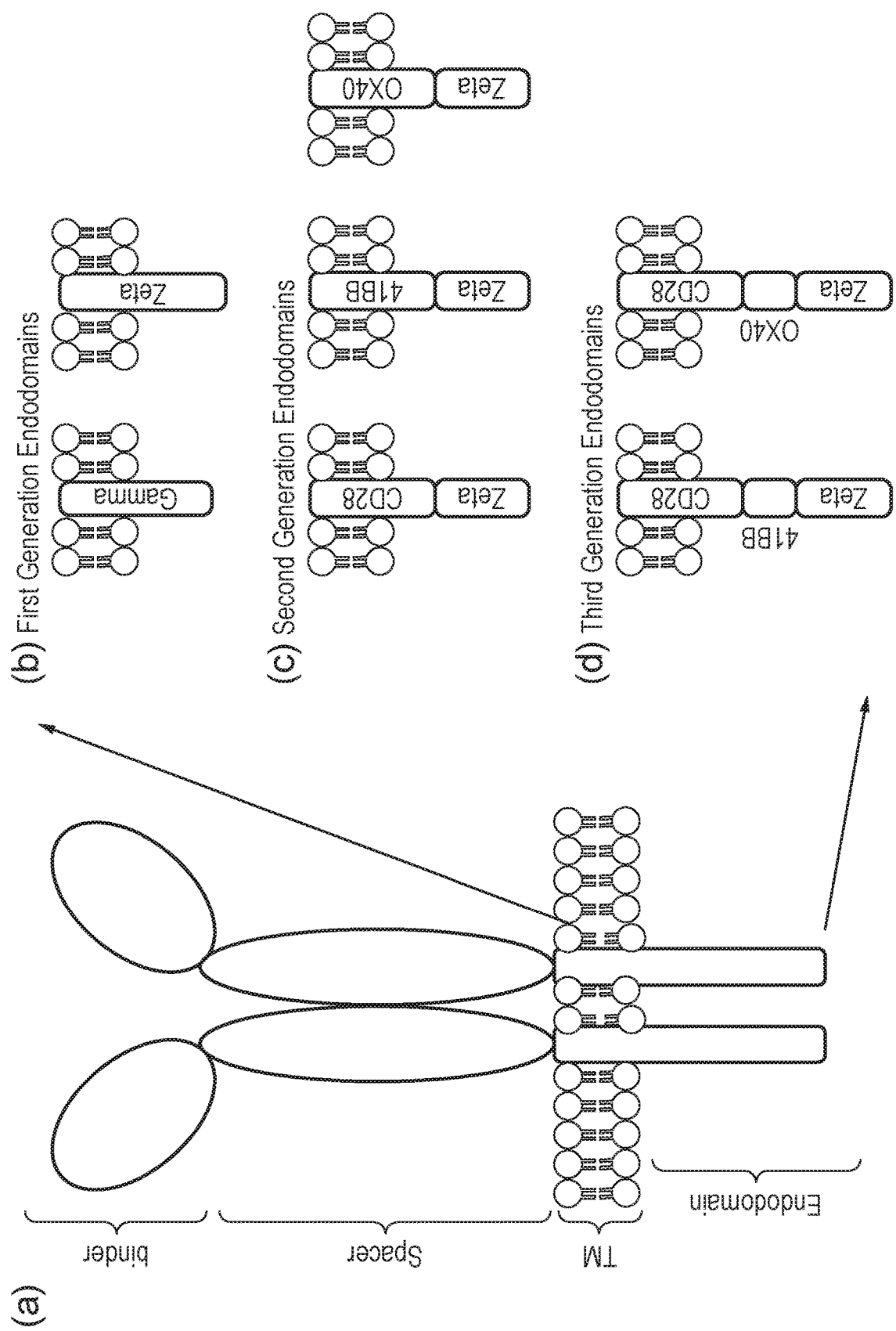
FIG. 1—Chimeric Antigen Receptor (CAR) design.

Early CAR designs had endodomains derived from the intracellular parts of either the γ chain of the FcεR1 or CD3ζ. Consequently, these first generation receptors transmitted immunological signal 1, which was sufficient to trigger T-cell killing of cognate target cells but failed to fully activate the T-cell to proliferate and survive. To overcome this limitation, compound endodomains have been constructed: fusion of the intracellular part of a T-cell co-stimulatory molecule to that of CD3ζ results in second generation receptors which can transmit an activating and co-stimulatory signal simultaneously after antigen recognition. The co-stimulatory domain most commonly used is that of CD28. This supplies the most potent co-stimulatory signal—namely immunological signal 2, which triggers T-cell proliferation. Some receptors have also been described which include TNF receptor family endodomains, such as the closely related OX40 and 41BB which transmit survival signals. Even more potent third generation CARs have now been described which have endodomains capable of transmitting activation, proliferation and survival signals (FIG. 1).

When the CAR binds the target-antigen, this results in the transmission of an activating signal to the T-cell it is expressed on. Thus the CAR directs the specificity and cytotoxicity of the T cell towards tumour cells expressing the targeted antigen.

CARs typically therefore comprise: (i) an antigen-binding domain; (ii) a spacer; (iii) a transmembrane domain; and (iii) an intracellular domain which comprises or associates with a signalling domain.

A CAR may have the general structure:

Antigen binding domain—spacer domain—transmembrane domain—intracellular signaling domain (endodomain).

CAR Antigen Binding Domain

The antigen binding domain is the portion of the chimeric receptor which recognizes antigen. In a classical CAR, the antigen-binding domain comprises: a single-chain variable fragment (scFv) derived from a monoclonal antibody (see FIG. 3c). CARs have also been produced with domain antibody (dAb) or VHH antigen binding domains (see FIG. 3b).

A CAR may comprise a Fab fragment of an antibody (see FIG. 3a). A FabCAR comprises two chains: one having an antibody-like light chain variable region (VL) and constant region (CL); and one having a heavy chain variable region (VH) and constant region (CH). One chain also comprises a transmembrane domain and an intracellular signalling domain. Association between the CL and CH causes assembly of the receptor.

The two chains of a Fab CAR may have the general structure:

VH—CH—spacer—transmembrane domain—intracellular signalling domain; and
VL—CL or
VL—CL—spacer—transmembrane domain—intracellular signalling domain; and VH—CH For the Fab-type chimeric receptors described herein, the antigen binding domain is made up of a VH from one polypeptide chain and a VL from another polypeptide chain.

The polypeptide chains may comprise a linker between the VH/VL domain and the CH/CL domains. The linker may be flexible and serve to spatially separate the VH/VL domain from the CH/CL domain.

Alternatively, a CAR may comprise a single-chain variable fragment (scFv) fragment of an antibody (see FIG. 3c). In these "classical" CARs, the VH and VL domains may be in either orientation in the molecule, giving the general structure:

VH—VL—spacer—transmembrane domain—intracellular signalling domain, or
VL—VH—spacer—transmembrane domain—intracellular signalling domain.

The polypeptide chain may comprise a linker between the VH domain and the VL domains to provide sufficient flexibility to enable VH/VL pairing and formation of the antigen-binding site.

Alternatively, a CAR may comprise a domain-antibody (dAb)-type antigen-binding domain (FIG. 3b). Such a CAR may have the general structure:

dAb—spacer—transmembrane domain—intracellular signalling domain

Spacer

CARs generally comprise a spacer sequence or hinge region to connect the antigen-binding domain with the transmembrane domain and spatially separate the antigen-binding domain from the endodomain. A flexible spacer allows the antigen-binding domain to orient in different directions to facilitate binding.

The spacer may be derived from all or part of naturally occurring molecules, such as from all or part of the extracellular region of CD8, CD4 or CD28, or from all or part of an antibody constant region. In particular the spacer may be derived from human CD8 alpha chain, FcγRIIIα receptor or IgG1. The spacer may be a synthetic sequence that corresponds to a naturally occurring hinge sequence or may be an entirely synthetic sequence. The spacer may comprise up to 300 amino acids, for example 10 to 100 amino acids and or 25 to 50 amino acids.

Transmembrane Domain

The transmembrane domain is the portion of the chimeric receptor which spans the membrane. The transmembrane domain may be any protein structure which is thermodynamically stable in a membrane. This is typically an alpha helix comprising of several hydrophobic residues. The transmembrane domain of any transmembrane protein can be used to supply the transmembrane portion of the chimeric receptor. The presence and span of a transmembrane domain of a protein can be determined by those skilled in the art using the TMHMM algorithm (http://www.cbs.dtu.dk/services/TMHMM-2.0/). Alternatively, an artificially designed TM domain may be used.

Endodomain

The endodomain is the signal-transmission portion of the chimeric receptor. It may be part of or associate with the intracellular domain of the chimeric receptor. After antigen recognition, receptors cluster, native CD45 and CD148 are excluded from the synapse and a signal is transmitted to the cell. The most commonly used endodomain component is that of CD3-zeta which contains 3 ITAMs. This transmits an activation signal to the T cell after antigen is bound. CD3-zeta may not provide a fully competent activation signal and additional co-stimulatory signalling may be needed. Co-stimulatory signals promote T-cell proliferation and survival. There are two main types of co-stimulatory signals: those that belong the Ig family (CD28, ICOS) and the TNF family (OX40, 41BB, CD27, GITR etc). For example, chimeric CD28 and OX40 can be used with CD3-Zeta to transmit a proliferative/survival signal, or all three can be used together.

The endodomain may comprise:
(i) an ITAM-containing endodomain, such as the endodomain from CD3 zeta; and/or
(ii) a co-stimulatory domain, such as the endodomain from CD28 or ICOS; and/or
(iii) a domain which transmits a survival signal, for example a TNF receptor family endodomain such as OX-40, 4-1BB, CD27 or GITR.

A number of systems have been described in which the antigen recognition portion is on a separate molecule from the signal transmission portion, such as those described in WO015/150771; WO2016/124930 and WO2016/030691. The chimeric receptor of the present invention may therefore comprise an antigen-binding component comprising an antigen-binding domain and a transmembrane domain; which is capable of interacting with a separate intracellular signalling component comprising a signalling domain. The vector of the invention may express a chimeric receptor signalling system comprising such an antigen-binding component and intracellular signalling component.

The chimeric receptor may comprise a signal peptide so that when it is expressed inside a cell, the nascent protein is directed to the endoplasmic reticulum and subsequently to the cell surface, where it is expressed. The signal peptide may be at the amino terminus of the molecule.

Prostate-Specific Membrane Antigen (PSMA)

Prostate-specific membrane antigen is a class II membrane glycoprotein that catalyzes the hydrolysis of N-acetylaspartylglutamate (NAAG) to glutamate and N-acetylaspartate (NAA). It is a zinc metalloenzyme which in humans it is encoded by the FOLH1 gene.

The amino acid sequence for human PSMA is available from Uniprot under accession number Q04609 (https:// www.uniprot.org/uniprot/Q04609). In this 750 amino acid sequence, the cytoplasmic domain is residues 1-19; the signal-anchor for type II membrane proteins is residues 20-43; and the extracellular domain is residues 44-750. The extracellular domain is comprised of protease, apical and C-terminal domains (see FIG. 2).

Nucleic Acid Sequence

The present invention also provides a nucleic acid sequence which encodes an antigen-binding domain or a CAR of the invention.

As used herein, the terms "polynucleotide", "nucleotide", and "nucleic acid" are intended to be synonymous with each other.

It will be understood by a skilled person that numerous different polynucleotides and nucleic acids can encode the same polypeptide as a result of the degeneracy of the genetic code. In addition, it is to be understood that skilled persons may, using routine techniques, make nucleotide substitutions that do not affect the polypeptide sequence encoded by the polynucleotides described here to reflect the codon usage of any particular host organism in which the polypeptides are to be expressed.

Nucleic acids according to the invention may comprise DNA or RNA. They may be single-stranded or double-stranded. They may also be polynucleotides which include within them synthetic or modified nucleotides. A number of different types of modification to oligonucleotides are known in the art. These include methylphosphonate and phosphorothioate backbones, addition of acridine or polylysine chains at the 3' and/or 5' ends of the molecule. For the purposes of the use as described herein, it is to be understood that the polynucleotides may be modified by any method available in the art. Such modifications may be carried out in order to enhance the in vivo activity or life span of polynucleotides of interest.

The terms "variant", "homologue" or "derivative" in relation to a nucleotide sequence include any substitution of, variation of, modification of, replacement of, deletion of or addition of one (or more) nucleic acid from or to the sequence.

The nucleic acid sequence may be codon optimised for expression in a particular host cell.

Nucleic Acid Construct

The present invention also provides a nucleic acid construct encoding a Fab-type
  CAR of the invention.
A nucleic acid construct encoding a FabCAR (FIG. 3A) may have the structure:
  VH-CH-spacer-TM-endo-coexpr-VL-CL or
  VL-CL-spacer-TM-endo-coexpr-VH-CH
  in which:
  VH is a nucleic acid sequence encoding a heavy chain variable region;
  CH is a nucleic acid sequence encoding a heavy chain constant region spacer is a nucleic acid encoding a spacer;
  TM is a nucleic acid sequence encoding a transmembrane domain;
  endo is a nucleic acid sequence encoding an endodomain;
  coexpr is a nucleic acid sequence enabling co-expression of the first and second polypeptides;
  VL is a nucleic acid sequence encoding a light chain variable region; and
  CL is a nucleic acid sequence encoding a light chain constant region.

For both structures mentioned above, nucleic acid sequences encoding the two polypeptides may be in either order in the construct.

In the structure above, "coexpr" is a nucleic acid sequence enabling co-expression of two polypeptides as separate entities. It may be a sequence encoding a cleavage site, such that the nucleic acid construct produces both polypeptides, joined by a cleavage site(s). The cleavage site may be self-cleaving, such that when the polypeptide is produced, it is immediately cleaved into individual peptides without the need for any external cleavage activity.

The cleavage site may be any sequence which enables the two polypeptides to become separated.

The term "cleavage" is used herein for convenience, but the cleavage site may cause the peptides to separate into individual entities by a mechanism other than classical cleavage. For example, for the Foot-and-Mouth disease virus (FMDV) 2A self-cleaving peptide (see below), various models have been proposed for to account for the "cleavage" activity: proteolysis by a host-cell proteinase, autoproteolysis or a translational effect (Donnelly et al (2001) J. Gen. Virol. 82:1027-1041). The exact mechanism of such "cleavage" is not important for the purposes of the present invention, as long as the cleavage site, when positioned between nucleic acid sequences which encode proteins, causes the proteins to be expressed as separate entities.

The cleavage site may, for example be a furin cleavage site, a Tobacco Etch Virus (TEV) cleavage site or encode a self-cleaving peptide.

A 'self-cleaving peptide' refers to a peptide which functions such that when the polypeptide comprising the proteins and the self-cleaving peptide is produced, it is immediately "cleaved" or separated into distinct and discrete first and second polypeptides without the need for any external cleavage activity.

The self-cleaving peptide may be a 2A self-cleaving peptide from an aphtho- or a cardiovirus. The primary 2A/2B cleavage of the aptho- and cardioviruses is mediated by 2A "cleaving" at its own C-terminus. In apthoviruses, such as foot-and-mouth disease viruses (FMDV) and equine rhinitis A virus, the 2A region is a short section of about 18 amino acids, which, together with the N-terminal residue of protein 2B (a conserved proline residue) represents an autonomous element capable of mediating "cleavage" at its own C-terminus (Donelly et al (2001) as above).

"2A-like" sequences have been found in picornaviruses other than aptho- or cardioviruses, 'picornavirus-like' insect viruses, type C rotaviruses and repeated sequences within *Trypanosoma* spp and a bacterial sequence (Donnelly et al (2001) as above).

The cleavage site may comprise the 2A-like sequence shown as SEQ ID No. 161 (RAEGRGSLLTCGDVEEN-PGP).

The present invention also provides a nucleic acid construct which comprises one or more nucleic acid sequence(s) encoding a CAR of the present invention, together with a nucleic acid sequence encoding another molecule such as a suicide gene.

A suicide-gene is a genetically encoded mechanism which allows selective destruction of adoptively transferred cells, such as T-cells, in the face of unacceptable toxicity.

The suicide gene may be "RQR8" as described in WO2013/153391 having the sequence shown as SEQ ID No. 4 of that document; or "Rapcasp9" as described in WO2016/135470.

Vector

The present invention also provides a vector, or kit of vectors, which comprises one or more nucleic acid sequence(s) encoding an antigen-binding domain or chimeric antigen receptor according to the invention. Such a vector may be used to introduce the nucleic acid sequence(s) into a host cell so that it expresses an antigen-binding domain or chimeric antigen receptor.

The vector may, for example, be a plasmid or a viral vector, such as a retroviral vector or a lentiviral vector, or a transposon based vector or synthetic mRNA.

The vector may be capable of transfecting or transducing a cell such as a T cell or a NK cell.

Cell

The present invention provides a cell which comprises a chimeric antigen receptor of the invention.

The cell may comprise a nucleic acid sequence, nucleic acid construct or a vector of the present invention.

The cell may be a cytolytic immune cell such as a T cell or an NK cell.

T cells or T lymphocytes are a type of lymphocyte that play a central role in cell-mediated immunity. They can be distinguished from other lymphocytes, such as B cells and natural killer cells (NK cells), by the presence of a T-cell receptor (TCR) on the cell surface. There are various types of T cell, as summarised below.

Helper T helper cells (TH cells) assist other white blood cells in immunologic processes, including maturation of B cells into plasma cells and memory B cells, and activation of cytotoxic T cells and macrophages. TH cells express CD4 on their surface. TH cells become activated when they are presented with peptide antigens by MHC class II molecules on the surface of antigen presenting cells (APCs). These cells can differentiate into one of several subtypes, including TH1, TH2, TH3, TH17, Th9, or TFH, which secrete different cytokines to facilitate different types of immune responses.

Cytolytic T cells (TC cells, or CTLs) destroy virally infected cells and tumor cells, and are also implicated in transplant rejection. CTLs express the CD8 at their surface. These cells recognize their targets by binding to antigen associated with MHC class I, which is present on the surface of all nucleated cells. Through IL-10, adenosine and other molecules secreted by regulatory T cells, the CD8+ cells can be inactivated to an anergic state, which prevent autoimmune diseases such as experimental autoimmune encephalomyelitis.

Memory T cells are a subset of antigen-specific T cells that persist long-term after an infection has resolved. They quickly expand to large numbers of effector T cells upon re-exposure to their cognate antigen, thus providing the immune system with "memory" against past infections. Memory T cells comprise three subtypes: central memory T cells (TCM cells) and two types of effector memory T cells (TEM cells and TEMRA cells). Memory cells may be either CD4+ or CD8+. Memory T cells typically express the cell surface protein CD45RO.

Regulatory T cells (Treg cells), formerly known as suppressor T cells, are crucial for the maintenance of immunological tolerance. Their major role is to shut down T cell-mediated immunity toward the end of an immune reaction and to suppress auto-reactive T cells that escaped the process of negative selection in the thymus.

Two major classes of CD4+ Treg cells have been described—naturally occurring Treg cells and adaptive Treg cells.

Naturally occurring Treg cells (also known as CD4+CD25+FoxP3+ Treg cells) arise in the thymus and have been linked to interactions between developing T cells with both myeloid (CD11c+) and plasmacytoid (CD123+) dendritic cells that have been activated with TSLP. Naturally occurring Treg cells can be distinguished from other T cells by the presence of an intracellular molecule called FoxP3. Mutations of the FOXP3 gene can prevent regulatory T cell development, causing the fatal autoimmune disease IPEX.

Adaptive Treg cells (also known as Tr1 cells or Th3 cells) may originate during a normal immune response.

The cell may be a Natural Killer cell (or NK cell). NK cells form part of the innate immune system. NK cells provide rapid responses to innate signals from virally infected cells in an MHC independent manner NK cells (belonging to the group of innate lymphoid cells) are defined as large granular lymphocytes (LGL) and constitute the third kind of cells differentiated from the common lymphoid progenitor generating B and T lymphocytes. NK cells are known to differentiate and mature in the bone marrow, lymph node, spleen, tonsils and thymus where they then enter into the circulation.

The cells of the invention may be any of the cell types mentioned above.

Cells according to the first aspect of the invention may either be created ex vivo either from a patient's own peripheral blood (1st party), or in the setting of a haematopoietic stem cell transplant from donor peripheral blood (2nd party), or peripheral blood from an unconnected donor (3rd party).

Alternatively, cells according to the first aspect of the invention may be derived from ex vivo differentiation of inducible progenitor cells or embryonic progenitor cells to T or NK cells. Alternatively, an immortalized T-cell line which retains its lytic function and could act as a therapeutic may be used.

In all these embodiments, chimeric polypeptide-expressing cells are generated by introducing DNA or RNA coding for the chimeric polypeptide by one of many means including transduction with a viral vector, transfection with DNA or RNA.

The cell of the invention may be an ex vivo cell from a subject. The cell may be from a peripheral blood mononuclear cell (PBMC) sample. Cells may be activated and/or expanded prior to being transduced with nucleic acid encoding the molecules providing the chimeric polypeptide according to the first aspect of the invention, for example by treatment with an anti-CD3 monoclonal antibody. The cell of the invention may be made by:

(i) isolation of a cell-containing sample from a subject or other sources listed above; and (ii) transduction or transfection of the cells with one or more a nucleic acid sequence(s) encoding a chimeric polypeptide.

The cells may then by purified, for example, selected on the basis of expression of the antigen-binding domain of the antigen-binding polypeptide.

Pharmaceutical Composition

The present invention also relates to a pharmaceutical composition containing a plurality of cells according to the invention.

The pharmaceutical composition may additionally comprise a pharmaceutically acceptable carrier, diluent or excipient. The pharmaceutical composition may optionally comprise one or more further pharmaceutically active polypeptides and/or compounds. Such a formulation may, for example, be in a form suitable for intravenous infusion.

Method of Treatment

The present invention provides a method for treating and/or preventing a disease which comprises the step of administering the cells of the present invention (for example in a pharmaceutical composition as described above) to a subject.

A method for treating a disease relates to the therapeutic use of the cells of the present invention. Herein the cells may be administered to a subject having an existing disease or condition in order to lessen, reduce or improve at least one symptom associated with the disease and/or to slow down, reduce or block the progression of the disease.

The method for preventing a disease relates to the prophylactic use of the cells of the present invention. Herein such cells may be administered to a subject who has not yet contracted the disease and/or who is not showing any symptoms of the disease to prevent or impair the cause of the disease or to reduce or prevent development of at least one symptom associated with the disease. The subject may have a predisposition for, or be thought to be at risk of developing, the disease.

The method may involve the steps of:
(i) isolating a cell-containing sample;
(ii) transducing or transfecting such cells with a nucleic acid sequence or vector provided by the present invention;
(iii) administering the cells from (ii) to a subject.

The cell-containing sample may be isolated from a subject or from other sources, for example as described above. The cells may be isolated from a subject's own peripheral blood (1st party), or in the setting of a haematopoietic stem cell transplant from donor peripheral blood (2nd party), or peripheral blood from an unconnected donor (3rd party).

The present invention provides a CAR-expressing cell of the present invention for use in treating and/or preventing a disease.

The invention also relates to the use of a CAR-expressing cell of the present invention in the manufacture of a medicament for the treatment and/or prevention of a disease The disease to be treated and/or prevented by the methods of the present invention may be a cancerous disease, such as prostate cancer, bladder cancer, breast cancer, colon cancer, endometrial cancer, kidney cancer (renal cell), leukaemia, lung cancer, melanoma, non-Hodgkin lymphoma, pancreatic cancer, and thyroid cancer.

In particular, the disease may be prostate cancer.

The cells of the present invention may be capable of killing target cells, such as cancer cells. The target cell may be characterised by the presence of a tumour secreted ligand or chemokine ligand in the vicinity of the target cell. The target cell may be characterised by the presence of a soluble ligand together with the expression of a tumour-associated antigen (TAA) at the target cell surface. The cells and pharmaceutical compositions of present invention may be for use in the treatment and/or prevention of the diseases described above.

The invention will now be further described by way of Examples, which are meant to serve to assist one of ordinary skill in the art in carrying out the invention and are not intended in any way to limit the scope of the invention.

EXAMPLES

Example 1—Generation of PSMA Binders

Rat phage display library was generated after immunisation and panned against in house recombinant human PSMA immobilised on beads. After showing enrichment of specific phage the library was screened using a phage ELISA assay and isolated clones were sequenced. Binding of the clones as reassessed to confirm positive selection before being cloned into murine IgG2A Fc vectors for further analysis.

Materials and Methods

Production of Strep2 Tagged PSMA

StrepII tagged PSMA (MP27034) was made in house and transfected into 30 ml of HEK293F cells as per standard protocol. After 4 days culture supernatants were harvested and 0.22 μm filter sterilised prior to aliquoting and storage at 4° C.

Bead Based Capture of Recombinant PSMA and FACS Analysis Protocol (QC)

25 μl of Magstrep beads (IBA) were removed from storage vial. Beads were washed in 1 mL of PBS.T (0.05% Tween)×3 with magnetic separation between washes. 1.5 mL of MP27034 supernatant (PSMA not quantified) was incubated with beads for 30 min at room temperature with agitation. Beads were washed with 1 mL (×3) PBS.T separating via magnet after each wash. Beads were blocked in 1 ml of 1% BSA PBS for 30 min at room temp alongside 25 μl unconjugated beads for negative selection/control in QC experiments. Wash beads with 1 mL (×3) PBS.T separating via magnet after each wash. Stain with 1/1000 dilution of anti-PSMA Alexaflour 488 (Abcam ab187570) for 10 min at room temperature with agitation. Flow confirmation of binding was carried out using conjugated beads on Milteni MACSquant.

Phage Panning

PSMA St2 (27034) in supernatant from transiently transfected HEK293T cells (RJ) was conjugated to beads as described above (without staining). Both IBA type 2 and type 3 strep-tactin beads were used for panning on the KingFisher Flex. A 100-fold representation of the phage library (1×10$^{10}$ phage/ml) was incubated with BSA conjugated beads in order remove non-specific binding phage for 30 min at room temperature with agitation. Beads were magnetically separated and the phage containing supernatant was transferred directly to PSMA-conjugated beads.

Panning and wash steps were carried out on the Kingfisher Flex using 'Phage display protocol 2' utilising washing in PBS.T 0.05% for 3 min×5 cycles. Elution from PSMA St2 conjugated beads was carried out using 500 μl of a 2× Biotin solution in PBS for 20 min.

Phage were then titrated and amplified according to standard protocols. Briefly, eluted phage were amplified by reinfection into log phase TG1 cells (5 ml) and plating out on Amp/Gluc agar plates. Titrations were performed to establish phage numbers and enrichment. Several rounds of phage panning and amplification were used to generate binders.

Monoclonal Phage Expression ELISA

A standard phage ELISA protocol was used. In brief; individual bacterial colonies were picked and cultured at 37° C. in 2TY Gluc/Amp media until OD$_{600nm}$ of 0.5 before induction of phage expression by addition helper phage (M13KO7) for superinfection for 40 min, re-suspension in 2TY supplemented with ampicillin and kanamycin (100 μg/ml and 70 μg/ml respectively) and overnight culture at 30° C. with agitation. The cells were pelleted by centrifugation and supernatant used directly for screening ELISAs and flow cytometry.

Elisa

All incubations were room temperature for 1 h with agitation whilst washing was 3 times with 0.05%

PBS.tween. PSMA was plated on a nunc 96 well plate at 1 µg/ml (50 µl) and incubated at room temp for 1 h, the plate was washed and blocked with 2% milk for 1 h and washed again before supernatants were added. Detection antibody was anti-M13-HRP conjugate, and the plate was developed with TMB substrate before being read at 450 nm.

Deviation from this ELISA protocol include scFv detection using anti-c-Myc HRP or anti-Flag-HRP where necessary. 25

Results

PSMA Batch QC Prior to Initiation of Panning

Prior to initiating panning a batch of PSMA was produced from transient 293 transfection. QC of this showed that PSMA ST2 could be successfully bound to, and eluted from, Type 3 beads using biotin. Therefore type 3 beads were used for all following bead based panning strategies.

TABLE 1

Titration of input and output phage ratio for panning against recombinant protein.

| Panning ratios | Input phage titre | Eluted phage titre |
|---|---|---|
| Pan 1 | $2 \times 10^{10}$ | $4 \times 10^{5}$ |
| Pan 2 | $2 \times 10^{8}$ | $2 \times 10^{5}$ |

Panning enrichment showed positive results for phage titres after two pans and therefore single colonies were selected to screen for specific antibodies.

Based on selection criteria of PSMA binding over background, colonies were stored as glycerol stocks in 50% glycerol and cultured to enable repeat screening.

TABLE 2

Selected colonies from PSMA Phage ELISA analysis

| Plate | Well ID |
|---|---|
| Plate 1 | A - 1, 2, 3. B - 1. C 1. E - 1, 2. H- 7 |
| Plate 2 | A - 11. B - 9, 12*. C - 8, 9, 11, 12. D - 12. E-3*. G - 5. H - 6, 9. |

Repeated ELISA results from M13 phage expression by monoclonal selections (after phage precipitation) showed that signals were replicable and significant compared to binding to background proteins.

Figure 4:
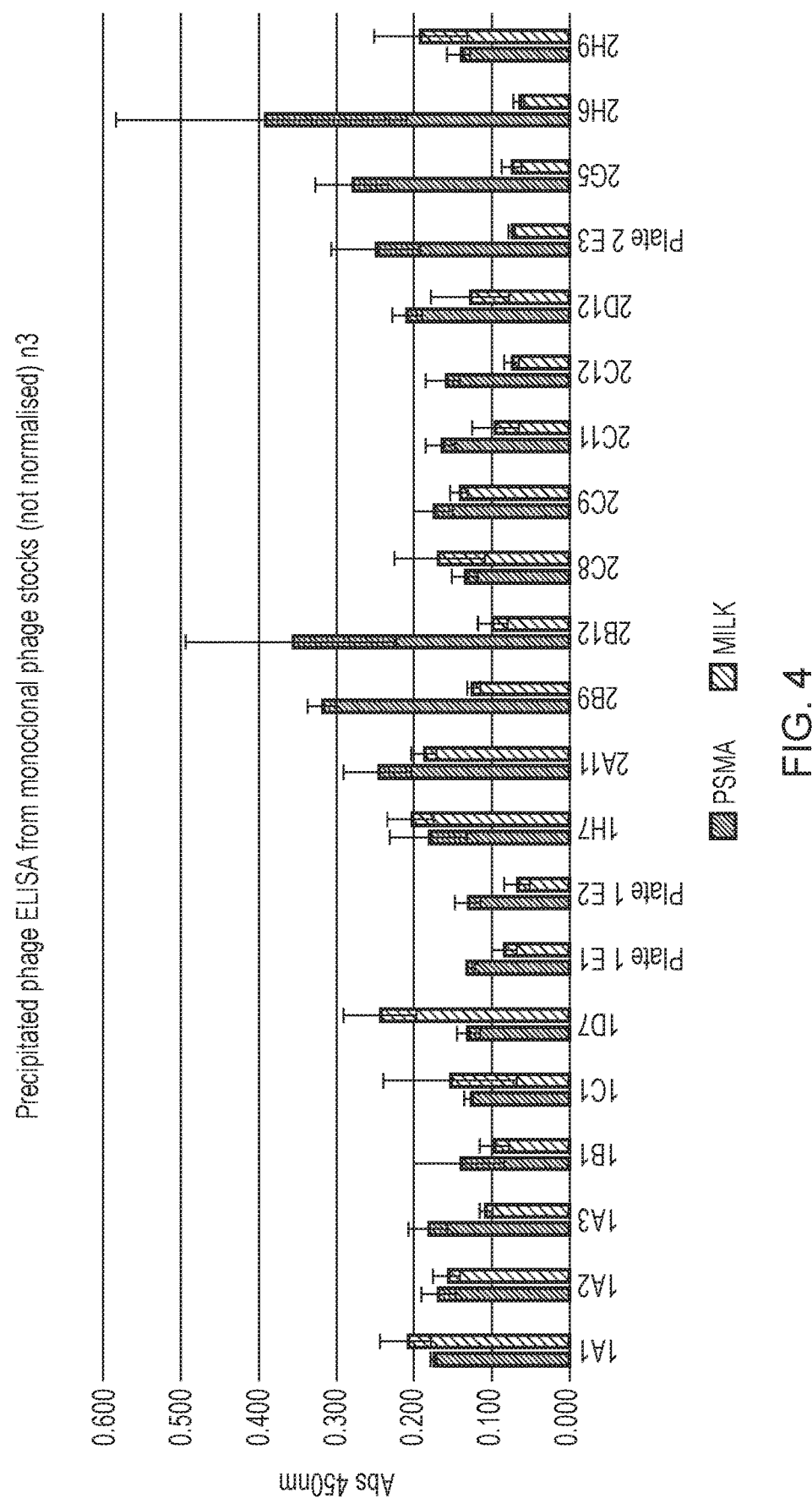

FIG. 4—ELISA assay of clonal phage and scFv cultures in replicate after initial screening (n=3) on recombinant protein ELISA assay

SUMMARY

A selection of binders were generated from this phage display campaign alongside further sequences using hybridoma generation from the same animal 7A12 Humanisation In Silico Humanisation and Antibody Modelling 7A12 humanisation was performed by in silico modelling and CDR grafting using BioLuminate software (Schrodinger).

In Silico Immunogenicity Analysis

Aim: To predict T-cell epitopes of the newly designed humanised constructs using the IEDB tool (https://www.iedb.org/) for MHCI binding and MHCI immunogenicity properties (Nielsen et al. 2003 *Protein Sci.* 12, 1007-1017; Bui et al. 2005 *Immunogenetics* 57, 304-314; Peters & Sette 2005 *BMC Bioinformatics* 6, 132; Karosiene et al. 2012 *Immunogenetics* 64, 177-186; Zhang et al. 2009 *Bioinformatics* 25, 1293-1299). Additionally, predict humanness of the grafted framework with the T20 score analyser (https://dm.lakepharma.com/bioinformatics/) (Gao et al. 2013 *BMC Biotechnol.* 13, 55).

IEDB

This tools allows the analysis of peptides derived from the antibody sequence for binding affinity to MHCI. The sequence of the grafted antibody framework is analysed through the Proteasomal cleavage/TAP transport/MHC class I combined predictor (http://tools.iedb.org/processing/) on the human HLA allele A*02:01 using all peptide length (8 to 14). A specific cut-off of 274 nM is applied to differentiate binding peptides (Paul, S. et al. 2013 *J. Immunol.* 191, 5831-5839).

IEDB MHC-I Immunogenicity

All peptides with an IC50 below 274 nM were then analysed on the Class I immunogenicity tool (http://tools.iedb.org/immunogenicity/) to determine immunogenicity score (a positive value denotes immunogenicity) (Calis et al. 2013 *PLOS* Comput. Biol. 9, e1003266).

As an affinity threshold of 50 nM is required for an efficient CTL response (Sette, A. et al. 1994 *J. Immunol. Baltim.* 153, 5586-5592), all peptides with an affinity of 50 nM or less for MHC-I are considered potentially immunogenic.

T20 Score

The T20 score analyser is used to calculate a monoclonal antibody humanness score from antibody variable sequences (Gao et al. 2013 *BMC Biotechnol.* 13, 55). The sequence of the grafted antibody framework is analysed through the T20 score analyser (https://dm.lakepharma.com/bioinformatics/). A score of 80 or more is associated to a human sequence.

Example 2—Generation of Anti-PSMA Single Domain Antibodies

Single domain antibodies (dAb) with specificity for PSMA were isolated from an immunised llama phage display library using a combination of immobilised antigen and cell-based phage display panning.

Screening assays were initially carried out on recombinant protein before confirmation of cell binding to transduced and endogenous PSMA expressing cells was confirmed by flow cytometry.

SPR analysis (Biacore) showed that the antibodies bound with an affinity in the nM range and the selected antibodies bind to PSMA (human and Rhesus) in IHC staining.

Materials and Methods

Immunisations and Library Preparation

Two llamas (9240, 9241) were genetically immunised with pCMV-PSMA via subcutaneous injection (days 0 and 21) to prime an immune response before protein immunisation with recombinant His-tagged PSMA (day 42 and 63). Peripheral blood lymphocytes (PBLs) were isolated from 150 ml blood samples taken at 70 days post primary immunization. RNA was isolated from PBLs using the RNeasy maxi kit (Qiagen). cDNA was synthesized from each llama using oligo-dT priming and Superscript III reverse transcriptase. dAb encoding cDNA was amplified by PCR using specific primers, analysed to ensure presence of 400 bp fragment and purified (Zymoclean). The resulting clean PCR product was cut by restriction enzyme digest (PST1 and NOT1) and ligated into M13 phage vector viral coat protein (pRL144). Multiple electroporations were performed into TG1 *E. coli* and selections carried out on ampicillin agar plates before pooling and freezing samples.

Phage with antibodies expressed as protein coat were amplified from TG1 *E. coli*. Briefly, TG1 cells were inoculated into 2TY media supplemented with Glucose (2%)/ampicillin (1 µg/ml) and cultured at 37° C. with agitation to an $OD_{600nm}$ of 0.5 before addition of M13KO7 helper phage. Cells were resuspended 40 min later into 2YT media supplemented with kanamycin and ampicillin (70/100 µg/ml) and incubated at 30° C. overnight with agitation. Phage were purified using PEG based precipitation and titrated into TG1 *E. coli* to determine PFUs/ml.

Phage Display Panning
Recombinant Protein

Recombinant PSMA was immobilised on a Nunc immunotube at 1 µg/ml overnight at 4° C. before blocking with a 2% milk PBS solution. Phage were blocked in 2% milk PBS (2 ml) for 1 h before addition to the PSMA coated immunotube. After 1 h at room temperature the tube wash washed 15 times with 3×1 min incubations using PBS 0.05% Tween 20. Elution of specific phage was performed by addition of re-warmed trypsin (2 ml) to the tube and incubation at 37° C. for 10-15 min. Eluted phage were amplified by reinfection into log phase TG1 cells (5 ml) and plating out on Amp/Gluc agar plates. Titrations were performed to establish phage numbers and enrichment.

Cell Based Panning

Cell based panning was used to enrich and isolate binders with specificity to PSMA as displayed on the cell surface. SupT1 cells stably transduced with PSMA and non-transduced SupT1 cells were cultured and $5×10^6$ cells total per Library were harvested and re-suspended into 4 ml ice cold milk/PBS 2% and kept on ice. Phage ($2×10^{11}$ PFU/ml) from pan 1 on recombinant protein were blocked in 2 ml PBS/milk 2% for 1 h before centrifugation (400×g/5 min/4° C.) and re-suspension of SupT1 NT cells in phage solution. Phage and SupT1 NT cells were incubated with end over end rotation at 4° C. for 1 h to remove non-specific binders after which the process was repeated with SupT1-PSMA cells. Washing was performed by serial centrifugation and re-suspension in PBS 0.05% Tween 20 (pH5 adjusted) before incubation with 37° C. Trypsin EDTA (10 min) and phage titration and amplification into *E. coli* TG1 cells as described above.

Screening

Individual bacterial colonies were picked and cultured at 37° C. in 2TY Gluc/Amp media until $OD_{600nm}$ of 0.5 before induction of dAb expression by addition of IPTG (1 mM) and overnight culture at 30° C. The cells were pelleted by centrifugation and supernatant used directly for screening ELISAs and flow cytometry.

Elisa

All incubations were room temp 1 h with agitation whilst washing was 3 times with PBS 0.05% Tween 20. PSMA was plated on a Nunc 96 well plate at 1 µg/ml (50 µl) and incubated at room temp for 1 h, the plate was washed and blocked with 2% milk for 1 h and washed again before supernatants were added. Detection antibody was anti-C Myc-HRP conjugate, and the plate was developed with TMB substrate before being read at 450 nm.

Flow Cytometry

Transduced or non-transduced SupT1 cells expressing human PSMA at high medium or low levels, along with tumour cell lines LnCAP, PC3 and 22RV1 were stained in various flow cytometry experiments. Briefly cells were incubated with screening antibodies tagged with either Murine Fc or C-Myc tag before washing with PBS.T 0.05% and appropriate secondary antibodies (anti-C Myc PE and anti-murine Fc AF647). Flow cytometers used were Miltenyi MACSquant (FIG. 5) and IntelliCyt (FIG. 6).

Results

Two phage display libraries were constructed from two DNA and protein immunised llamas to enable interrogation of their antibody repertoire. Panning was carried out against recombinant human PSMA (Acro Biosystems) showing initial high enrichment of specific clones (FIG. 5(A)). After screening these libraries were both panned against SupT1 cells expressing PSMA in order to generate cell membrane bound PSMA specificity. Cell panned libraries yielded similar enrichment titres to those from recombinant protein panning (FIG. 5(B)).

Figure 8:
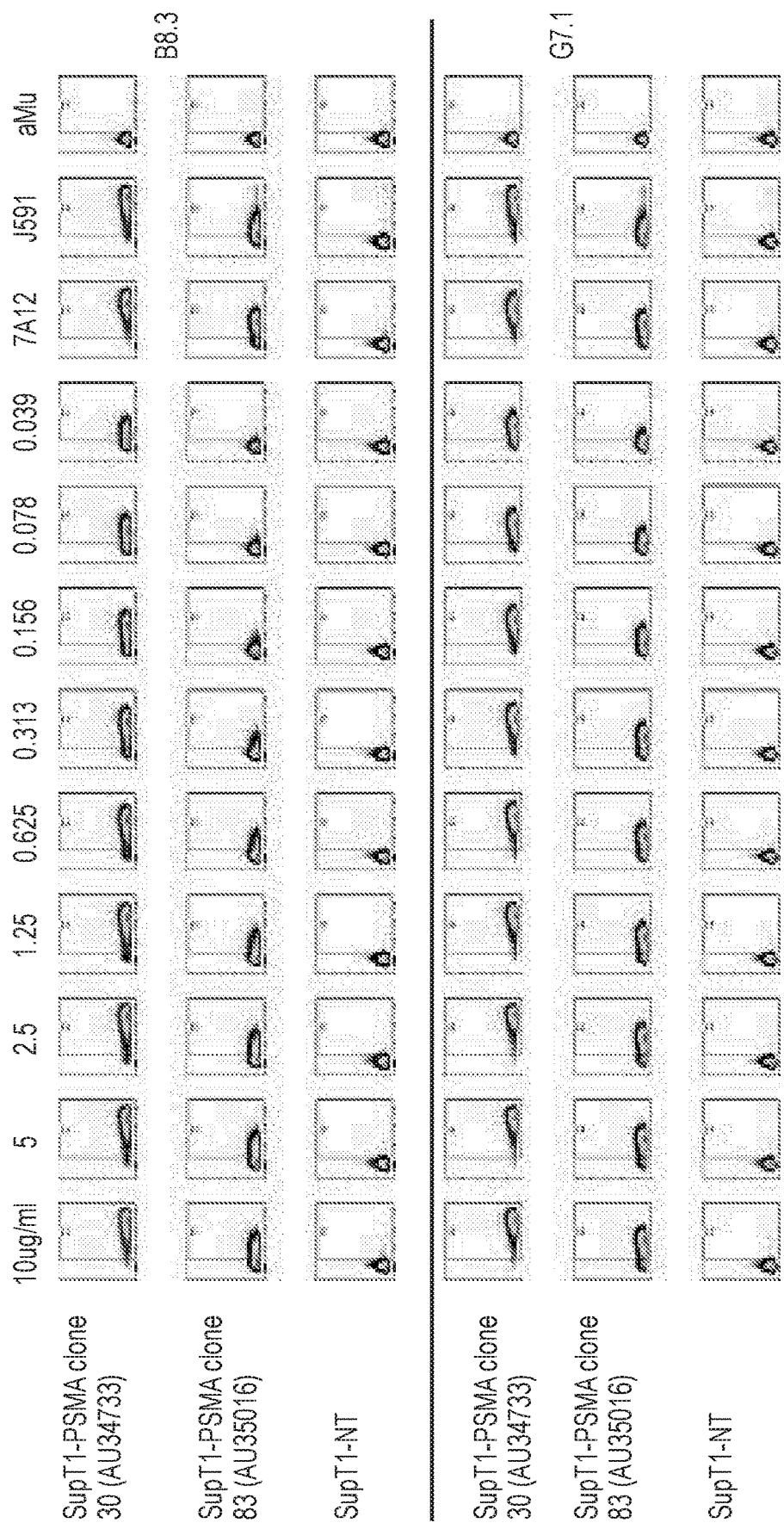

After assessment of initial panning enrichment, monoclonal phage expressing TG1 colonies were selected from titration plates, cultured and dAb expression induced by IPTG addition and glucose starvation. ELISA analysis showed a mix of positive clones and background binders (FIG. 6). Positive clones were selected, sequenced and further screened against recombinant PSMA in titration assays (data not shown). Selected binders were progressed to flow cytometry where clones B8 and G7 from llama 2 were shown to have the highest affinity and specific for high expressing PSMA clones (FIG. 7 and FIG. 8).

Figure 9:
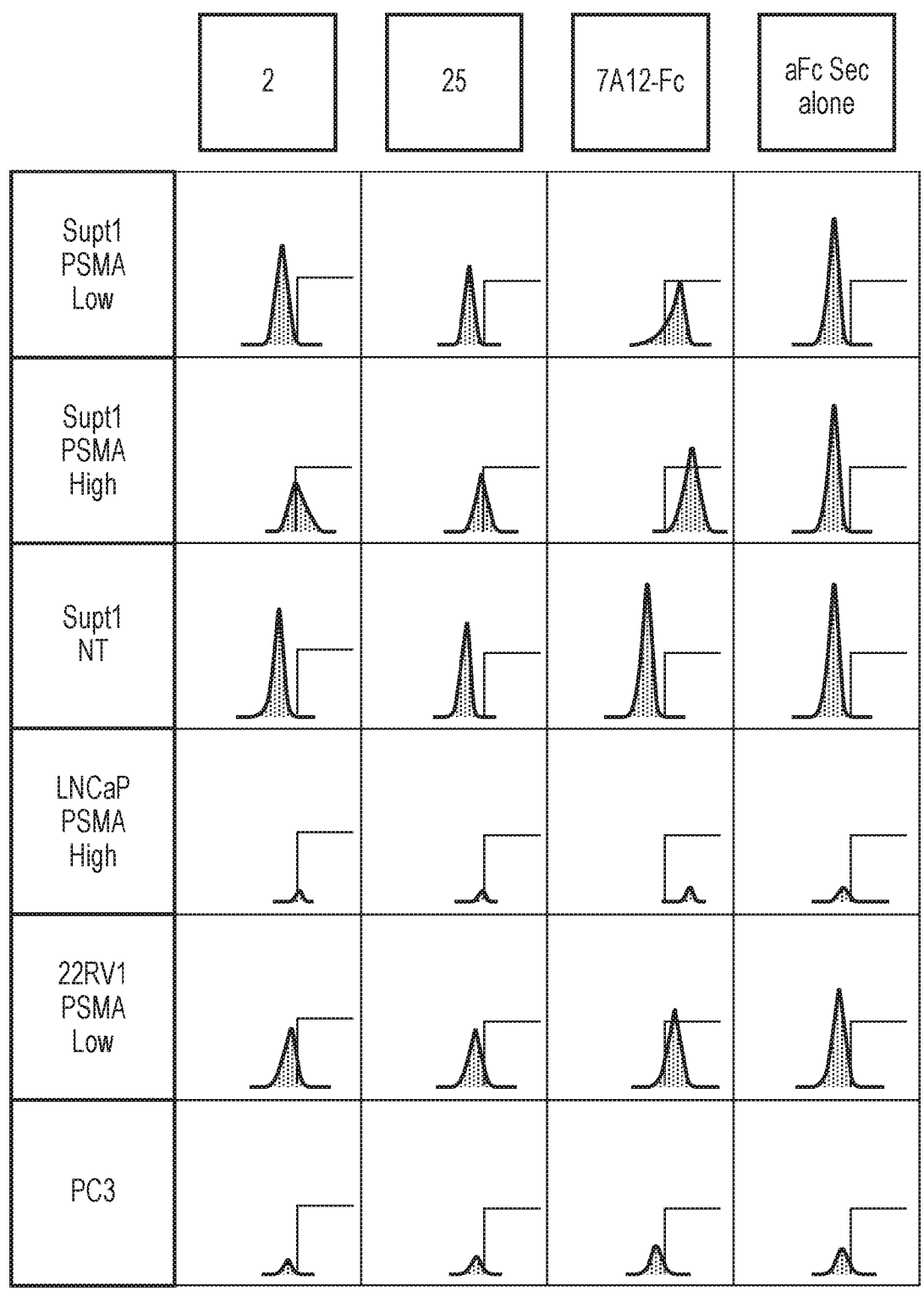

The enriched repertoire of dAbs within the library of cell panned phage as shown by initial screening was significant enough to warrant further screening of similar sequences by Next gen Sequence analysis (NGS). Llama 1 and 2 were both analysed by NGS (PacBio) and sequences were assessed for similarity to isolated sequences of high affinity for verified cell binders. A set of 36 further binders were generated via G Block gene synthesis (IDT technologies). These were cloned into a murine IgG2A-Fc format and expressed from HEK293 cells before screening against a range of cell types including transduced and endogenous expression (FIG. 9).

Figure 10:
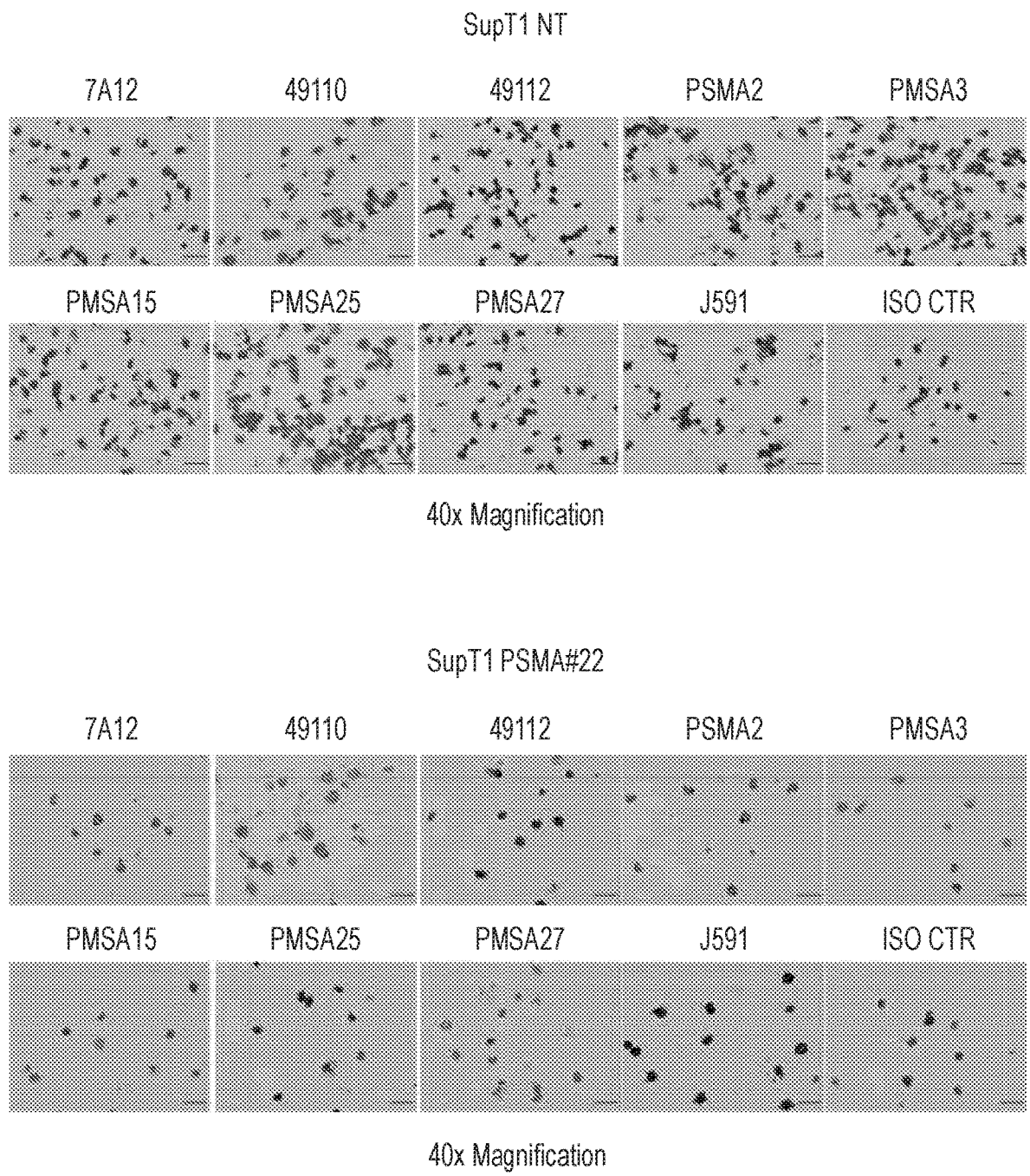
Figure 10:
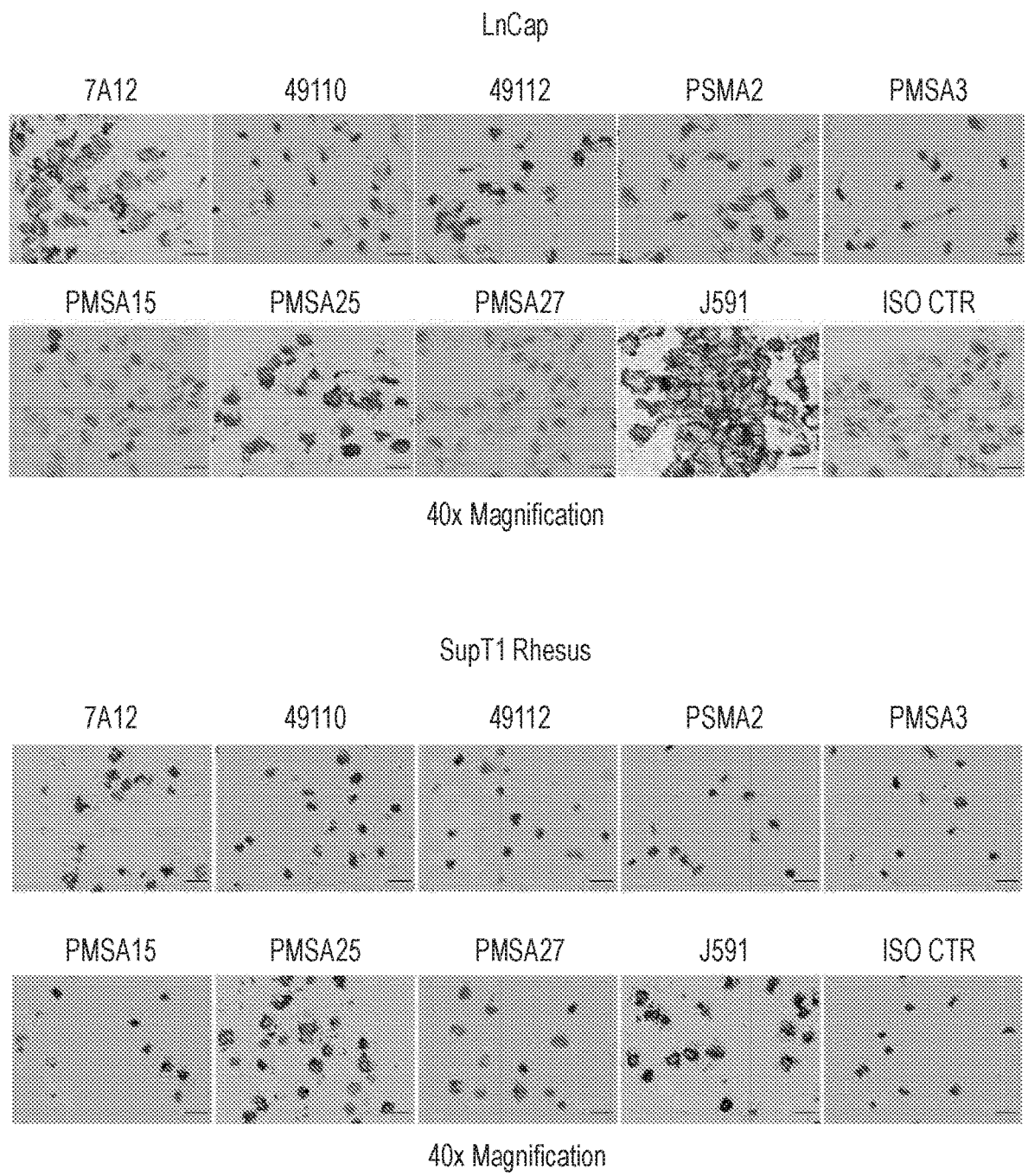
Figure 10:
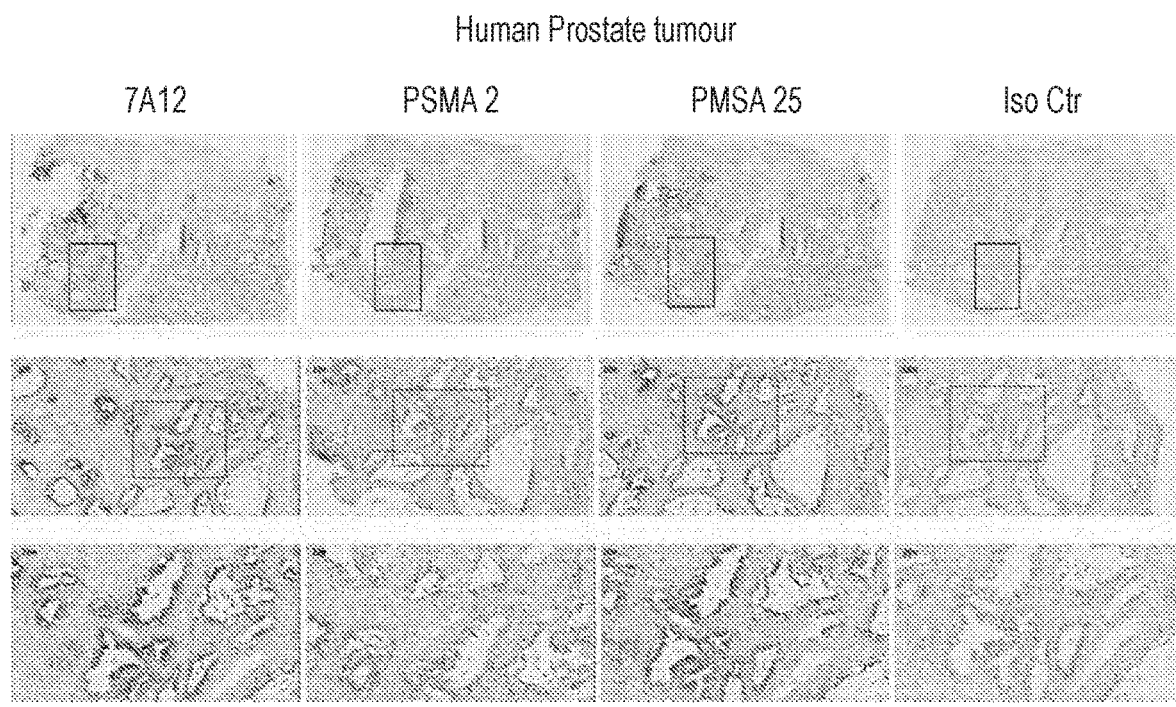

Two binders of particular interest were isolated from NGS sequences (clones 2 and 25). Immunohistochemistry was performed against transduced cells or human tumour samples and also from Rhesus monkey samples to establish the potential for In vivo model validation and IHC analysis of colocalization (FIG. 10).

Results showed that whilst B8 and G7 clones (49110 and 49112) did bind to PSMA positive cell lines they were either inferior to gold standard controls or did not bind to Rhesus PSMA transduced cell lines. Based on this data the two selected candidates for further analysis are clones 2 and 25 from NGS selection.

Example 3—Biophysical Characterisation of Anti-PSMA VHH Antibodies

Methods

Anti-PSMA clones were expressed in expi-CHO cells by transient transfection. Supernatant from transfected CHO cells was purified using protein A affinity chromatography. A HiTrap MabSelect SuRE 1 ml column was equilibrated with 5 column volumes of PBS pH 7.4. Supernatant was applied to the column using Akta™ Pure system at a flow rate of 1 mL/min. Following application of supernatant, the column was washed with 20 column volumes of PBS. Sample was then eluted from the column with 3 ml of IgG elution buffer (Pierce—21004) at 1 mL/min and directly loaded onto 2

HiTrap 5 ml desalting columns, previously equilibrated in PBS, and collected on a 96-well plate using a fraction collector unit.

Fractions containing the protein were pooled and analysed via SDS-PAGE. Material was divided in aliquots and stored at −80° C.

Size Exclusion Chromatography

20 µl of purified recombinant antibody were loaded onto a Superdex 200 increase 5/150 GL column in an Akta Pure system. Briefly, the column was equilibrated with 1.5 column volumes of PBS at 0.3 ml/min. Sample was loaded by direct loop injection at 0.3 ml/min and run in PBS over 1.5 column volumes. Eluted protein was detected at OD 280 nm. VHH-Fc construct was expected to elute at 2 ml.

Thermo-Stability

Samples were normalised to 1 mg/ml and loaded onto standard glass capillaries (Nanotemper). Thermo-stability was determined by linear temperature increments of 1° C./min from 20° ° C. to 95° ° C. on Nanotemper Prometheus NT.48 instrument. Data analysed as first derivative of 350 nm/330 nm ratio.

Surface Plasmon Resonance

Kinetic affinity for soluble PSMA was determined using Biacore T200 instrument. Recombinant purified antibodies were captured on a Protein A chip #7 at 10 µl/min for 60 s, aiming at 100 RU. Recombinant PSMA-His (sino biologicals) dialysed in HBS-P+ buffer was used as analyte from 1 µM with 1:2 serial dilutions for 10 points and flown at 30 µl/min for 150 s with 300 s dissociation time. A double reference subtraction was applied. Sensograms fitted with 1:1 Langmuir model.

Anti-PSMA Antibody J591 (UPenn) was Used as Reference

Results

The antibodies were transiently expressed in ExpiCHO in VHH-Fc format and purified via protein A affinity chromatography. Protein purity was assessed by SDS-PAGE and molecular dispersion was measured via size exclusion chromatography. Antibodies demonstrated a low aggregation propensity.

Thermal stability was assessed via DSF, showing a melting temperature above 57° C. for both antibodies tested.

Affinity was determined by surface plasmon resonance on a Biacore T200 instrument against recombinant soluble PSMA. Affinities were measured in the nM range for both antibodies (Table 3)

TABLE 3

| Clone | KD (M) | Tm (° C.) | Aggregation (%) |
|---|---|---|---|
| B08 | 2.12e−7 | 67.4 | 2.05 |
| G07 | 3.16e−7 | 57.2 | 1.53 |

Example 4—Construction of Anti-PSMA CARS

A panel of CAR-encoding nucleic acid constructs are generated as follows:

fmc63_BBz: SFGmR.RQR8-2A-FMC63-CD8STK-TyrpTM-41BBz
mu7A12_BBz: SFGmR.RQR8-2A-aPSMA_mu7A12_CD8STK-TyrpTM-41BBz
hu7A12_BBz: SFGmR.RQR8-2A-aPSMA_hu7A12_CD8STK-TyrpTM-41BBz
hu7A12_28 z: SFGmR.RQR8-2A-aPSMA_hu7A12_CD8STK-TyrpTM-41BBz
J591_BBz: SFGmR.RQR8-2A-aPSMA_hu7A12_CD8STK-TyrpTM-41BBz in which SFGmR is the vector backbone;
RQR8 is the sort-suicide gene RQR8, which is described in WO2013/153391;
2A is a member of the 2A self-cleaving peptide family allowing co-expression of the RQR8 and CAR polypeptides
CD8STK is a CD8 stalk spacer
TrypTM is a transmembrane domain derived from Tryp-1
41BBz is a second generation endodomain comprising the endodomains from CD3zeta and 4-1BB.

Example 5—FACs-Based Killing Assay (FBK)

The capacity of the CAR-T cells to kill target cells was investigated using a FACS-based killing assay. SupT1 cells engineered to express human PSMA antigen (SupT1-PSMA) were used as target cells. Non-engineered SupT1 cells (SupT1-NT) were used as a negative control. T-cells were co-cultured with target cells at 1:1, 1:4, and 1:8 effector to target ratios. FBK was assayed after 24 h of incubation and analysed by cytofluorimetry analysis. 25

Example 6—Cytokine Release

Secretion of IL-2 and IFNγ by CAR T-cells was measured by collecting supernatant at 24 hr from the co-cultures described in Example 5. Production of IL-2 and IFNγ was detected by ELISA.

Methodology

Cell Lines

SupT1 cell line (NT and PSMA+) were cultured in RPMI-1640 Medium supplemented with 10% fetal bovine serum (FBS) and 1% GlutaMAX. T-cells were isolated from peripheral blood mononuclear cells (PBMCs) and maintained in RPMI-1640 Medium supplemented with 10% FBS, 1% GlutaMAX and 100 U/mL IL-2.

Transduction

Retrovirus was generated by transiently transfecting HEK293T cells using GeneJuice with RDF plasmid (RD114 envelope), gag/pol plasmid and CAR plasmid. Retroviral viral supernatant was harvested at 48 and 72 hours. T cells were stimulated using 0.5 g/mL of anti-CD3 and anti-CD28 antibodies in T175 TC-treated flasks and maintained in 100 U/mL IL-2. Non-TC treated six-well plates were coated with Retronectin and incubated at 4° C. for 24 hours prior to T cell transduction. 3 ml of viral supernatant was plated prior to the addition of 1 ml of activated T cells at a concentration of $1 \times 10^6$ cells/ml, 100 U/mL of IL-2 was then added and centrifuged at 1000×g for 40 minutes at room temperature and incubated at 37° C. and 5% CO2 for 2-3 days.

NK Cells and NKT Cells Depletion

EasySep™ Human CD56 Positive Selection Kit was used to carry out CD56 depletion.

Cytotoxicity Assay

CAR T-cells were co-cultured with SupT1-NT and SupT1-PSMA at an effector to target ratio (E:T ratio) of 1:1, 1:4, or 1:8 (where the target cells are at a constant concentration of 50,000 cells per condition) in a TC-treated 96-well plate. Readouts were taken 24 hours post co-culture by staining with anti-CD3-PeCy7 and Qben10-APC to differentiate effector T-cells and target cells, 7-AAD dead cell stain was used to exclude dead cells. Cytotoxicity readouts were accessed by flow cytometry Cytokine ELISA Human IL-2 ELISA MAX™ Deluxe and Human IFN-γ ELISA MAX™ Deluxe kits were used to access the levels of cytokine secreted into co-culture supernatants taken from Cytotoxicity Assay.

Example 7—pH Scouting

The stability and affinity kinetics of binders at different levels of pH was investigated.

Methodology

Surface Plasmon Resonance

Kinetic affinity for soluble PSMA at different pH was determined using Biacore T200 instrument. Recombinant purified antibodies were captured on a Protein A chip #6, pre-equilibrated the required PH (pH7.4, pH7, pH6.5 and pH6) using buffered HBS-P+, at 10 µl/min for 60 s, aiming at 100 RU. Recombinant PSMA-His (sino biologicals) dialysed in HBS-P+buffer and adjusted to the required PH was used as analyte from 1 µM with 1:2 serial dilutions for 10 points and flown at 30 µl/min for 150 s with 300 s dissociation time. A double reference subtraction was applied. Sensograms fitted with 1:1 Langmuir model.

Thermo-Stability

Samples were normalised to 1 mg/ml in PBS buffered to the required PH (pH 7.4, pH 7, pH 6.5 and pH 6) and loaded onto standard glass capillaries (Nanotemper). Thermo-stability was determined by linear temperature increments of 1° C./min from 20° C. to 95° C. on Nanotemper Prometheus NT.48 instrument. Data analysed as first derivative of 350 nm/330 nm ratio.

Results

All antibodies tested showed an increased affinity towards the target protein at lower pH. Clones 7A12 and 7A12 humanised showed a higher thermal stability that was largely unaffected by change in pH conditions. These results support the conclusion of a more stable binder at physiological and tumour specific pH microenvironment for clone 7A12 compared to J591 (Table 4).

TABLE 4

| AU number | Clone | pH | KD (M) | Tm (° C.) |
|---|---|---|---|---|
| 30531 | 7A12 | 7.4 | 2.293E-9 | 60.9 |
| | | 7 | 1.773E-9 | 61 |
| | | 6.5 | 1.019E-9 | 61.4 |
| | | 6 | 5.736E-10 | 61.7 |
| 42396 | 7A12 humanised | 7.4 | 3.656E-9 | 73.5 |
| | | 7 | 3.301E-9 | 73.3 |
| | | 6.5 | 1.712E-9 | 73.1 |
| | | 6 | 5.320E-10 | 73 |
| 34494 | J591 | 7.4 | 2.758E-9 | 53.3 |
| | | 7 | 2.543E-9 | 53.8 |
| | | 6.5 | 9.836E-10 | 55.8 |
| | | 6 | 5.508E-10 | 56.3 |

All publications mentioned in the above specification are herein incorporated by reference. Various modifications and variations of the described methods and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in molecular biology or related fields are intended to be within the scope of the following claims.

The invention claimed is:

1. An antigen-binding domain which binds prostate-specific membrane antigen (PSMA) and comprises either:
   (a) a heavy chain variable region (VH) having complementarity determining regions (CDRs) HCDR1, HCDR2 and HCDR3; and a light chain variable region (VL) having CDRs LCDR1, LCDR2 and LCDR3:
   (i) HCDR1 comprising SEQ ID NO. 1; HCDR2 comprising SEQ ID NO. 2; HCDR3 comprising SEQ ID NO. 3; LCDR1 comprising SEQ ID NO. 4; LCDR2 comprising SEQ ID NO. 5; LCDR3 comprising SEQ ID NO. 6;
   (ii) HCDR1 comprising SEQ ID NO. 9; HCDR2 comprising SEQ ID NO. 10; HCDR3 comprising SEQ ID NO. 11; LCDR1 comprising SEQ ID NO. 12; LCDR2 comprising SEQ ID NO. 13; LCDR3 comprising SEQ ID NO. 14;
   (iii) HCDR1 comprising SEQ ID NO. 17; HCDR2 comprising SEQ ID NO. 18; HCDR3 comprising SEQ ID NO. 19; LCDR1 comprising SEQ ID NO. 20; LCDR2 comprising SEQ ID NO. 21; LCDR3 comprising SEQ ID NO. 22;
   (iv) HCDR1 comprising SEQ ID NO. 25; HCDR2 comprising SEQ ID NO. 26; HCDR3 comprising SEQ ID NO. 27; LCDR1 comprising SEQ ID NO. 28; LCDR2 comprising SEQ ID NO. 29; LCDR3 comprising SEQ ID NO. 30;
   (v) HCDR1 comprising SEQ ID NO. 33; HCDR2 comprising SEQ ID NO. 34; HCDR3 comprising SEQ ID NO. 35; LCDR1 comprising SEQ ID NO. 36; LCDR2 comprising SEQ ID NO. 37; LCDR3 comprising SEQ ID NO. 38;
   (vi) HCDR1 comprising SEQ ID NO. 41; HCDR2 comprising SEQ ID NO. 42; HCDR3 comprising SEQ ID NO. 43; LCDR1 comprising SEQ ID NO. 44; LCDR2 comprising SEQ ID NO. 45; LCDR3 comprising SEQ ID NO. 46; or
   (vii) HCDR1 comprising SEQ ID NO. 49; HCDR2 comprising SEQ ID NO. 50; HCDR3 comprising SEQ ID NO. 51; LCDR1 comprising SEQ ID NO. 52; LCDR2 comprising SEQ ID NO. 53; LCDR3 comprising SEQ ID NO. 54; or
   (b) a domain antibody variable region having complementarity determining regions (CDRs) VHHCDR1, VHHCDR2, and VHHCDR3:
   (i) VHHCDR1 comprising SEQ ID NO. 33; VHHCDR2 comprising SEQ ID NO. 34; VHHCDR3 comprising SEQ ID NO. 35;
   (ii) VHHCDR1 comprising SEQ ID NO. 37; VHHCDR2 comprising SEQ ID NO. 38; VHHCDR3 comprising SEQ ID NO. 39;
   (iii) VHHCDR1 comprising SEQ ID NO. 41; VHHCDR2 comprising SEQ ID NO. 42; VHHCDR3 comprising SEQ ID NO. 43;
   (iv) VHHCDR1 comprising SEQ ID NO. 45; VHHCDR2 comprising SEQ ID NO. 46; VHHCDR3 comprising SEQ ID NO. 47; or
   (v) VHHCDR1 comprising SEQ ID NO. 49; VHHCDR2 comprising SEQ ID NO. 50; VHHCDR3 comprising SEQ ID NO. 51.

2. An antigen-binding domain according to claim 1, which comprises either:

(a) a heavy chain variable region (VH); and a light chain variable region (VL):
  (i) VH comprising SEQ ID NO. 7 and VL comprising SEQ ID NO. 8;
  (ii) VH comprising SEQ ID NO. 15 and VL comprising SEQ ID NO. 16;
  (iii) VH comprising SEQ ID NO. 23 and VL comprising SEQ ID NO. 24; or
  (iv) VH comprising SEQ ID NO. 31 and VL comprising SEQ ID NO. 32; or
(b) a domain antibody variable region:
  (i) SEQ ID NO. 36;
  (ii) SEQ ID NO. 40;
  (iii) SEQ ID NO. 44;
  (iv) SEQ ID NO. 48; or
  (v) SEQ ID NO. 52.

3. A chimeric antigen receptor (CAR) comprising an antigen-binding domain according to claim 1.

4. A nucleic acid sequence which encodes an antigen-binding domain according to claim 1.

5. A nucleic acid construct which comprises a nucleic acid sequence according to claim 4 and a nucleic acid sequence which encodes a suicide gene.

6. A vector which comprises a nucleic acid sequence according to claim 5.

7. A cell which expresses a CAR according to claim 3.

8. A method for making a cell according to claim 7, which comprises the step of introducing a nucleic acid sequence which encodes a CAR according to claim 3 into a cell ex vivo.

9. A pharmaceutical composition which comprises a plurality of cells according to claim 7 and a pharmaceutically acceptable carrier, diluent or excipient.

10. A method for treating cancers that overexpress prostate specific membrane antigen which comprises the step of administering a cell according to claim 7 to a subject.

* * * * *

SEQUENCE LISTING

```
<160> NUMBER OF SEQ ID NOS: 161

<210> SEQ ID NO 1
<211> LENGTH: 5
<212> TYPE: PRT
<213> ORGANISM: Artificial Sequence
<220> FEATURE:
<223> OTHER INFORMATION: synthetic peptide

<400> SEQUENCE: 1

Ser Ser Trp Met Asn
1               5

<210> SEQ ID NO 2
<211> LENGTH: 17
<212> TYPE: PRT
<213> ORGANISM: Artificial Sequence
<220> FEATURE:
<223> OTHER INFORMATION: synthetic peptide

<400> SEQUENCE: 2

Arg Ile Tyr Pro Gly Asp Gly Asp Thr Thr Tyr Asn Gly Asn Phe Lys
1               5                   10                  15

Asp

<210> SEQ ID NO 3
<211> LENGTH: 10
<212> TYPE: PRT
<213> ORGANISM: Artificial Sequence
```

```
<220> FEATURE:
<223> OTHER INFORMATION: synthetic peptide

<400> SEQUENCE: 3

Gly Thr Gly Tyr Leu Trp Tyr Phe Asp Val
1               5                   10

<210> SEQ ID NO 4
<211> LENGTH: 11
<212> TYPE: PRT
<213> ORGANISM: Artificial Sequence
<220> FEATURE:
<223> OTHER INFORMATION: synthetic peptide

<400> SEQUENCE: 4

Lys Ala Ser Gln Asp Ile Asn Glu Asn Val Ala
1               5                   10

<210> SEQ ID NO 5
<211> LENGTH: 7
<212> TYPE: PRT
<213> ORGANISM: Artificial Sequence
<220> FEATURE:
<223> OTHER INFORMATION: synthetic peptide

<400> SEQUENCE: 5

Tyr Thr Ser Ala Leu Gln Ser
1               5

<210> SEQ ID NO 6
<211> LENGTH: 9
<212> TYPE: PRT
<213> ORGANISM: Artificial Sequence
<220> FEATURE:
<223> OTHER INFORMATION: synthetic peptide

<400> SEQUENCE: 6

Gln Gln Tyr Asp Asn Leu Pro Phe Thr
1               5

<210> SEQ ID NO 7
<211> LENGTH: 119
<212> TYPE: PRT
<213> ORGANISM: Artificial Sequence
<220> FEATURE:
<223> OTHER INFORMATION: synthetic peptide

<400> SEQUENCE: 7

Gln Phe Gln Leu Gln Gln Ser Gly Pro Glu Leu Val Lys Pro Gly Ala
1               5                   10                  15

Ser Val Lys Ile Ser Cys Lys Ala Ser Gly Tyr Ala Phe Ser Ser Ser
            20                  25                  30

Trp Met Asn Trp Val Arg Gln Arg Pro Gly Lys Gly Leu Glu Trp Ile
        35                  40                  45

Gly Arg Ile Tyr Pro Gly Asp Gly Asp Thr Thr Tyr Asn Gly Asn Phe
    50                  55                  60

Lys Asp Lys Ala Thr Leu Thr Ala Ala Lys Ser Ser Ser Thr Ala Tyr
65                  70                  75                  80

Ile Gln Ile Asn Ser Leu Thr Ser Glu Asp Ser Ala Val Tyr Phe Cys
                85                  90                  95

Ala Arg Gly Thr Gly Tyr Leu Trp Tyr Phe Asp Val Trp Gly Ala Gly
            100                 105                 110

Thr Thr Val Thr Val Ser Ser
```

115

<210> SEQ ID NO 8
<211> LENGTH: 108
<212> TYPE: PRT
<213> ORGANISM: Artificial Sequence
<220> FEATURE:
<223> OTHER INFORMATION: synthetic peptide

<400> SEQUENCE: 8

Asp Ile Gln Met Thr Gln Ser Pro Ser Ser Leu Ser Thr Ser Leu Gly
1               5                   10                  15

Gly Lys Val Thr Ile Thr Cys Lys Ala Ser Gln Asp Ile Asn Glu Asn
            20                  25                  30

Val Ala Trp Tyr Gln His Lys Pro Gly Lys Gly Pro Arg Leu Leu Ile
        35                  40                  45

Trp Tyr Thr Ser Ala Leu Gln Ser Gly Ile Pro Ser Arg Phe Ser Gly
    50                  55                  60

Ser Gly Ser Gly Arg Asp Tyr Ser Phe Ser Ile Ser Asn Leu Glu Pro
65                  70                  75                  80

Glu Asp Ile Ala Thr Tyr Tyr Cys Gln Gln Tyr Asp Asn Leu Pro Phe
                85                  90                  95

Thr Phe Gly Ser Gly Thr Lys Leu Glu Ile Lys Arg
            100                 105

<210> SEQ ID NO 9
<211> LENGTH: 5
<212> TYPE: PRT
<213> ORGANISM: Artificial Sequence
<220> FEATURE:
<223> OTHER INFORMATION: synthetic peptide

<400> SEQUENCE: 9

Ser Ser Trp Met Asn
1               5

<210> SEQ ID NO 10
<211> LENGTH: 17
<212> TYPE: PRT
<213> ORGANISM: Artificial Sequence
<220> FEATURE:
<223> OTHER INFORMATION: synthetic peptide

<400> SEQUENCE: 10

Arg Ile Tyr Pro Gly Asp Gly Asp Thr Asn Tyr Ala Gln Lys Phe Gln
1               5                   10                  15

Gly

<210> SEQ ID NO 11
<211> LENGTH: 10
<212> TYPE: PRT
<213> ORGANISM: Artificial Sequence
<220> FEATURE:
<223> OTHER INFORMATION: synthetic peptide

<400> SEQUENCE: 11

Gly Thr Gly Tyr Leu Trp Tyr Phe Asp Val
1               5                   10

<210> SEQ ID NO 12
<211> LENGTH: 11
<212> TYPE: PRT
<213> ORGANISM: Artificial Sequence

```
<220> FEATURE:
<223> OTHER INFORMATION: synthetic peptide

<400> SEQUENCE: 12

Arg Ala Ser Gln Asp Ile Asn Glu Asn Leu Ala
1               5                   10

<210> SEQ ID NO 13
<211> LENGTH: 7
<212> TYPE: PRT
<213> ORGANISM: Artificial Sequence
<220> FEATURE:
<223> OTHER INFORMATION: synthetic peptide

<400> SEQUENCE: 13

Tyr Thr Ser Asn Arg Ala Thr
1               5

<210> SEQ ID NO 14
<211> LENGTH: 9
<212> TYPE: PRT
<213> ORGANISM: Artificial Sequence
<220> FEATURE:
<223> OTHER INFORMATION: synthetic peptide

<400> SEQUENCE: 14

Gln Gln Tyr Asp Asn Leu Pro Phe Thr
1               5

<210> SEQ ID NO 15
<211> LENGTH: 119
<212> TYPE: PRT
<213> ORGANISM: Artificial Sequence
<220> FEATURE:
<223> OTHER INFORMATION: synthetic peptide

<400> SEQUENCE: 15

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Ser
                20                  25                  30

Trp Met Asn Trp Val Arg Gln Ala Pro Gly Gln Gly Leu Glu Trp Met
            35                  40                  45

Gly Arg Ile Tyr Pro Gly Asp Gly Asp Thr Asn Tyr Ala Gln Lys Phe
        50                  55                  60

Gln Gly Arg Val Thr Met Thr Arg Asp Thr Ser Ile Ser Thr Ala Tyr
65                  70                  75                  80

Met Glu Leu Ser Arg Leu Arg Ser Asp Thr Ala Val Tyr Tyr Cys
                85                  90                  95

Ala Arg Gly Thr Gly Tyr Leu Trp Tyr Phe Asp Val Trp Gly Gln Gly
            100                 105                 110

Thr Met Val Thr Val Ser Ser
        115

<210> SEQ ID NO 16
<211> LENGTH: 108
<212> TYPE: PRT
<213> ORGANISM: Artificial Sequence
<220> FEATURE:
<223> OTHER INFORMATION: synthetic peptide

<400> SEQUENCE: 16

Glu Ile Val Leu Thr Gln Ser Pro Ala Thr Leu Ser Leu Ser Pro Gly
```

```
            1               5                  10                 15
        Glu Arg Ala Thr Leu Ser Cys Arg Ala Ser Gln Asp Ile Asn Glu Asn
                        20                  25                  30

Leu Ala Trp Tyr Gln Gln Lys Pro Gly Gln Ala Pro Arg Leu Leu Ile
                        35                  40                  45

Tyr Tyr Thr Ser Asn Arg Ala Thr Gly Ile Pro Ala Arg Phe Ser Gly
                        50                  55                  60

Ser Gly Ser Gly Arg Asp Phe Thr Leu Thr Ile Ser Ser Leu Glu Pro
         65                 70                  75                  80

Glu Asp Phe Ala Val Tyr Tyr Cys Gln Gln Tyr Asp Asn Leu Pro Phe
                        85                  90                  95

Thr Phe Gly Gln Gly Thr Lys Val Glu Ile Lys Arg
                        100                 105

<210> SEQ ID NO 17
<211> LENGTH: 5
<212> TYPE: PRT
<213> ORGANISM: Artificial Sequence
<220> FEATURE:
<223> OTHER INFORMATION: synthetic peptide

<400> SEQUENCE: 17

Ala Tyr Glu Met His
1               5

<210> SEQ ID NO 18
<211> LENGTH: 17
<212> TYPE: PRT
<213> ORGANISM: Artificial Sequence
<220> FEATURE:
<223> OTHER INFORMATION: synthetic peptide

<400> SEQUENCE: 18

Tyr Ile Ser Ser Gly Ser Asp Thr Ile Ser Tyr Ala Ala Thr Val Lys
1               5                   10                  15

Gly

<210> SEQ ID NO 19
<211> LENGTH: 8
<212> TYPE: PRT
<213> ORGANISM: Artificial Sequence
<220> FEATURE:
<223> OTHER INFORMATION: synthetic peptide

<400> SEQUENCE: 19

Pro Leu Gly Tyr Gly Leu Asp Tyr
1               5

<210> SEQ ID NO 20
<211> LENGTH: 11
<212> TYPE: PRT
<213> ORGANISM: Artificial Sequence
<220> FEATURE:
<223> OTHER INFORMATION: synthetic peptide

<400> SEQUENCE: 20

Lys Ala Ser Gln Asp Ile Asn Asn Phe Ile Ala
1               5                   10

<210> SEQ ID NO 21
<211> LENGTH: 7
<212> TYPE: PRT
<213> ORGANISM: Artificial Sequence
```

<220> FEATURE:
<223> OTHER INFORMATION: synthetic peptide

<400> SEQUENCE: 21

Tyr Thr Ser Ser Leu Gln Pro
1               5

<210> SEQ ID NO 22
<211> LENGTH: 8
<212> TYPE: PRT
<213> ORGANISM: Artificial Sequence
<220> FEATURE:
<223> OTHER INFORMATION: synthetic peptide

<400> SEQUENCE: 22

Leu Gln Tyr Asp Ile Leu Phe Thr
1               5

<210> SEQ ID NO 23
<211> LENGTH: 117
<212> TYPE: PRT
<213> ORGANISM: Artificial Sequence
<220> FEATURE:
<223> OTHER INFORMATION: synthetic peptide

<400> SEQUENCE: 23

Glu Val Gln Leu Val Glu Ser Gly Gly Gly Leu Val Lys Pro Gly Gly
1               5                   10                  15

Ser Leu Lys Leu Ser Cys Ala Ala Ser Gly Phe Thr Phe Asn Ala Tyr
            20                  25                  30

Glu Met His Trp Val Arg Gln Ala Pro Glu Lys Gly Leu Glu Trp Val
        35                  40                  45

Ala Tyr Ile Ser Ser Gly Ser Asp Thr Ile Ser Tyr Ala Ala Thr Val
    50                  55                  60

Lys Gly Arg Phe Thr Ile Ser Arg Asp Asn Ala Lys Asn Thr Leu Phe
65                  70                  75                  80

Leu Gln Met Thr Ser Leu Arg Ser Glu Asp Thr Ala Met Tyr Tyr Cys
                85                  90                  95

Thr Pro Pro Leu Gly Tyr Gly Leu Asp Tyr Trp Gly Gln Gly Thr Ser
            100                 105                 110

Val Ile Val Ser Ser
        115

<210> SEQ ID NO 24
<211> LENGTH: 107
<212> TYPE: PRT
<213> ORGANISM: Artificial Sequence
<220> FEATURE:
<223> OTHER INFORMATION: synthetic peptide

<400> SEQUENCE: 24

Asp Ile Gln Met Thr Gln Ser Pro Ser Ser Leu Ser Ala Ser Leu Gly
1               5                   10                  15

Gly Lys Val Thr Ile Thr Cys Lys Ala Ser Gln Asp Ile Asn Asn Phe
            20                  25                  30

Ile Ala Trp Tyr Gln His Lys Pro Gly Lys Gly Pro Arg Leu Leu Ile
        35                  40                  45

His Tyr Thr Ser Ser Leu Gln Pro Gly Phe Pro Ser Arg Phe Ser Gly
    50                  55                  60

Ser Gly Ser Gly Arg Glu Tyr Ser Phe Ser Ile Ser Asn Val Glu Pro
65                  70                  75                  80

Glu Asp Ile Ala Thr Tyr Tyr Cys Leu Gln Tyr Asp Ile Leu Phe Thr
            85                  90                  95

Phe Gly Gly Gly Thr Lys Leu Glu Ile Lys Arg
            100                 105

<210> SEQ ID NO 25
<211> LENGTH: 5
<212> TYPE: PRT
<213> ORGANISM: Artificial Sequence
<220> FEATURE:
<223> OTHER INFORMATION: synthetic peptide

<400> SEQUENCE: 25

Asn Ser Trp Met Asn
1               5

<210> SEQ ID NO 26
<211> LENGTH: 17
<212> TYPE: PRT
<213> ORGANISM: Artificial Sequence
<220> FEATURE:
<223> OTHER INFORMATION: synthetic peptide

<400> SEQUENCE: 26

Arg Ile Tyr Pro Gly Asp Gly Asp Ala Thr Tyr Asn Gly Asn Phe Lys
1               5                   10                  15

Asp

<210> SEQ ID NO 27
<211> LENGTH: 10
<212> TYPE: PRT
<213> ORGANISM: Artificial Sequence
<220> FEATURE:
<223> OTHER INFORMATION: synthetic peptide

<400> SEQUENCE: 27

Gly Thr Gly Tyr Leu Trp Tyr Phe Asp Val
1               5                   10

<210> SEQ ID NO 28
<211> LENGTH: 11
<212> TYPE: PRT
<213> ORGANISM: Artificial Sequence
<220> FEATURE:
<223> OTHER INFORMATION: synthetic peptide

<400> SEQUENCE: 28

Lys Ala Ser Gln Asp Ile Asn Glu Asn Ile Ala
1               5                   10

<210> SEQ ID NO 29
<211> LENGTH: 7
<212> TYPE: PRT
<213> ORGANISM: Artificial Sequence
<220> FEATURE:
<223> OTHER INFORMATION: synthetic peptide

<400> SEQUENCE: 29

Tyr Thr Ser Ala Leu Gln Ser
1               5

<210> SEQ ID NO 30
<211> LENGTH: 9
<212> TYPE: PRT
<213> ORGANISM: Artificial Sequence

```
<220> FEATURE:
<223> OTHER INFORMATION: synthetic peptide

<400> SEQUENCE: 30

His Gln Tyr Asp Asn Leu Pro Phe Thr
1               5

<210> SEQ ID NO 31
<211> LENGTH: 119
<212> TYPE: PRT
<213> ORGANISM: Artificial Sequence
<220> FEATURE:
<223> OTHER INFORMATION: synthetic peptide

<400> SEQUENCE: 31

Gln Val His Leu Gln Gln Ser Gly Pro Glu Leu Val Lys Pro Gly Ala
1               5                   10                  15

Ser Val Lys Ile Ser Cys Lys Ala Ser Gly Tyr Ala Phe Ser Asn Ser
            20                  25                  30

Trp Met Asn Trp Val Arg Gln Arg Pro Gly Lys Gly Leu Glu Trp Ile
        35                  40                  45

Gly Arg Ile Tyr Pro Gly Asp Gly Asp Ala Thr Tyr Asn Gly Asn Phe
    50                  55                  60

Lys Asp Lys Ala Thr Leu Thr Ala Asp Lys Ser Ser Ser Thr Ala Tyr
65                  70                  75                  80

Ile Gln Leu Asn Ser Leu Thr Ser Glu Asp Ser Ala Val Tyr Phe Cys
                85                  90                  95

Ala Arg Gly Thr Gly Tyr Leu Tyr Phe Asp Val Trp Gly Ala Gly
            100                 105                 110

Thr Thr Val Thr Val Ala Ser
        115

<210> SEQ ID NO 32
<211> LENGTH: 108
<212> TYPE: PRT
<213> ORGANISM: Artificial Sequence
<220> FEATURE:
<223> OTHER INFORMATION: synthetic peptide

<400> SEQUENCE: 32

Asp Ile Gln Met Thr Gln Ser Pro Ser Ser Leu Ser Thr Phe Leu Gly
1               5                   10                  15

Gly Lys Val Thr Ile Thr Cys Lys Ala Ser Gln Asp Ile Asn Glu Asn
            20                  25                  30

Ile Ala Trp Tyr Gln His Lys Pro Gly Lys Gly Pro Arg Leu Leu Ile
        35                  40                  45

Trp Tyr Thr Ser Ala Leu Gln Ser Gly Ile Pro Ser Arg Phe Ser Gly
    50                  55                  60

Ser Gly Ser Gly Arg Asp Tyr Ser Phe Ser Ile Ser Asn Leu Glu Pro
65                  70                  75                  80

Glu Asp Ile Ala Thr Tyr Tyr Cys His Gln Tyr Asp Asn Leu Pro Phe
                85                  90                  95

Thr Phe Gly Ser Gly Thr Lys Leu Glu Ile Lys Arg
            100                 105

<210> SEQ ID NO 33
<211> LENGTH: 5
<212> TYPE: PRT
<213> ORGANISM: Artificial Sequence
<220> FEATURE:
```

<223> OTHER INFORMATION: synthetic peptide

<400> SEQUENCE: 33

Thr Tyr Gly Thr Gly
1               5

<210> SEQ ID NO 34
<211> LENGTH: 17
<212> TYPE: PRT
<213> ORGANISM: Artificial Sequence
<220> FEATURE:
<223> OTHER INFORMATION: synthetic peptide

<400> SEQUENCE: 34

Gly Ile Ser Gly Arg Gly Gly Tyr Thr Ser Tyr Ile Asp Ser Val Lys
1               5                   10                  15

Gly

<210> SEQ ID NO 35
<211> LENGTH: 17
<212> TYPE: PRT
<213> ORGANISM: Artificial Sequence
<220> FEATURE:
<223> OTHER INFORMATION: synthetic peptide

<400> SEQUENCE: 35

Asp Arg Arg Met Val Trp Gly Thr Val Arg Ser Pro Asp Glu Tyr Asp
1               5                   10                  15

Ser

<210> SEQ ID NO 36
<211> LENGTH: 126
<212> TYPE: PRT
<213> ORGANISM: Artificial Sequence
<220> FEATURE:
<223> OTHER INFORMATION: synthetic peptide

<400> SEQUENCE: 36

Gln Val Gln Leu Gln Glu Ser Gly Gly Gly Leu Val Gln Pro Gly Gly
1               5                   10                  15

Ser Leu Arg Leu Ser Cys Ala Ala Ser Glu Arg Thr Phe Ser Thr Tyr
            20                  25                  30

Gly Thr Gly Trp Phe Arg Gln Ala Pro Gly Lys Glu Arg Glu Phe Val
        35                  40                  45

Ala Gly Ile Ser Gly Arg Gly Gly Tyr Thr Ser Tyr Ile Asp Ser Val
    50                  55                  60

Lys Gly Arg Phe Thr Ile Ser Arg Asp Asn Ala Lys Asn Thr Val Tyr
65                  70                  75                  80

Leu Gln Met Asn Ser Leu Lys Pro Glu Asp Thr Ala Val Tyr Tyr Cys
                85                  90                  95

Ala Ala Asp Arg Arg Met Val Trp Gly Thr Val Arg Ser Pro Asp Glu
            100                 105                 110

Tyr Asp Ser Trp Gly Gln Gly Thr Gln Val Thr Val Ser Ser
        115                 120                 125

<210> SEQ ID NO 37
<211> LENGTH: 5
<212> TYPE: PRT
<213> ORGANISM: Artificial Sequence
<220> FEATURE:
<223> OTHER INFORMATION: synthetic peptide

```
<400> SEQUENCE: 37

Arg Tyr Val Met Gly
1               5

<210> SEQ ID NO 38
<211> LENGTH: 17
<212> TYPE: PRT
<213> ORGANISM: Artificial Sequence
<220> FEATURE:
<223> OTHER INFORMATION: synthetic peptide

<400> SEQUENCE: 38

Ala Ile Ser Trp Ser Gly Ser Asn Thr Asn Tyr Ala Asp Ser Val Lys
1               5                   10                  15

Gly

<210> SEQ ID NO 39
<211> LENGTH: 15
<212> TYPE: PRT
<213> ORGANISM: Artificial Sequence
<220> FEATURE:
<223> OTHER INFORMATION: synthetic peptide

<400> SEQUENCE: 39

Ser Gly Gln Trp Ile Ile Pro Thr Thr Ala Arg Gly Tyr Asp Asp
1               5                   10                  15

<210> SEQ ID NO 40
<211> LENGTH: 124
<212> TYPE: PRT
<213> ORGANISM: Artificial Sequence
<220> FEATURE:
<223> OTHER INFORMATION: synthetic peptide

<400> SEQUENCE: 40

Gln Val Gln Leu Gln Gln Ser Gly Gly Gly Leu Val Gln Ala Gly Gly
1               5                   10                  15

Ser Leu Arg Leu Ser Cys Ala Ala Ser Gly Arg Thr Tyr Gly Arg Tyr
                20                  25                  30

Val Met Gly Trp Phe Arg Gln Ile Pro Gly Lys Glu Arg Glu Phe Val
            35                  40                  45

Ala Ala Ile Ser Trp Ser Gly Ser Asn Thr Asn Tyr Ala Asp Ser Val
        50                  55                  60

Lys Gly Arg Phe Thr Ile Ser Arg Asp Asn Ala Lys Asn Thr Leu Tyr
65                  70                  75                  80

Leu Gln Met Asn Ser Leu Lys Pro Glu Asp Thr Ala Val Tyr Tyr Cys
                85                  90                  95

Ala Ala Ser Gly Gln Trp Ile Ile Pro Thr Thr Ala Arg Gly Tyr Asp
            100                 105                 110

Asp Trp Gly Gln Gly Thr Gln Val Thr Val Ser Ser
        115                 120

<210> SEQ ID NO 41
<211> LENGTH: 5
<212> TYPE: PRT
<213> ORGANISM: Artificial Sequence
<220> FEATURE:
<223> OTHER INFORMATION: synthetic peptide

<400> SEQUENCE: 41

Thr Tyr Gly Thr Gly
1               5
```

```
<210> SEQ ID NO 42
<211> LENGTH: 17
<212> TYPE: PRT
<213> ORGANISM: Artificial Sequence
<220> FEATURE:
<223> OTHER INFORMATION: synthetic peptide

<400> SEQUENCE: 42

Gly Ile Ser Gly Arg Gly Gly Tyr Thr Ser Tyr Ile Asp Ser Val Lys
1               5                   10                  15

Gly

<210> SEQ ID NO 43
<211> LENGTH: 17
<212> TYPE: PRT
<213> ORGANISM: Artificial Sequence
<220> FEATURE:
<223> OTHER INFORMATION: synthetic peptide

<400> SEQUENCE: 43

Asp Arg Arg Met Val Trp Gly Thr Val Arg Ser Pro Asp Glu Tyr Asp
1               5                   10                  15

Ser

<210> SEQ ID NO 44
<211> LENGTH: 126
<212> TYPE: PRT
<213> ORGANISM: Artificial Sequence
<220> FEATURE:
<223> OTHER INFORMATION: synthetic peptide

<400> SEQUENCE: 44

Gln Val Gln Leu Gln Glu Ser Gly Gly Gly Ser Val Gln Ala Gly Gly
1               5                   10                  15

Ser Leu Arg Leu Ser Cys Ala Ala Ser Glu Arg Thr Phe Ser Thr Tyr
            20                  25                  30

Gly Thr Gly Trp Phe Arg Gln Ala Pro Gly Lys Glu Arg Glu Phe Val
        35                  40                  45

Ala Gly Ile Ser Gly Arg Gly Gly Tyr Thr Ser Tyr Ile Asp Ser Val
    50                  55                  60

Lys Gly Arg Phe Thr Thr Ser Arg Asp Asn Ala Lys Asn Thr Val Tyr
65                  70                  75                  80

Leu Gln Met Asn Ser Leu Lys Pro Glu Asp Thr Ala Val Tyr Tyr Cys
                85                  90                  95

Ala Ala Asp Arg Arg Met Val Trp Gly Thr Val Arg Ser Pro Asp Glu
            100                 105                 110

Tyr Asp Ser Trp Gly Gln Gly Thr Gln Val Thr Val Ser Ser
        115                 120                 125

<210> SEQ ID NO 45
<211> LENGTH: 5
<212> TYPE: PRT
<213> ORGANISM: Artificial Sequence
<220> FEATURE:
<223> OTHER INFORMATION: synthetic peptide

<400> SEQUENCE: 45

Thr Tyr Thr Met Gly
1               5
```

```
<210> SEQ ID NO 46
<211> LENGTH: 20
<212> TYPE: PRT
<213> ORGANISM: Artificial Sequence
<220> FEATURE:
<223> OTHER INFORMATION: synthetic peptide

<400> SEQUENCE: 46

Gly Ile Thr Trp Ser Thr Trp Ser Ser Asp Lys Thr Gln Tyr Leu Asp
1               5                   10                  15

Ser Val Asn Ser
            20

<210> SEQ ID NO 47
<211> LENGTH: 18
<212> TYPE: PRT
<213> ORGANISM: Artificial Sequence
<220> FEATURE:
<223> OTHER INFORMATION: synthetic peptide

<400> SEQUENCE: 47

Thr Pro Arg Tyr Tyr Gly Val Ala Val Pro Thr Thr Arg Gly Pro Tyr
1               5                   10                  15

Asp Tyr

<210> SEQ ID NO 48
<211> LENGTH: 130
<212> TYPE: PRT
<213> ORGANISM: Artificial Sequence
<220> FEATURE:
<223> OTHER INFORMATION: synthetic peptide

<400> SEQUENCE: 48

Gln Val Gln Leu Gln Glu Ser Gly Gly Gly Trp Val Gln Ala Gly Gly
1               5                   10                  15

Ser Leu Arg Leu Ser Cys Ala Ala Ser Gly Arg Thr Ser Arg Thr Tyr
            20                  25                  30

Thr Met Gly Trp Phe Arg Gln Ala Pro Gly Lys Asp Gly Val Phe Val
        35                  40                  45

Ala Gly Ile Thr Trp Ser Thr Trp Ser Ser Asp Lys Thr Gln Tyr Leu
    50                  55                  60

Asp Ser Val Asn Ser Arg Phe Thr Ile Ser Arg Asp Asn Ala Arg Asn
65                  70                  75                  80

Thr Val Tyr Leu Gln Met Asn Asn Leu Lys Pro Glu Asp Thr Ala Val
                85                  90                  95

Tyr Tyr Cys Ala Ala Thr Pro Arg Tyr Tyr Gly Val Ala Val Pro Thr
            100                 105                 110

Thr Arg Gly Pro Tyr Asp Tyr Trp Gly Gln Gly Thr Gln Val Thr Val
        115                 120                 125

Ser Ser
    130

<210> SEQ ID NO 49
<211> LENGTH: 5
<212> TYPE: PRT
<213> ORGANISM: Artificial Sequence
<220> FEATURE:
<223> OTHER INFORMATION: synthetic peptide

<400> SEQUENCE: 49

Ile Asn Thr Met His
1               5
```

```
<210> SEQ ID NO 50
<211> LENGTH: 16
<212> TYPE: PRT
<213> ORGANISM: Artificial Sequence
<220> FEATURE:
<223> OTHER INFORMATION: synthetic peptide

<400> SEQUENCE: 50

Thr Ile Thr Ser Gly Gly Ser Thr Asn Tyr Ala Asp Ser Val Lys Gly
1               5                   10                  15

<210> SEQ ID NO 51
<211> LENGTH: 6
<212> TYPE: PRT
<213> ORGANISM: Artificial Sequence
<220> FEATURE:
<223> OTHER INFORMATION: synthetic peptide

<400> SEQUENCE: 51

Tyr Tyr Tyr Arg Ala Tyr
1               5

<210> SEQ ID NO 52
<211> LENGTH: 114
<212> TYPE: PRT
<213> ORGANISM: Artificial Sequence
<220> FEATURE:
<223> OTHER INFORMATION: synthetic peptide

<400> SEQUENCE: 52

Gln Val Gln Leu Gln Gln Ser Gly Gly Gly Leu Val Gln Pro Gly Gly
1               5                   10                  15

Ser Leu Arg Leu Ser Cys Ala Asp Ser Gly Ser Ile Phe Arg Ile Asn
            20                  25                  30

Thr Met His Trp Tyr Arg Gln Ala Pro Gly Lys Gln Arg Glu Leu Val
        35                  40                  45

Ala Thr Ile Thr Ser Gly Gly Ser Thr Asn Tyr Ala Asp Ser Val Lys
    50                  55                  60

Gly Arg Phe Thr Ile Ser Arg Asp Asn Thr Lys Asn Thr Met Tyr Leu
65                  70                  75                  80

Gln Met Asn Ser Leu Lys Ala Glu Asp Thr Ala Val Tyr Tyr Cys Tyr
                85                  90                  95

Thr Tyr Tyr Tyr Arg Ala Tyr Trp Gly Gln Gly Thr Gln Val Thr Val
            100                 105                 110

Ser Ser

<210> SEQ ID NO 53
<211> LENGTH: 11
<212> TYPE: PRT
<213> ORGANISM: Artificial Sequence
<220> FEATURE:
<223> OTHER INFORMATION: synthetic peptide

<400> SEQUENCE: 53

Lys Ala Ser Gln Asp Ile Asn Glu Asn Val Ala
1               5                   10

<210> SEQ ID NO 54
<211> LENGTH: 7
<212> TYPE: PRT
<213> ORGANISM: Artificial Sequence
<220> FEATURE:
```

<223> OTHER INFORMATION: synthetic peptide

<400> SEQUENCE: 54

Tyr Thr Ser Ala Leu Gln Ser
1               5

<210> SEQ ID NO 55
<211> LENGTH: 9
<212> TYPE: PRT
<213> ORGANISM: Artificial Sequence
<220> FEATURE:
<223> OTHER INFORMATION: synthetic peptide

<400> SEQUENCE: 55

Gln Gln Tyr Asp Asn Leu Pro Phe Thr
1               5

<210> SEQ ID NO 56
<211> LENGTH: 107
<212> TYPE: PRT
<213> ORGANISM: Artificial Sequence
<220> FEATURE:
<223> OTHER INFORMATION: synthetic polypeptide

<400> SEQUENCE: 56

Glu Ile Val Leu Thr Gln Ser Pro Ala Thr Leu Ser Leu Ser Pro Gly
1               5                   10                  15

Glu Arg Ala Thr Leu Ser Cys Lys Ala Ser Gln Asp Ile Asn Glu Asn
            20                  25                  30

Val Ala Trp Tyr Gln Gln Lys Pro Gly Gln Ala Pro Arg Leu Leu Ile
        35                  40                  45

Tyr Tyr Thr Ser Ala Leu Gln Ser Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Tyr Asp Asn Leu Pro Phe
                85                  90                  95

Thr Phe Gly Gln Gly Thr Lys Val Glu Ile Lys
            100                 105

<210> SEQ ID NO 57
<211> LENGTH: 11
<212> TYPE: PRT
<213> ORGANISM: Artificial Sequence
<220> FEATURE:
<223> OTHER INFORMATION: synthetic peptide

<400> SEQUENCE: 57

Lys Ala Ser Gln Asp Ile Asn Glu Asn Val Ala
1               5                   10

<210> SEQ ID NO 58
<211> LENGTH: 7
<212> TYPE: PRT
<213> ORGANISM: Artificial Sequence
<220> FEATURE:
<223> OTHER INFORMATION: synthetic peptide

<400> SEQUENCE: 58

Tyr Thr Ser Ala Leu Gln Ser
1               5

<210> SEQ ID NO 59

```
<211> LENGTH: 9
<212> TYPE: PRT
<213> ORGANISM: Artificial Sequence
<220> FEATURE:
<223> OTHER INFORMATION: synthetic peptide

<400> SEQUENCE: 59

Gln Gln Tyr Asp Asn Leu Pro Phe Thr
1               5

<210> SEQ ID NO 60
<211> LENGTH: 107
<212> TYPE: PRT
<213> ORGANISM: Artificial Sequence
<220> FEATURE:
<223> OTHER INFORMATION: synthetic polypeptide

<400> SEQUENCE: 60

Asp Ile Gln Met Thr Gln Ser Pro Ala Thr Leu Ser Leu Ser Pro Gly
1               5                   10                  15

Glu Arg Ala Thr Leu Ser Cys Lys Ala Ser Gln Asp Ile Asn Glu Asn
            20                  25                  30

Val Ala Trp Tyr Gln His Lys Pro Gly Gln Ala Pro Arg Leu Leu Ile
        35                  40                  45

Trp Tyr Thr Ser Ala Leu Gln Ser Gly Ile Pro Ala Arg Phe Ser Gly
    50                  55                  60

Ser Gly Ser Gly Arg Asp Tyr Thr Leu Thr Ile Ser Ser Leu Glu Pro
65                  70                  75                  80

Glu Asp Phe Ala Val Tyr Tyr Cys Gln Gln Tyr Asp Asn Leu Pro Phe
                85                  90                  95

Thr Phe Gly Gln Gly Thr Lys Val Glu Ile Lys
            100                 105

<210> SEQ ID NO 61
<211> LENGTH: 11
<212> TYPE: PRT
<213> ORGANISM: Artificial Sequence
<220> FEATURE:
<223> OTHER INFORMATION: synthetic peptide

<400> SEQUENCE: 61

Arg Ala Ser Gln Ser Val Ser Ser Tyr Leu Ala
1               5                   10

<210> SEQ ID NO 62
<211> LENGTH: 7
<212> TYPE: PRT
<213> ORGANISM: Artificial Sequence
<220> FEATURE:
<223> OTHER INFORMATION: synthetic peptide

<400> SEQUENCE: 62

Asp Ala Ser Asn Arg Ala Thr
1               5

<210> SEQ ID NO 63
<211> LENGTH: 9
<212> TYPE: PRT
<213> ORGANISM: Artificial Sequence
<220> FEATURE:
<223> OTHER INFORMATION: synthetic peptide

<400> SEQUENCE: 63

Gln Gln Tyr Asp Asn Leu Pro Phe Thr
```

<210> SEQ ID NO 64
<211> LENGTH: 107
<212> TYPE: PRT
<213> ORGANISM: Artificial Sequence
<220> FEATURE:
<223> OTHER INFORMATION: synthetic peptide

<400> SEQUENCE: 64

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Ser Ser Tyr
            20                  25                  30

Leu Ala Trp Tyr Gln His Lys Pro Gly Gln Ala Pro Arg Leu Leu Ile
        35                  40                  45

Tyr Asp Ala Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Tyr Asp Asn Leu Pro Phe
                85                  90                  95

Thr Phe Gly Gln Gly Thr Lys Val Glu Ile Lys
            100                 105

<210> SEQ ID NO 65
<211> LENGTH: 11
<212> TYPE: PRT
<213> ORGANISM: Artificial Sequence
<220> FEATURE:
<223> OTHER INFORMATION: synthetic peptide

<400> SEQUENCE: 65

Lys Ala Ser Gln Asp Ile Asn Glu Asn Val Ala
1               5                   10

<210> SEQ ID NO 66
<211> LENGTH: 7
<212> TYPE: PRT
<213> ORGANISM: Artificial Sequence
<220> FEATURE:
<223> OTHER INFORMATION: synthetic peptide

<400> SEQUENCE: 66

Tyr Thr Ser Ala Leu Gln Ser
1               5

<210> SEQ ID NO 67
<211> LENGTH: 9
<212> TYPE: PRT
<213> ORGANISM: Artificial Sequence
<220> FEATURE:
<223> OTHER INFORMATION: synthetic peptide

<400> SEQUENCE: 67

Gln Gln Tyr Asp Asn Leu Pro Phe Thr
1               5

<210> SEQ ID NO 68
<211> LENGTH: 107
<212> TYPE: PRT
<213> ORGANISM: Artificial Sequence
<220> FEATURE:
<223> OTHER INFORMATION: synthetic peptide

<400> SEQUENCE: 68

Asp Ile Gln Met Thr Gln Ser Pro Ser Ser Leu Ser Ala Ser Val Gly
1               5                   10                  15

Asp Arg Val Thr Ile Thr Cys Lys Ala Ser Gln Asp Ile Asn Glu Asn
            20                  25                  30

Val Ala Trp Tyr Gln Gln Lys Pro Gly Lys Ala Pro Lys Leu Leu Ile
        35                  40                  45

Tyr Tyr Thr Ser Ala Leu Gln Ser Gly Val Pro Ser Arg Phe Ser Gly
    50                  55                  60

Ser Gly Ser Gly Thr Asp Phe Thr Phe Thr Ile Ser Ser Leu Gln Pro
65                  70                  75                  80

Glu Asp Ile Ala Thr Tyr Tyr Cys Gln Gln Tyr Asp Asn Leu Pro Phe
                85                  90                  95

Thr Phe Gly Gln Gly Thr Lys Val Glu Ile Lys
            100                 105

<210> SEQ ID NO 69
<211> LENGTH: 11
<212> TYPE: PRT
<213> ORGANISM: Artificial Sequence
<220> FEATURE:
<223> OTHER INFORMATION: synthetic peptide

<400> SEQUENCE: 69

Lys Ala Ser Gln Asp Ile Asn Glu Asn Val Ala
1               5                   10

<210> SEQ ID NO 70
<211> LENGTH: 7
<212> TYPE: PRT
<213> ORGANISM: Artificial Sequence
<220> FEATURE:
<223> OTHER INFORMATION: synthetic peptide

<400> SEQUENCE: 70

Tyr Thr Ser Ala Leu Gln Ser
1               5

<210> SEQ ID NO 71
<211> LENGTH: 9
<212> TYPE: PRT
<213> ORGANISM: Artificial Sequence
<220> FEATURE:
<223> OTHER INFORMATION: synthetic peptide

<400> SEQUENCE: 71

Gln Gln Tyr Asp Asn Leu Pro Phe Thr
1               5

<210> SEQ ID NO 72
<211> LENGTH: 107
<212> TYPE: PRT
<213> ORGANISM: Artificial Sequence
<220> FEATURE:
<223> OTHER INFORMATION: synthetic peptide

<400> SEQUENCE: 72

Asp Ile Gln Met Thr Gln Ser Pro Ser Ser Leu Ser Ala Ser Val Gly
1               5                   10                  15

Asp Arg Val Thr Ile Thr Cys Lys Ala Ser Gln Asp Ile Asn Glu Asn
            20                  25                  30

```
Val Ala Trp Tyr Gln His Lys Pro Gly Lys Ala Pro Lys Leu Leu Ile
            35                  40                  45

Trp Tyr Thr Ser Ala Leu Gln Ser Gly Val Pro Ser Arg Phe Ser Gly
    50                  55                  60

Ser Gly Ser Gly Arg Asp Tyr Thr Phe Thr Ile Ser Ser Leu Gln Pro
65                  70                  75                  80

Glu Asp Ile Ala Thr Tyr Tyr Cys Gln Gln Tyr Asp Asn Leu Pro Phe
                85                  90                  95

Thr Phe Gly Gln Gly Thr Lys Val Glu Ile Lys
            100                 105
```

<210> SEQ ID NO 73
<211> LENGTH: 11
<212> TYPE: PRT
<213> ORGANISM: Artificial Sequence
<220> FEATURE:
<223> OTHER INFORMATION: synthetic peptide

<400> SEQUENCE: 73

```
Gln Ala Ser Gln Asp Ile Ser Asn Tyr Leu Asn
1               5                   10
```

<210> SEQ ID NO 74
<211> LENGTH: 7
<212> TYPE: PRT
<213> ORGANISM: Artificial Sequence
<220> FEATURE:
<223> OTHER INFORMATION: synthetic peptide

<400> SEQUENCE: 74

```
Asp Ala Ser Asn Leu Glu Thr
1               5
```

<210> SEQ ID NO 75
<211> LENGTH: 9
<212> TYPE: PRT
<213> ORGANISM: Artificial Sequence
<220> FEATURE:
<223> OTHER INFORMATION: synthetic peptide

<400> SEQUENCE: 75

```
Gln Gln Tyr Asp Asn Leu Pro Phe Thr
1               5
```

<210> SEQ ID NO 76
<211> LENGTH: 107
<212> TYPE: PRT
<213> ORGANISM: Artificial Sequence
<220> FEATURE:
<223> OTHER INFORMATION: synthetic peptide

<400> SEQUENCE: 76

```
Asp Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Ile Ser Asn Tyr
            20                  25                  30

Leu Asn Trp Tyr Gln Gln Lys Pro Gly Lys Ala Pro Lys Leu Leu Ile
        35                  40                  45

Tyr Asp Ala Ser Asn Leu Glu Thr Gly Val Pro Ser Arg Phe Ser Gly
    50                  55                  60

Ser Gly Ser Gly Thr Asp Phe Thr Phe Thr Ile Ser Ser Leu Gln Pro
65                  70                  75                  80
```

```
Glu Asp Ile Ala Thr Tyr Tyr Cys Gln Gln Tyr Asp Asn Leu Pro Phe
                85                  90                  95
Thr Phe Gly Gln Gly Thr Lys Val Glu Ile Lys
            100                 105

<210> SEQ ID NO 77
<211> LENGTH: 11
<212> TYPE: PRT
<213> ORGANISM: Artificial Sequence
<220> FEATURE:
<223> OTHER INFORMATION: synthetic peptide

<400> SEQUENCE: 77

Lys Ala Ser Gln Asp Ile Asn Glu Asn Val Ala
1               5                   10

<210> SEQ ID NO 78
<211> LENGTH: 7
<212> TYPE: PRT
<213> ORGANISM: Artificial Sequence
<220> FEATURE:
<223> OTHER INFORMATION: synthetic peptide

<400> SEQUENCE: 78

Asp Ala Ser Asn Arg Ala Thr
1               5

<210> SEQ ID NO 79
<211> LENGTH: 9
<212> TYPE: PRT
<213> ORGANISM: Artificial Sequence
<220> FEATURE:
<223> OTHER INFORMATION: synthetic peptide

<400> SEQUENCE: 79

Gln Gln Tyr Asp Asn Leu Pro Phe Thr
1               5

<210> SEQ ID NO 80
<211> LENGTH: 107
<212> TYPE: PRT
<213> ORGANISM: Artificial Sequence
<220> FEATURE:
<223> OTHER INFORMATION: synthetic peptide

<400> SEQUENCE: 80

Asp Ile Gln Met Thr Gln Ser Pro Ala Thr Leu Ser Leu Ser Pro Gly
1               5                   10                  15
Glu Arg Ala Thr Leu Ser Cys Lys Ala Ser Gln Asp Ile Asn Glu Asn
            20                  25                  30
Val Ala Trp Tyr Gln His Lys Pro Gly Gln Ala Pro Arg Leu Leu Ile
        35                  40                  45
Trp Asp Ala Ser Asn Arg Ala Thr Gly Ile Pro Ala Arg Phe Ser Gly
    50                  55                  60
Ser Gly Ser Gly Arg Asp Tyr Thr Leu Thr Ile Ser Ser Leu Glu Pro
65                  70                  75                  80
Glu Asp Phe Ala Val Tyr Tyr Cys Gln Gln Tyr Asp Asn Leu Pro Phe
                85                  90                  95
Thr Phe Gly Gln Gly Thr Lys Val Glu Ile Lys
            100                 105

<210> SEQ ID NO 81
<211> LENGTH: 11
```

```
<212> TYPE: PRT
<213> ORGANISM: Artificial Sequence
<220> FEATURE:
<223> OTHER INFORMATION: synthetic peptide

<400> SEQUENCE: 81

Arg Ala Ser Gln Ser Val Ser Ser Tyr Leu Ala
1               5                   10

<210> SEQ ID NO 82
<211> LENGTH: 7
<212> TYPE: PRT
<213> ORGANISM: Artificial Sequence
<220> FEATURE:
<223> OTHER INFORMATION: synthetic peptide

<400> SEQUENCE: 82

Tyr Thr Ser Ala Leu Gln Ser
1               5

<210> SEQ ID NO 83
<211> LENGTH: 9
<212> TYPE: PRT
<213> ORGANISM: Artificial Sequence
<220> FEATURE:
<223> OTHER INFORMATION: synthetic peptide

<400> SEQUENCE: 83

Gln Gln Tyr Asp Asn Leu Pro Phe Thr
1               5

<210> SEQ ID NO 84
<211> LENGTH: 107
<212> TYPE: PRT
<213> ORGANISM: Artificial Sequence
<220> FEATURE:
<223> OTHER INFORMATION: synthetic peptide

<400> SEQUENCE: 84

Asp Ile Gln Met Thr Gln Ser Pro Ala Thr Leu Ser Leu Ser Pro Gly
1               5                   10                  15

Glu Arg Ala Thr Leu Ser Cys Arg Ala Ser Gln Ser Val Ser Ser Tyr
            20                  25                  30

Leu Ala Trp Tyr Gln His Lys Pro Gly Gln Ala Pro Arg Leu Leu Ile
        35                  40                  45

Trp Tyr Thr Ser Ala Leu Gln Ser Gly Ile Pro Ala Arg Phe Ser Gly
    50                  55                  60

Ser Gly Ser Gly Arg Asp Tyr Thr Leu Thr Ile Ser Ser Leu Glu Pro
65                  70                  75                  80

Glu Asp Phe Ala Val Tyr Tyr Cys Gln Gln Tyr Asp Asn Leu Pro Phe
                85                  90                  95

Thr Phe Gly Gln Gly Thr Lys Val Glu Ile Lys
            100                 105

<210> SEQ ID NO 85
<211> LENGTH: 11
<212> TYPE: PRT
<213> ORGANISM: Artificial Sequence
<220> FEATURE:
<223> OTHER INFORMATION: synthetic peptide

<400> SEQUENCE: 85

Lys Ala Ser Gln Asp Ile Asn Glu Asn Val Ala
1               5                   10
```

<210> SEQ ID NO 86
<211> LENGTH: 7
<212> TYPE: PRT
<213> ORGANISM: Artificial Sequence
<220> FEATURE:
<223> OTHER INFORMATION: synthetic peptide

<400> SEQUENCE: 86

Tyr Thr Ser Asn Arg Ala Thr
1               5

<210> SEQ ID NO 87
<211> LENGTH: 9
<212> TYPE: PRT
<213> ORGANISM: Artificial Sequence
<220> FEATURE:
<223> OTHER INFORMATION: synthetic peptide

<400> SEQUENCE: 87

Gln Gln Tyr Asp Asn Leu Pro Phe Thr
1               5

<210> SEQ ID NO 88
<211> LENGTH: 107
<212> TYPE: PRT
<213> ORGANISM: Artificial Sequence
<220> FEATURE:
<223> OTHER INFORMATION: synthetic peptide

<400> SEQUENCE: 88

Asp Ile Gln Met Thr Gln Ser Pro Ala Thr Leu Ser Leu Ser Pro Gly
1               5                   10                  15

Glu Arg Ala Thr Leu Ser Cys Lys Ala Ser Gln Asp Ile Asn Glu Asn
            20                  25                  30

Val Ala Trp Tyr Gln His Lys Pro Gly Gln Ala Pro Arg Leu Leu Ile
        35                  40                  45

Trp Tyr Thr Ser Asn Arg Ala Thr Gly Ile Pro Ala Arg Phe Ser Gly
    50                  55                  60

Ser Gly Ser Gly Arg Asp Tyr Thr Leu Thr Ile Ser Ser Leu Glu Pro
65                  70                  75                  80

Glu Asp Phe Ala Val Tyr Tyr Cys Gln Gln Tyr Asp Asn Leu Pro Phe
                85                  90                  95

Thr Phe Gly Gln Gly Thr Lys Val Glu Ile Lys
            100                 105

<210> SEQ ID NO 89
<211> LENGTH: 11
<212> TYPE: PRT
<213> ORGANISM: Artificial Sequence
<220> FEATURE:
<223> OTHER INFORMATION: synthetic peptide

<400> SEQUENCE: 89

Arg Ala Ser Gln Ser Val Ser Ser Tyr Leu Ala
1               5                   10

<210> SEQ ID NO 90
<211> LENGTH: 7
<212> TYPE: PRT
<213> ORGANISM: Artificial Sequence
<220> FEATURE:
<223> OTHER INFORMATION: synthetic peptide

```
<400> SEQUENCE: 90

Tyr Thr Ser Asn Arg Ala Thr
1               5

<210> SEQ ID NO 91
<211> LENGTH: 9
<212> TYPE: PRT
<213> ORGANISM: Artificial Sequence
<220> FEATURE:
<223> OTHER INFORMATION: synthetic peptide

<400> SEQUENCE: 91

Gln Gln Tyr Asp Asn Leu Pro Phe Thr
1               5

<210> SEQ ID NO 92
<211> LENGTH: 107
<212> TYPE: PRT
<213> ORGANISM: Artificial Sequence
<220> FEATURE:
<223> OTHER INFORMATION: synthetic peptide

<400> SEQUENCE: 92

Asp Ile Gln Met Thr Gln Ser Pro Ala Thr Leu Ser Leu Ser Pro Gly
1               5                   10                  15

Glu Arg Ala Thr Leu Ser Cys Arg Ala Ser Gln Ser Val Ser Ser Tyr
            20                  25                  30

Leu Ala Trp Tyr Gln His Lys Pro Gly Gln Ala Pro Arg Leu Leu Ile
        35                  40                  45

Trp Tyr Thr Ser Asn Arg Ala Thr Gly Ile Pro Ala Arg Phe Ser Gly
    50                  55                  60

Ser Gly Ser Gly Arg Asp Tyr Thr Leu Thr Ile Ser Ser Leu Glu Pro
65                  70                  75                  80

Glu Asp Phe Ala Val Tyr Tyr Cys Gln Gln Tyr Asp Asn Leu Pro Phe
                85                  90                  95

Thr Phe Gly Gln Gly Thr Lys Val Glu Ile Lys
            100                 105

<210> SEQ ID NO 93
<211> LENGTH: 11
<212> TYPE: PRT
<213> ORGANISM: Artificial Sequence
<220> FEATURE:
<223> OTHER INFORMATION: synthetic peptide

<400> SEQUENCE: 93

Lys Ala Ser Gln Asp Ile Asn Glu Asn Val Ala
1               5                   10

<210> SEQ ID NO 94
<211> LENGTH: 7
<212> TYPE: PRT
<213> ORGANISM: Artificial Sequence
<220> FEATURE:
<223> OTHER INFORMATION: synthetic peptide

<400> SEQUENCE: 94

Tyr Thr Ser Ala Leu Gln Ser
1               5

<210> SEQ ID NO 95
<211> LENGTH: 9
<212> TYPE: PRT
```

-continued

```
<213> ORGANISM: Artificial Sequence
<220> FEATURE:
<223> OTHER INFORMATION: synthetic peptide

<400> SEQUENCE: 95

Gln Gln Tyr Asp Asn Leu Pro Phe Thr
1               5

<210> SEQ ID NO 96
<211> LENGTH: 109
<212> TYPE: PRT
<213> ORGANISM: Artificial Sequence
<220> FEATURE:
<223> OTHER INFORMATION: synthetic peptide

<400> SEQUENCE: 96

Glu Ile Val Leu Thr Gln Ser Pro Ala Thr Leu Ser Leu Ser Pro Gly
1               5                   10                  15

Glu Arg Ala Thr Leu Ser Cys Lys Ala Ser Gln Asp Ile Asn Glu Asn
                20                  25                  30

Val Ala Trp Tyr Gln Gln Lys Pro Gly Gln Ala Pro Arg Leu Leu Ile
            35                  40                  45

Tyr Tyr Thr Ser Ala Leu Gln Ser Gly Ile Pro Ala Arg Phe Ser Gly
        50                  55                  60

Ser Gly Ser Gly Ser Gly Arg Asp Tyr Thr Leu Thr Ile Ser Ser Leu
65                  70                  75                  80

Glu Pro Glu Asp Phe Ala Val Tyr Tyr Cys Gln Gln Tyr Asp Asn Leu
                85                  90                  95

Pro Phe Thr Phe Gly Gln Gly Thr Lys Val Glu Ile Lys
            100                 105

<210> SEQ ID NO 97
<211> LENGTH: 11
<212> TYPE: PRT
<213> ORGANISM: Artificial Sequence
<220> FEATURE:
<223> OTHER INFORMATION: synthetic peptide

<400> SEQUENCE: 97

Lys Ala Ser Gln Asp Ile Asn Glu Asn Val Ala
1               5                   10

<210> SEQ ID NO 98
<211> LENGTH: 7
<212> TYPE: PRT
<213> ORGANISM: Artificial Sequence
<220> FEATURE:
<223> OTHER INFORMATION: synthetic peptide

<400> SEQUENCE: 98

Tyr Thr Ser Ala Leu Gln Ser
1               5

<210> SEQ ID NO 99
<211> LENGTH: 9
<212> TYPE: PRT
<213> ORGANISM: Artificial Sequence
<220> FEATURE:
<223> OTHER INFORMATION: synthetic peptide

<400> SEQUENCE: 99

Gln Gln Tyr Asp Asn Leu Pro Phe Thr
1               5
```

<210> SEQ ID NO 100
<211> LENGTH: 107
<212> TYPE: PRT
<213> ORGANISM: Artificial Sequence
<220> FEATURE:
<223> OTHER INFORMATION: synthetic peptide

<400> SEQUENCE: 100

```
Asp Ile Val Met Thr Gln Ser Pro Ala Thr Leu Ser Leu Ser Pro Gly
1               5                   10                  15

Glu Arg Ala Thr Leu Ser Cys Lys Ala Ser Gln Asp Ile Asn Glu Asn
            20                  25                  30

Val Ala Trp Tyr Gln His Lys Pro Gly Gln Ala Pro Arg Leu Leu Ile
        35                  40                  45

Trp Tyr Thr Ser Ala Leu Gln Ser Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Tyr Asp Asn Leu Pro Phe
                85                  90                  95

Thr Phe Gly Gln Gly Thr Lys Val Glu Ile Lys
            100                 105
```

<210> SEQ ID NO 101
<211> LENGTH: 11
<212> TYPE: PRT
<213> ORGANISM: Artificial Sequence
<220> FEATURE:
<223> OTHER INFORMATION: synthetic peptide

<400> SEQUENCE: 101

```
Lys Ala Ser Gln Asp Ile Asn Glu Asn Val Ala
1               5                   10
```

<210> SEQ ID NO 102
<211> LENGTH: 7
<212> TYPE: PRT
<213> ORGANISM: Artificial Sequence
<220> FEATURE:
<223> OTHER INFORMATION: synthetic peptide

<400> SEQUENCE: 102

```
Tyr Thr Ser Ala Leu Gln Ser
1               5
```

<210> SEQ ID NO 103
<211> LENGTH: 9
<212> TYPE: PRT
<213> ORGANISM: Artificial Sequence
<220> FEATURE:
<223> OTHER INFORMATION: synthetic peptide

<400> SEQUENCE: 103

```
Gln Gln Tyr Asp Asn Leu Pro Phe Thr
1               5
```

<210> SEQ ID NO 104
<211> LENGTH: 109
<212> TYPE: PRT
<213> ORGANISM: Artificial Sequence
<220> FEATURE:
<223> OTHER INFORMATION: synthetic peptide

<400> SEQUENCE: 104

```
Asp Ile Val Met Thr Gln Ser Pro Ala Thr Leu Ser Leu Ser Pro Gly
1               5                   10                  15

Glu Arg Ala Thr Leu Ser Cys Lys Ala Ser Gln Asp Ile Asn Glu Asn
            20                  25                  30

Val Ala Trp Tyr Gln His Lys Pro Gly Gln Ala Pro Arg Leu Leu Ile
            35                  40                  45

Trp Tyr Thr Ser Ala Leu Gln Ser Gly Ile Pro Ala Arg Phe Ser Gly
    50                  55                  60

Ser Gly Ser Gly Ser Gly Arg Asp Tyr Thr Leu Thr Ile Ser Ser Leu
65                  70                  75                  80

Glu Pro Glu Asp Phe Ala Val Tyr Tyr Cys Gln Gln Tyr Asp Asn Leu
                85                  90                  95

Pro Phe Thr Phe Gly Gln Gly Thr Lys Val Glu Ile Lys
            100                 105
```

<210> SEQ ID NO 105
<211> LENGTH: 11
<212> TYPE: PRT
<213> ORGANISM: Artificial Sequence
<220> FEATURE:
<223> OTHER INFORMATION: synthetic peptide

<400> SEQUENCE: 105

```
Lys Ala Ser Gln Asp Ile Asn Glu Asn Val Ala
1               5                   10
```

<210> SEQ ID NO 106
<211> LENGTH: 7
<212> TYPE: PRT
<213> ORGANISM: Artificial Sequence
<220> FEATURE:
<223> OTHER INFORMATION: synthetic peptide

<400> SEQUENCE: 106

```
Tyr Thr Ser Ala Leu Gln Ser
1               5
```

<210> SEQ ID NO 107
<211> LENGTH: 9
<212> TYPE: PRT
<213> ORGANISM: Artificial Sequence
<220> FEATURE:
<223> OTHER INFORMATION: synthetic peptide

<400> SEQUENCE: 107

```
Gln Gln Tyr Asp Asn Leu Pro Phe Thr
1               5
```

<210> SEQ ID NO 108
<211> LENGTH: 107
<212> TYPE: PRT
<213> ORGANISM: Artificial Sequence
<220> FEATURE:
<223> OTHER INFORMATION: synthetic peptide

<400> SEQUENCE: 108

```
Glu Ile Gln Leu Thr Gln Ser Pro Ala Thr Leu Ser Leu Ser Pro Gly
1               5                   10                  15

Glu Arg Ala Thr Leu Ser Cys Lys Ala Ser Gln Asp Ile Asn Glu Asn
            20                  25                  30

Val Ala Trp Tyr Gln Gln Lys Pro Gly Gln Ala Pro Arg Leu Leu Ile
            35                  40                  45
```

```
Tyr Tyr Thr Ser Ala Leu Gln Ser Gly Ile Pro Ala Arg Phe Ser Gly
        50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Tyr Asp Asn Leu Pro Phe
                85                  90                  95

Thr Phe Gly Gln Gly Thr Lys Val Glu Ile Lys
                100                 105

<210> SEQ ID NO 109
<211> LENGTH: 11
<212> TYPE: PRT
<213> ORGANISM: Artificial Sequence
<220> FEATURE:
<223> OTHER INFORMATION: synthetic peptide

<400> SEQUENCE: 109

Lys Ala Ser Gln Asp Ile Asn Glu Asn Val Ala
1               5                   10

<210> SEQ ID NO 110
<211> LENGTH: 7
<212> TYPE: PRT
<213> ORGANISM: Artificial Sequence
<220> FEATURE:
<223> OTHER INFORMATION: synthetic peptide

<400> SEQUENCE: 110

Tyr Thr Ser Ala Leu Gln Ser
1               5

<210> SEQ ID NO 111
<211> LENGTH: 9
<212> TYPE: PRT
<213> ORGANISM: Artificial Sequence
<220> FEATURE:
<223> OTHER INFORMATION: synthetic peptide

<400> SEQUENCE: 111

Gln Gln Tyr Asp Asn Leu Pro Phe Thr
1               5

<210> SEQ ID NO 112
<211> LENGTH: 109
<212> TYPE: PRT
<213> ORGANISM: Artificial Sequence
<220> FEATURE:
<223> OTHER INFORMATION: synthetic peptide

<400> SEQUENCE: 112

Glu Ile Gln Leu Thr Gln Ser Pro Ala Thr Leu Ser Leu Ser Pro Gly
1               5                   10                  15

Glu Arg Ala Thr Leu Ser Cys Lys Ala Ser Gln Asp Ile Asn Glu Asn
                20                  25                  30

Val Ala Trp Tyr Gln Gln Lys Pro Gly Gln Ala Pro Arg Leu Leu Ile
            35                  40                  45

Tyr Tyr Thr Ser Ala Leu Gln Ser Gly Ile Pro Ala Arg Phe Ser Gly
        50                  55                  60

Ser Gly Ser Gly Ser Gly Arg Asp Tyr Thr Leu Thr Ile Ser Ser Leu
65                  70                  75                  80

Glu Pro Glu Asp Phe Ala Val Tyr Tyr Cys Gln Gln Tyr Asp Asn Leu
                85                  90                  95
```

```
Pro Phe Thr Phe Gly Gln Gly Thr Lys Val Glu Ile Lys
            100                 105

<210> SEQ ID NO 113
<211> LENGTH: 11
<212> TYPE: PRT
<213> ORGANISM: Artificial Sequence
<220> FEATURE:
<223> OTHER INFORMATION: synthetic peptide

<400> SEQUENCE: 113

Lys Ala Ser Gln Asp Ile Asn Glu Asn Val Ala
1               5                   10

<210> SEQ ID NO 114
<211> LENGTH: 7
<212> TYPE: PRT
<213> ORGANISM: Artificial Sequence
<220> FEATURE:
<223> OTHER INFORMATION: synthetic peptide

<400> SEQUENCE: 114

Tyr Thr Ser Ala Leu Gln Ser
1               5

<210> SEQ ID NO 115
<211> LENGTH: 9
<212> TYPE: PRT
<213> ORGANISM: Artificial Sequence
<220> FEATURE:
<223> OTHER INFORMATION: synthetic peptide

<400> SEQUENCE: 115

Gln Gln Tyr Asp Asn Leu Pro Phe Thr
1               5

<210> SEQ ID NO 116
<211> LENGTH: 107
<212> TYPE: PRT
<213> ORGANISM: Artificial Sequence
<220> FEATURE:
<223> OTHER INFORMATION: synthetic peptide

<400> SEQUENCE: 116

Asp Ile Gln Met Thr Gln Ser Pro Ala Thr Leu Ser Leu Ser Pro Gly
1               5                   10                  15

Glu Arg Ala Thr Leu Ser Cys Lys Ala Ser Gln Asp Ile Asn Glu Asn
            20                  25                  30

Val Ala Trp Tyr Gln His Lys Pro Gly Gln Ala Pro Arg Leu Leu Ile
        35                  40                  45

Trp Tyr Thr Ser Ala Leu Gln Ser Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Tyr Asp Asn Leu Pro Phe
                85                  90                  95

Thr Phe Gly Gln Gly Thr Lys Val Glu Ile Lys
            100                 105

<210> SEQ ID NO 117
<211> LENGTH: 5
<212> TYPE: PRT
<213> ORGANISM: Artificial Sequence
```

<220> FEATURE:
<223> OTHER INFORMATION: synthetic peptide

<400> SEQUENCE: 117

Ser Ser Trp Met Asn
1               5

<210> SEQ ID NO 118
<211> LENGTH: 17
<212> TYPE: PRT
<213> ORGANISM: Artificial Sequence
<220> FEATURE:
<223> OTHER INFORMATION: synthetic peptide

<400> SEQUENCE: 118

Arg Ile Tyr Pro Gly Asp Gly Asp Thr Thr Tyr Asn Gly Asn Phe Lys
1               5                   10                  15

Asp

<210> SEQ ID NO 119
<211> LENGTH: 10
<212> TYPE: PRT
<213> ORGANISM: Artificial Sequence
<220> FEATURE:
<223> OTHER INFORMATION: synthetic peptide

<400> SEQUENCE: 119

Gly Thr Gly Tyr Leu Trp Tyr Phe Asp Val
1               5                   10

<210> SEQ ID NO 120
<211> LENGTH: 119
<212> TYPE: PRT
<213> ORGANISM: Artificial Sequence
<220> FEATURE:
<223> OTHER INFORMATION: synthetic peptide

<400> SEQUENCE: 120

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Ser
                20                  25                  30

Trp Met Asn Trp Val Arg Gln Ala Pro Gly Gln Gly Leu Glu Trp Met
            35                  40                  45

Gly Arg Ile Tyr Pro Gly Asp Gly Asp Thr Thr Tyr Asn Gly Asn Phe
        50                  55                  60

Lys Asp Arg Val Thr Met Thr Arg Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Arg Gly Thr Gly Tyr Leu Trp Tyr Phe Asp Val Trp Gly Gln Gly
            100                 105                 110

Thr Met Val Thr Val Ser Ser
        115

<210> SEQ ID NO 121
<211> LENGTH: 5
<212> TYPE: PRT
<213> ORGANISM: Artificial Sequence
<220> FEATURE:
<223> OTHER INFORMATION: synthetic peptide

<400> SEQUENCE: 121

```
Ser Ser Trp Met Asn
1               5

<210> SEQ ID NO 122
<211> LENGTH: 17
<212> TYPE: PRT
<213> ORGANISM: Artificial Sequence
<220> FEATURE:
<223> OTHER INFORMATION: synthetic peptide

<400> SEQUENCE: 122

Arg Ile Tyr Pro Gly Asp Gly Asp Thr Thr Tyr Asn Gly Asn Phe Lys
1               5                   10                  15

Asp

<210> SEQ ID NO 123
<211> LENGTH: 10
<212> TYPE: PRT
<213> ORGANISM: Artificial Sequence
<220> FEATURE:
<223> OTHER INFORMATION: synthetic peptide

<400> SEQUENCE: 123

Gly Thr Gly Tyr Leu Trp Tyr Phe Asp Val
1               5                   10

<210> SEQ ID NO 124
<211> LENGTH: 119
<212> TYPE: PRT
<213> ORGANISM: Artificial Sequence
<220> FEATURE:
<223> OTHER INFORMATION: synthetic peptide

<400> SEQUENCE: 124

Gln Phe Gln Leu Val Gln Ser Gly Ala Glu Val Lys Lys Pro Gly Ala
1               5                   10                  15

Ser Val Lys Val Ser Cys Lys Ala Ser Gly Tyr Ala Phe Ser Ser Ser
            20                  25                  30

Trp Met Asn Trp Val Arg Gln Ala Pro Gly Gln Gly Leu Glu Trp Met
        35                  40                  45

Gly Arg Ile Tyr Pro Gly Asp Gly Asp Thr Thr Tyr Asn Gly Asn Phe
    50                  55                  60

Lys Asp Arg Ala Thr Leu Thr Ala Asp Lys Ser Ile Ser Thr Ala Tyr
65                  70                  75                  80

Met Glu Leu Ser Arg Leu Arg Ser Asp Asp Thr Ala Val Tyr Phe Cys
                85                  90                  95

Ala Arg Gly Thr Gly Tyr Leu Trp Tyr Phe Asp Val Trp Gly Gln Gly
            100                 105                 110

Thr Met Val Thr Val Ser Ser
        115

<210> SEQ ID NO 125
<211> LENGTH: 5
<212> TYPE: PRT
<213> ORGANISM: Artificial Sequence
<220> FEATURE:
<223> OTHER INFORMATION: synthetic peptide

<400> SEQUENCE: 125

Ser Ser Trp Met Asn
1               5
```

<210> SEQ ID NO 126
<211> LENGTH: 17
<212> TYPE: PRT
<213> ORGANISM: Artificial Sequence
<220> FEATURE:
<223> OTHER INFORMATION: synthetic peptide

<400> SEQUENCE: 126

Arg Ile Tyr Pro Gly Asp Gly Asp Thr Thr Tyr Asn Gly Asn Phe Lys
1               5                   10                  15

Asp

<210> SEQ ID NO 127
<211> LENGTH: 10
<212> TYPE: PRT
<213> ORGANISM: Artificial Sequence
<220> FEATURE:
<223> OTHER INFORMATION: synthetic peptide

<400> SEQUENCE: 127

Gly Thr Gly Tyr Leu Trp Tyr Phe Asp Val
1               5                   10

<210> SEQ ID NO 128
<211> LENGTH: 119
<212> TYPE: PRT
<213> ORGANISM: Artificial Sequence
<220> FEATURE:
<223> OTHER INFORMATION: synthetic peptide

<400> SEQUENCE: 128

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Ser
            20                  25                  30

Trp Met Asn Trp Val Arg Gln Ala Pro Gly Lys Gly Leu Val Trp Val
        35                  40                  45

Ser Arg Ile Tyr Pro Gly Asp Gly Asp Thr Thr Tyr Asn Gly Asn Phe
    50                  55                  60

Lys Asp Arg Phe Thr Ile Ser Arg Asp Asn Ala Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Gly Thr Gly Tyr Leu Trp Tyr Phe Asp Val Trp Gly Gln Gly
            100                 105                 110

Thr Met Val Thr Val Ser Ser
        115

<210> SEQ ID NO 129
<211> LENGTH: 5
<212> TYPE: PRT
<213> ORGANISM: Artificial Sequence
<220> FEATURE:
<223> OTHER INFORMATION: synthetic peptide

<400> SEQUENCE: 129

Ser Ser Trp Met Asn
1               5

<210> SEQ ID NO 130
<211> LENGTH: 17
<212> TYPE: PRT

<213> ORGANISM: Artificial Sequence
<220> FEATURE:
<223> OTHER INFORMATION: synthetic peptide

<400> SEQUENCE: 130

Arg Ile Tyr Pro Gly Asp Gly Asp Thr Thr Tyr Asn Gly Asn Phe Lys
1               5                   10                  15
Asp

<210> SEQ ID NO 131
<211> LENGTH: 10
<212> TYPE: PRT
<213> ORGANISM: Artificial Sequence
<220> FEATURE:
<223> OTHER INFORMATION: synthetic peptide

<400> SEQUENCE: 131

Gly Thr Gly Tyr Leu Trp Tyr Phe Asp Val
1               5                   10

<210> SEQ ID NO 132
<211> LENGTH: 119
<212> TYPE: PRT
<213> ORGANISM: Artificial Sequence
<220> FEATURE:
<223> OTHER INFORMATION: synthetic peptide

<400> SEQUENCE: 132

Glu Phe Gln Leu Val Glu Ser Gly Gly Gly Leu Val Gln Pro Gly Gly
1               5                   10                  15

Ser Leu Arg Leu Ser Cys Ala Ala Ser Gly Tyr Ala Phe Ser Ser Ser
            20                  25                  30

Trp Met Asn Trp Val Arg Gln Ala Pro Gly Lys Gly Leu Val Trp Val
        35                  40                  45

Gly Arg Ile Tyr Pro Gly Asp Gly Asp Thr Thr Tyr Asn Gly Asn Phe
    50                  55                  60

Lys Asp Arg Ala Thr Ile Ser Ala Asp Lys Ala Lys Asn Thr Ala Tyr
65                  70                  75                  80

Leu Gln Met Asn Ser Leu Arg Ala Glu Asp Thr Ala Val Tyr Phe Cys
                85                  90                  95

Ala Arg Gly Thr Gly Tyr Leu Trp Tyr Phe Asp Val Trp Gly Gln Gly
            100                 105                 110

Thr Met Val Thr Val Ser Ser
        115

<210> SEQ ID NO 133
<211> LENGTH: 5
<212> TYPE: PRT
<213> ORGANISM: Artificial Sequence
<220> FEATURE:
<223> OTHER INFORMATION: synthetic peptide

<400> SEQUENCE: 133

Ser Ser Trp Met Asn
1               5

<210> SEQ ID NO 134
<211> LENGTH: 17
<212> TYPE: PRT
<213> ORGANISM: Artificial Sequence
<220> FEATURE:
<223> OTHER INFORMATION: synthetic peptide

```
<400> SEQUENCE: 134

Arg Ile Asn Pro Asn Ser Gly Gly Thr Asn Tyr Ala Gln Lys Phe Gln
1               5                   10                  15

Gly

<210> SEQ ID NO 135
<211> LENGTH: 10
<212> TYPE: PRT
<213> ORGANISM: Artificial Sequence
<220> FEATURE:
<223> OTHER INFORMATION: synthetic peptide

<400> SEQUENCE: 135

Gly Thr Gly Tyr Leu Trp Tyr Phe Asp Val
1               5                   10

<210> SEQ ID NO 136
<211> LENGTH: 119
<212> TYPE: PRT
<213> ORGANISM: Artificial Sequence
<220> FEATURE:
<223> OTHER INFORMATION: synthetic peptide

<400> SEQUENCE: 136

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Ser
            20                  25                  30

Trp Met Asn Trp Val Arg Gln Ala Pro Gly Gln Gly Leu Glu Trp Met
        35                  40                  45

Gly Arg Ile Asn Pro Asn Ser Gly Gly Thr Asn Tyr Ala Gln Lys Phe
    50                  55                  60

Gln Gly Arg Val Thr Met Thr Arg Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Arg Gly Thr Gly Tyr Leu Trp Tyr Phe Asp Val Trp Gly Gln Gly
            100                 105                 110

Thr Met Val Thr Val Ser Ser
        115

<210> SEQ ID NO 137
<211> LENGTH: 5
<212> TYPE: PRT
<213> ORGANISM: Artificial Sequence
<220> FEATURE:
<223> OTHER INFORMATION: synthetic peptide

<400> SEQUENCE: 137

Ser Ser Trp Met Asn
1               5

<210> SEQ ID NO 138
<211> LENGTH: 17
<212> TYPE: PRT
<213> ORGANISM: Artificial Sequence
<220> FEATURE:
<223> OTHER INFORMATION: synthetic peptide

<400> SEQUENCE: 138

Arg Ile Tyr Pro Gly Asp Gly Asp Thr Thr Tyr Asn Gly Asn Phe Lys
1               5                   10                  15
```

Asp

<210> SEQ ID NO 139
<211> LENGTH: 10
<212> TYPE: PRT
<213> ORGANISM: Artificial Sequence
<220> FEATURE:
<223> OTHER INFORMATION: synthetic peptide

<400> SEQUENCE: 139

Gly Thr Gly Tyr Leu Trp Tyr Phe Asp Val
1               5                   10

<210> SEQ ID NO 140
<211> LENGTH: 119
<212> TYPE: PRT
<213> ORGANISM: Artificial Sequence
<220> FEATURE:
<223> OTHER INFORMATION: synthetic peptide

<400> SEQUENCE: 140

Gln Phe Gln Leu Gln Glu Ser Gly Pro Gly Leu Val Lys Pro Ser Glu
1               5                   10                  15

Thr Leu Ser Leu Thr Cys Thr Val Ser Gly Tyr Ala Phe Ser Ser Ser
                20                  25                  30

Trp Met Asn Trp Ile Arg Gln Pro Pro Gly Lys Gly Leu Glu Trp Ile
            35                  40                  45

Gly Arg Ile Tyr Pro Gly Asp Gly Asp Thr Thr Tyr Asn Gly Asn Phe
        50                  55                  60

Lys Asp Arg Ala Thr Ile Ser Ala Asp Lys Ser Lys Asn Gln Ala Ser
65                  70                  75                  80

Leu Lys Leu Ser Ser Val Thr Ala Ala Asp Thr Ala Val Tyr Phe Cys
                85                  90                  95

Ala Arg Gly Thr Gly Tyr Leu Trp Tyr Phe Asp Val Trp Gly Lys Gly
            100                 105                 110

Thr Thr Val Thr Val Ser Ser
        115

<210> SEQ ID NO 141
<211> LENGTH: 5
<212> TYPE: PRT
<213> ORGANISM: Artificial Sequence
<220> FEATURE:
<223> OTHER INFORMATION: synthetic peptide

<400> SEQUENCE: 141

Gly Tyr Tyr Met His
1               5

<210> SEQ ID NO 142
<211> LENGTH: 17
<212> TYPE: PRT
<213> ORGANISM: Artificial Sequence
<220> FEATURE:
<223> OTHER INFORMATION: synthetic peptide

<400> SEQUENCE: 142

Arg Ile Tyr Pro Gly Asp Gly Asp Thr Thr Tyr Asn Gly Asn Phe Lys
1               5                   10                  15

Asp

```
<210> SEQ ID NO 143
<211> LENGTH: 10
<212> TYPE: PRT
<213> ORGANISM: Artificial Sequence
<220> FEATURE:
<223> OTHER INFORMATION: synthetic peptide

<400> SEQUENCE: 143

Gly Thr Gly Tyr Leu Trp Tyr Phe Asp Val
1               5                   10

<210> SEQ ID NO 144
<211> LENGTH: 119
<212> TYPE: PRT
<213> ORGANISM: Artificial Sequence
<220> FEATURE:
<223> OTHER INFORMATION: synthetic peptide

<400> SEQUENCE: 144

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Gly Tyr
            20                  25                  30

Tyr Met His Trp Val Arg Gln Ala Pro Gly Gln Gly Leu Glu Trp Met
        35                  40                  45

Gly Arg Ile Tyr Pro Gly Asp Gly Asp Thr Thr Tyr Asn Gly Asn Phe
    50                  55                  60

Lys Asp Arg Val Thr Met Thr Arg Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Arg Gly Thr Gly Tyr Leu Trp Tyr Phe Asp Val Trp Gly Gln Gly
            100                 105                 110

Thr Met Val Thr Val Ser Ser
        115

<210> SEQ ID NO 145
<211> LENGTH: 5
<212> TYPE: PRT
<213> ORGANISM: Artificial Sequence
<220> FEATURE:
<223> OTHER INFORMATION: synthetic peptide

<400> SEQUENCE: 145

Gly Tyr Tyr Met His
1               5

<210> SEQ ID NO 146
<211> LENGTH: 17
<212> TYPE: PRT
<213> ORGANISM: Artificial Sequence
<220> FEATURE:
<223> OTHER INFORMATION: synthetic peptide

<400> SEQUENCE: 146

Arg Ile Tyr Pro Gly Asp Gly Asp Thr Asn Tyr Ala Gln Lys Phe Gln
1               5                   10                  15

Gly

<210> SEQ ID NO 147
<211> LENGTH: 10
<212> TYPE: PRT
<213> ORGANISM: Artificial Sequence
```

```
<220> FEATURE:
<223> OTHER INFORMATION: synthetic peptide

<400> SEQUENCE: 147

Gly Thr Gly Tyr Leu Trp Tyr Phe Asp Val
1               5                   10

<210> SEQ ID NO 148
<211> LENGTH: 119
<212> TYPE: PRT
<213> ORGANISM: Artificial Sequence
<220> FEATURE:
<223> OTHER INFORMATION: synthetic peptide

<400> SEQUENCE: 148

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Gly Tyr
                20                  25                  30

Tyr Met His Trp Val Arg Gln Ala Pro Gly Gln Gly Leu Glu Trp Met
            35                  40                  45

Gly Arg Ile Tyr Pro Gly Asp Gly Asp Thr Asn Tyr Ala Gln Lys Phe
        50                  55                  60

Gln Gly Arg Val Thr Met Thr Arg Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Arg Gly Thr Gly Tyr Leu Trp Tyr Phe Asp Val Trp Gly Gln Gly
            100                 105                 110

Thr Met Val Thr Val Ser Ser
        115

<210> SEQ ID NO 149
<211> LENGTH: 6
<212> TYPE: PRT
<213> ORGANISM: Artificial Sequence
<220> FEATURE:
<223> OTHER INFORMATION: synthetic peptide
<220> FEATURE:
<221> NAME/KEY: misc_feature
<222> LOCATION: (2)..(6)
<223> OTHER INFORMATION: Xaa can be any naturally occurring amino acid

<400> SEQUENCE: 149

Gln Xaa Xaa Xaa Xaa Xaa
1               5

<210> SEQ ID NO 150

<400> SEQUENCE: 150

000

<210> SEQ ID NO 151
<211> LENGTH: 9
<212> TYPE: PRT
<213> ORGANISM: Artificial Sequence
<220> FEATURE:
<223> OTHER INFORMATION: synthetic peptide

<400> SEQUENCE: 151

Gln Gln Tyr Asp Asn Leu Pro Phe Thr
1               5
```

```
<210> SEQ ID NO 152
<211> LENGTH: 11
<212> TYPE: PRT
<213> ORGANISM: Artificial Sequence
<220> FEATURE:
<223> OTHER INFORMATION: synthetic peptide
<220> FEATURE:
<221> NAME/KEY: misc_feature
<222> LOCATION: (1)..(1)
<223> OTHER INFORMATION: Xaa can be any naturally occurring amino acid
<220> FEATURE:
<221> NAME/KEY: misc_feature
<222> LOCATION: (5)..(11)
<223> OTHER INFORMATION: Xaa can be any naturally occurring amino acid

<400> SEQUENCE: 152

Xaa Ala Ser Gln Xaa Xaa Xaa Xaa Xaa Xaa Xaa
1               5                   10

<210> SEQ ID NO 153
<211> LENGTH: 7
<212> TYPE: PRT
<213> ORGANISM: Artificial Sequence
<220> FEATURE:
<223> OTHER INFORMATION: synthetic peptide
<220> FEATURE:
<221> NAME/KEY: misc_feature
<222> LOCATION: (1)..(2)
<223> OTHER INFORMATION: Xaa can be any naturally occurring amino acid
<220> FEATURE:
<221> NAME/KEY: misc_feature
<222> LOCATION: (4)..(7)
<223> OTHER INFORMATION: Xaa can be any naturally occurring amino acid

<400> SEQUENCE: 153

Xaa Xaa Ser Xaa Xaa Xaa Xaa
1               5

<210> SEQ ID NO 154
<211> LENGTH: 9
<212> TYPE: PRT
<213> ORGANISM: Artificial Sequence
<220> FEATURE:
<223> OTHER INFORMATION: synthetic peptide

<400> SEQUENCE: 154

Gln Gln Tyr Asp Asn Leu Pro Phe Thr
1               5

<210> SEQ ID NO 155
<211> LENGTH: 8
<212> TYPE: PRT
<213> ORGANISM: Artificial Sequence
<220> FEATURE:
<223> OTHER INFORMATION: synthetic peptide
<220> FEATURE:
<221> NAME/KEY: misc_feature
<222> LOCATION: (2)..(3)
<223> OTHER INFORMATION: Xaa can be any naturally occurring amino acid
<220> FEATURE:
<221> NAME/KEY: misc_feature
<222> LOCATION: (5)..(8)
<223> OTHER INFORMATION: Xaa can be any naturally occurring amino acid

<400> SEQUENCE: 155

Gly Xaa Xaa Phe Xaa Xaa Xaa Xaa
1               5

<210> SEQ ID NO 156
<211> LENGTH: 8
```

```
<212> TYPE: PRT
<213> ORGANISM: Artificial Sequence
<220> FEATURE:
<223> OTHER INFORMATION: synthetic peptide
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: misc_feature
<222> LOCATION: (4)..(8)
<223> OTHER INFORMATION: Xaa can be any naturally occurring amino acid

<400> SEQUENCE: 156

Ile Xaa Pro Xaa Xaa Xaa Xaa Xaa
1               5

<210> SEQ ID NO 157
<211> LENGTH: 12
<212> TYPE: PRT
<213> ORGANISM: Artificial Sequence
<220> FEATURE:
<223> OTHER INFORMATION: synthetic peptide

<400> SEQUENCE: 157

Ala Arg Gly Thr Gly Tyr Leu Trp Tyr Phe Asp Val
1               5                   10

<210> SEQ ID NO 158
<211> LENGTH: 5
<212> TYPE: PRT
<213> ORGANISM: Artificial Sequence
<220> FEATURE:
<223> OTHER INFORMATION: synthetic peptide
<220> FEATURE:
<221> NAME/KEY: misc_feature
<222> LOCATION: (1)..(3)
<223> OTHER INFORMATION: Xaa can be any naturally occurring amino acid
<220> FEATURE:
<221> NAME/KEY: misc_feature
<222> LOCATION: (5)..(5)
<223> OTHER INFORMATION: Xaa can be any naturally occurring amino acid

<400> SEQUENCE: 158

Xaa Xaa Xaa Met Xaa
1               5

<210> SEQ ID NO 159
<211> LENGTH: 17
<212> TYPE: PRT
<213> ORGANISM: Artificial Sequence
<220> FEATURE:
<223> OTHER INFORMATION: synthetic peptide
<220> FEATURE:
<221> NAME/KEY: misc_feature
<222> LOCATION: (3)..(3)
<223> OTHER INFORMATION: Xaa can be any naturally occurring amino acid
<220> FEATURE:
<221> NAME/KEY: misc_feature
<222> LOCATION: (5)..(6)
<223> OTHER INFORMATION: Xaa can be any naturally occurring amino acid
<220> FEATURE:
<221> NAME/KEY: misc_feature
<222> LOCATION: (8)..(8)
<223> OTHER INFORMATION: Xaa can be any naturally occurring amino acid
<220> FEATURE:
<221> NAME/KEY: misc_feature
<222> LOCATION: (10)..(10)
<223> OTHER INFORMATION: Xaa can be any naturally occurring amino acid
<220> FEATURE:
<221> NAME/KEY: misc_feature
<222> LOCATION: (12)..(14)
<223> OTHER INFORMATION: Xaa can be any naturally occurring amino acid
```

```
<220> FEATURE:
<221> NAME/KEY: misc_feature
<222> LOCATION: (16)..(17)
<223> OTHER INFORMATION: Xaa can be any naturally occurring amino acid

<400> SEQUENCE: 159

Arg Ile Xaa Pro Xaa Xaa Gly Xaa Thr Xaa Tyr Xaa Xaa Xaa Phe Xaa
1               5                   10                  15

Xaa

<210> SEQ ID NO 160
<211> LENGTH: 10
<212> TYPE: PRT
<213> ORGANISM: Artificial Sequence
<220> FEATURE:
<223> OTHER INFORMATION: synthetic peptide

<400> SEQUENCE: 160

Gly Thr Gly Tyr Leu Trp Tyr Phe Asp Val
1               5                   10

<210> SEQ ID NO 161
<211> LENGTH: 20
<212> TYPE: PRT
<213> ORGANISM: Artificial Sequence
<220> FEATURE:
<223> OTHER INFORMATION: synthetic peptide

<400> SEQUENCE: 161

Arg Ala Glu Gly Arg Gly Ser Leu Leu Thr Cys Gly Asp Val Glu Glu
1               5                   10                  15

Asn Pro Gly Pro
            20
```